(12) United States Patent
Eyuboglu et al.

(10) Patent No.: US 12,156,048 B2
(45) Date of Patent: *Nov. 26, 2024

(54) RADIO ACCESS NETWORKS

(71) Applicant: CommScope Technologies LLC, Hickory, NC (US)

(72) Inventors: Vedat Eyuboglu, Weston, MA (US); Arthur J. Barabell, Sudbury, MA (US)

(73) Assignee: CommScope Technologies LLC, Claremont, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/324,779

(22) Filed: May 26, 2023

(65) Prior Publication Data

US 2023/0300639 A1    Sep. 21, 2023

Related U.S. Application Data

(63) Continuation of application No. 17/374,666, filed on Jul. 13, 2021, now Pat. No. 11,706,640, which is a
(Continued)

(51) Int. Cl.
*H04W 24/02* (2009.01)
*H04B 7/04* (2017.01)
(Continued)

(52) U.S. Cl.
CPC ............. *H04W 24/02* (2013.01); *H04B 7/04* (2013.01); *H04B 7/15507* (2013.01);
(Continued)

(58) Field of Classification Search
CPC . H04W 24/02; H04W 72/0446; H04W 72/21; H04W 72/23; H04W 74/0833;
(Continued)

(56) References Cited

U.S. PATENT DOCUMENTS 6,711,144 B1    3/2004    Kim et al.
6,731,618 B1    5/2004    Chung et al.
(Continued)

FOREIGN PATENT DOCUMENTS

CN            1719929 A        1/2006
CN          101044773 A        9/2007
(Continued)

OTHER PUBLICATIONS

U.S. Patent and Trademark Office, "Notice of Allowance", U.S. Appl. No. 13/762,292, Jul. 28, 2017, pp. 1 through 8, Published: US.
(Continued)

*Primary Examiner* — Ahmed Elallam
(74) *Attorney, Agent, or Firm* — Fogg & Powers LLC

(57) ABSTRACT

Among other things, a communication system comprising remote units and a controller is described. The remote units wirelessly exchanges radio frequency (RF) signals with mobile devices. Each RF signal comprises information destined for, or originating from, at least one of the mobile devices. The remote units and the controller communicate baseband data corresponding to the information across an intermediate network. The remote units each implement at least some physical layer processing for an air interface used to wirelessly communicate with the mobile devices. Two or more of the remote units transmit a downlink reference signal to a mobile device of the mobile devices.

20 Claims, 22 Drawing Sheets

Related U.S. Application Data continuation of application No. 16/152,266, filed on Oct. 4, 2018, now Pat. No. 11,102,663, which is a continuation of application No. 15/191,005, filed on Jun. 23, 2016, now Pat. No. 10,142,858, which is a continuation of application No. 13/762,284, filed on Feb. 7, 2013, now Pat. No. 9,380,466.

(51) Int. Cl.
| | | |
|---|---|---|
| *H04B 7/155* | (2006.01) | |
| *H04B 17/336* | (2015.01) | |
| *H04J 11/00* | (2006.01) | |
| *H04L 5/00* | (2006.01) | |
| *H04L 12/46* | (2006.01) | |
| *H04L 27/26* | (2006.01) | |
| *H04L 27/34* | (2006.01) | |
| *H04L 45/745* | (2022.01) | |
| *H04L 69/28* | (2022.01) | |
| *H04W 16/26* | (2009.01) | |
| *H04W 72/0446* | (2023.01) | |
| *H04W 72/21* | (2023.01) | |
| *H04W 72/23* | (2023.01) | |
| *H04W 72/54* | (2023.01) | |
| *H04W 74/0833* | (2024.01) | |
| *H04L 101/622* | (2022.01) | |
| *H04W 84/12* | (2009.01) | |
| *H04W 88/08* | (2009.01) | |
| *H04W 88/12* | (2009.01) | |
| *H04W 88/16* | (2009.01) | |

(52) U.S. Cl.
CPC ............ *H04B 17/336* (2015.01); *H04J 11/00* (2013.01); *H04L 5/005* (2013.01); *H04L 12/4641* (2013.01); *H04L 27/2602* (2013.01); *H04L 27/2636* (2013.01); *H04L 27/34* (2013.01); *H04L 45/745* (2013.01); *H04L 69/28* (2013.01); *H04W 16/26* (2013.01); *H04W 72/0446* (2013.01); *H04W 72/21* (2023.01); *H04W 72/23* (2023.01); *H04W 72/54* (2023.01); *H04W 74/0833* (2013.01); *H04L 27/26025* (2021.01); *H04L 2101/622* (2022.05); *H04W 84/12* (2013.01); *H04W 88/085* (2013.01); *H04W 88/12* (2013.01); *H04W 88/16* (2013.01)

(58) Field of Classification Search
CPC ... H04W 84/12; H04W 88/085; H04W 88/12; H04B 7/04; H04B 7/15507; H04B 17/336; H04J 11/00; H04L 27/2636; H04L 45/745; H04L 27/26025; H04L 2101/622
See application file for complete search history.

(56) References Cited

U.S. PATENT DOCUMENTS

| | | |
|---|---|---|
| 6,741,862 B2 | 5/2004 | Chung et al. |
| 6,781,999 B2 | 8/2004 | Eyuboglu et al. |
| 6,788,249 B1 | 9/2004 | Farmer et al. |
| 6,985,451 B1 | 1/2006 | Nattiv et al. |
| 6,996,626 B1 | 2/2006 | Smith |
| 7,170,871 B2 | 1/2007 | Eyuboglu et al. |
| 7,200,391 B2 | 4/2007 | Chung et al. |
| 7,242,958 B2 | 7/2007 | Chung et al. |
| 7,277,446 B1 | 10/2007 | Abi-Nassif et al. |
| 7,299,278 B2 | 11/2007 | Ch'ng |
| 7,415,242 B1 | 8/2008 | Ngan |
| 7,515,643 B2 | 4/2009 | Chung |
| 7,558,356 B2 | 7/2009 | Pollman et al. |
| 7,558,588 B2 | 7/2009 | To et al. |
| 7,603,127 B2 | 10/2009 | Chung et al. |
| 7,626,926 B2 | 12/2009 | Abi-Nassif et al. |
| 7,672,682 B2 | 3/2010 | Sharma et al. |
| 7,684,435 B2 | 3/2010 | Kim et al. |
| 7,715,466 B1 | 5/2010 | Oh et al. |
| 7,729,243 B2 | 6/2010 | Ananthaiyer et al. |
| 7,730,189 B2 | 6/2010 | Harikumar et al. |
| 7,751,835 B2 | 7/2010 | Sharma et al. |
| 7,801,487 B2 | 9/2010 | Mehrabanzad et al. |
| 7,831,257 B2 | 11/2010 | Pollman et al. |
| 7,835,698 B2 | 11/2010 | Eyuboglu et al. |
| 7,843,892 B2 | 11/2010 | Mehrabanzad et al. |
| 7,860,513 B2 | 12/2010 | Chung et al. |
| 7,907,571 B2 | 3/2011 | Raghothaman et al. |
| 7,920,541 B2 | 4/2011 | To et al. |
| 7,926,098 B2 | 4/2011 | Chinitz et al. |
| 7,933,619 B2 | 4/2011 | Kim |
| 7,934,001 B2 | 4/2011 | Harikumar et al. |
| 7,948,897 B2 | 5/2011 | Stuart et al. |
| 7,948,964 B1 | 5/2011 | Khlat et al. |
| 7,953,040 B2 | 5/2011 | Harikumar et al. |
| 7,983,672 B2 | 7/2011 | Humblet et al. |
| 7,983,708 B2 | 7/2011 | Mehrabanzad et al. |
| 7,995,493 B2 | 8/2011 | Anderlind et al. |
| 8,023,439 B2 | 9/2011 | Rao |
| 8,060,058 B2 | 11/2011 | Ch'ng et al. |
| 8,078,165 B2 | 12/2011 | Mate et al. |
| 8,085,696 B2 | 12/2011 | Garg et al. |
| 8,094,630 B2 | 1/2012 | Garg et al. |
| 8,099,504 B2 | 1/2012 | Cherian et al. |
| 8,111,253 B2 | 2/2012 | Rao |
| 8,130,686 B2 | 3/2012 | Rao et al. |
| 8,140,091 B2 | 3/2012 | Chung et al. |
| 8,145,221 B2 | 3/2012 | Garg et al. |
| 8,160,020 B2 | 4/2012 | Eyuboglu et al. |
| 8,160,629 B2 | 4/2012 | Mate et al. |
| 8,160,631 B2 | 4/2012 | Raghothaman et al. |
| 8,160,829 B2 | 4/2012 | Kalenine |
| 8,165,528 B2 | 4/2012 | Raghothaman et al. |
| 8,170,598 B2 | 5/2012 | Raghothaman et al. |
| 8,176,327 B2 | 5/2012 | Xiong et al. |
| 8,194,597 B2 | 6/2012 | Feder et al. |
| 8,195,187 B2 | 6/2012 | Eyuboglu et al. |
| 8,229,397 B2 | 7/2012 | Hou et al. |
| 8,229,498 B2 | 7/2012 | Ch'ng et al. |
| 8,259,671 B2 | 9/2012 | Raghothaman et al. |
| 8,280,376 B2 | 10/2012 | Rajagopalan et al. |
| 8,290,527 B2 | 10/2012 | Richardson |
| 8,295,256 B2 | 10/2012 | Humblet et al. |
| 8,295,818 B2 | 10/2012 | Palnati et al. |
| 8,311,570 B2 | 11/2012 | Richardson |
| 8,326,342 B2 | 12/2012 | Raghothaman et al. |
| 8,340,636 B2 | 12/2012 | Yin et al. |
| 8,345,694 B2 | 1/2013 | Den et al. |
| 8,346,220 B2 | 1/2013 | Mate et al. |
| 8,355,727 B2 | 1/2013 | Hoang et al. |
| 8,358,623 B2 | 1/2013 | Samar et al. |
| 8,379,566 B2 | 2/2013 | Gao et al. |
| 8,379,625 B2 | 2/2013 | Humblet |
| 8,385,291 B2 | 2/2013 | Richardson et al. |
| 8,400,989 B2 | 3/2013 | Ch'ng et al. |
| 8,402,143 B2 | 3/2013 | Ramaswamy et al. |
| 8,428,601 B2 | 4/2013 | Samar et al. |
| 8,452,299 B2 | 5/2013 | Raghothaman |
| 8,457,084 B2 | 6/2013 | Valmikam et al. |
| 8,503,342 B2 | 8/2013 | Richardson |
| 8,520,659 B2 | 8/2013 | Humblet |
| 8,532,658 B2 | 9/2013 | Knisely |
| 8,542,707 B2 | 9/2013 | Hou et al. |
| 8,543,139 B2 | 9/2013 | Samar et al. |
| 8,554,231 B2 | 10/2013 | Jones |
| 8,594,663 B2 | 11/2013 | Ch'ng et al. |
| 8,615,238 B2 | 12/2013 | Eyuboglu et al. |
| 8,615,593 B2 | 12/2013 | Ch'ng et al. |
| 8,619,702 B2 | 12/2013 | Garg et al. |
| 8,639,247 B2 | 1/2014 | Ng et al. |
| 8,670,363 B2 | 3/2014 | Tenny et al. |

(56) References Cited

U.S. PATENT DOCUMENTS

| | | | |
|---|---|---|---|
| 8,688,809 B2 | 4/2014 | Ch'ng et al. |
| 8,693,987 B2 | 4/2014 | Chiussi et al. |
| 8,705,483 B2 | 4/2014 | Liu |
| 8,718,697 B2 | 5/2014 | Srinivas et al. |
| 8,731,574 B2 | 5/2014 | Ch'ng et al. |
| 8,743,718 B2 | 6/2014 | Grenier et al. |
| 8,750,271 B2 | 6/2014 | Jones |
| 8,774,134 B2 | 7/2014 | Raghothaman et al. |
| 8,781,483 B2 | 7/2014 | Ch'ng |
| 8,798,680 B2 | 8/2014 | Kiiski et al. |
| 8,805,371 B2 | 8/2014 | Richardson et al. |
| 8,843,638 B2 | 9/2014 | Garg et al. |
| 8,873,512 B2 | 10/2014 | Richardson et al. |
| 8,886,249 B2 | 11/2014 | Richardson |
| 8,909,278 B2 | 12/2014 | Rao et al. |
| 8,923,386 B2 * | 12/2014 | Samardzija ............ H03M 7/30 375/240 |
| 8,938,636 B1 | 1/2015 | Hochschild et al. |
| 8,942,136 B2 | 1/2015 | Humblet |
| 8,953,566 B2 | 2/2015 | Hegde et al. |
| 8,958,809 B2 | 2/2015 | Nama et al. |
| 8,976,794 B2 | 3/2015 | Xiong |
| 8,982,841 B2 | 3/2015 | Srinivasan |
| 9,014,052 B2 * | 4/2015 | Gravely ................ H04W 24/02 370/254 |
| 9,072,120 B2 | 6/2015 | Voschina et al. |
| 9,078,284 B2 | 7/2015 | Richardson |
| 9,130,711 B2 | 9/2015 | He et al. |
| 9,179,360 B1 | 11/2015 | Vivanco |
| 9,230,000 B1 | 1/2016 | Hsieh et al. |
| 9,258,738 B2 * | 2/2016 | Haberland ............. G06F 9/505 |
| 9,301,198 B2 * | 3/2016 | Li ........................... G06F 9/505 |
| 9,313,827 B2 * | 4/2016 | Ilyadis ................. H04W 28/06 |
| 9,380,466 B2 | 6/2016 | Eyuboglu et al. |
| 9,414,399 B2 | 8/2016 | Eyuboglu et al. |
| 9,497,131 B2 | 11/2016 | Koskinen et al. |
| 9,497,713 B2 | 11/2016 | Yang et al. |
| 9,544,056 B2 * | 1/2017 | Cameirao ............. H04J 3/1617 |
| 9,569,253 B1 | 2/2017 | Hsieh et al. |
| 9,602,182 B2 | 3/2017 | Zhang et al. |
| 9,794,791 B2 | 10/2017 | Hasarchi et al. |
| 9,838,885 B2 | 12/2017 | Hu et al. |
| 9,877,340 B1 | 1/2018 | Park et al. |
| 9,936,470 B2 | 4/2018 | Eyuboglu et al. |
| 9,941,921 B2 * | 4/2018 | Wala ........................ H04B 1/18 |
| 9,960,821 B2 | 5/2018 | Boldi et al. |
| 10,037,346 B1 | 7/2018 | Hsieh et al. |
| 10,057,916 B2 | 8/2018 | Barabell et al. |
| 10,057,959 B2 | 8/2018 | Picard et al. |
| 10,064,072 B2 | 8/2018 | Eyuboglu et al. |
| 10,142,858 B2 | 11/2018 | Eyuboglu et al. |
| 10,142,962 B2 | 11/2018 | Lee et al. |
| 10,292,175 B2 | 5/2019 | Eyuboglu et al. |
| RE47,545 E | 7/2019 | Grenier et al. |
| 10,455,597 B2 | 10/2019 | Eyuboglu et al. |
| 10,536,959 B2 | 1/2020 | Barabell et al. |
| 10,595,260 B2 | 3/2020 | Haberland et al. |
| 10,764,846 B2 | 9/2020 | Eyuboglu et al. |
| 10,785,791 B1 | 9/2020 | Eyuboglu |
| 10,904,897 B2 | 1/2021 | Eyuboglu et al. |
| 11,082,997 B2 | 8/2021 | Barabell et al. |
| 11,102,663 B2 | 8/2021 | Eyuboglu et al. |
| 11,122,447 B2 | 9/2021 | Eyuboglu et al. |
| 11,601,951 B2 | 3/2023 | Eyuboglu et al. |
| 11,706,640 B2 * | 7/2023 | Eyuboglu ........... H04B 7/15507 370/315 |
| 11,729,758 B2 * | 8/2023 | Eyuboglu ............... H04L 27/34 370/336 |
| 2002/0009974 A1 | 1/2002 | Kuwahara et al. |
| 2002/0107031 A1 | 8/2002 | Syrjarinne et al. |
| 2002/0128009 A1 | 9/2002 | Boch et al. |
| 2002/0154055 A1 | 10/2002 | Davis et al. |
| 2002/0194605 A1 | 12/2002 | Cohen et al. |
| 2003/0084190 A1 | 5/2003 | Kimball |
| 2003/0147348 A1 | 8/2003 | Jiang |
| 2004/0068571 A1 | 4/2004 | Ahmavaara |
| 2004/0136373 A1 | 7/2004 | Bareis |
| 2004/0143442 A1 | 7/2004 | Knight |
| 2004/0146072 A1 | 7/2004 | Farmwald |
| 2004/0224637 A1 | 11/2004 | Silva et al. |
| 2005/0025160 A1 | 2/2005 | Meier et al. |
| 2005/0036254 A1 | 2/2005 | Premerlani et al. |
| 2005/0043030 A1 | 2/2005 | Shariat et al. |
| 2005/0073964 A1 | 4/2005 | Schmidt et al. |
| 2005/0073987 A1 | 4/2005 | Wu |
| 2005/0157675 A1 | 7/2005 | Feder et al. |
| 2005/0180460 A1 | 8/2005 | Hirano et al. |
| 2006/0056459 A1 | 3/2006 | Stratton et al. |
| 2006/0056559 A1 | 3/2006 | Pleasant et al. |
| 2006/0209752 A1 | 9/2006 | Wijngaarden et al. |
| 2007/0023419 A1 | 2/2007 | Ptasienski et al. |
| 2007/0058683 A1 | 3/2007 | Futami et al. |
| 2007/0071006 A1 | 3/2007 | Bosch et al. |
| 2007/0086487 A1 | 4/2007 | Yasuda et al. |
| 2007/0140218 A1 | 6/2007 | Nair et al. |
| 2007/0207838 A1 | 9/2007 | Kuwahara et al. |
| 2007/0220573 A1 | 9/2007 | Chiussi et al. |
| 2007/0230419 A1 | 10/2007 | Raman et al. |
| 2007/0242648 A1 | 10/2007 | Garg et al. |
| 2007/0297412 A1 | 12/2007 | Feng |
| 2008/0003988 A1 | 1/2008 | Richardson |
| 2008/0022180 A1 | 1/2008 | Kuo |
| 2008/0137606 A1 | 6/2008 | Zuniga et al. |
| 2008/0200202 A1 | 8/2008 | Montojo et al. |
| 2008/0233886 A1 | 9/2008 | Kaminski et al. |
| 2008/0240034 A1 | 10/2008 | Gollamudi |
| 2008/0244148 A1 | 10/2008 | Nix, Jr. et al. |
| 2009/0047913 A1 | 2/2009 | Kuru |
| 2009/0097444 A1 | 4/2009 | Lohr et al. |
| 2009/0135718 A1 | 5/2009 | Yeo et al. |
| 2009/0149189 A1 | 6/2009 | Sammour et al. |
| 2009/0149221 A1 | 6/2009 | Liu et al. |
| 2009/0161655 A1 | 6/2009 | Uppala |
| 2009/0163220 A1 | 6/2009 | Liu et al. |
| 2009/0180423 A1 | 7/2009 | Kroener |
| 2009/0180435 A1 | 7/2009 | Sarkar |
| 2009/0225743 A1 | 9/2009 | Nicholls et al. |
| 2009/0264142 A1 | 10/2009 | Sankar et al. |
| 2009/0265599 A1 | 10/2009 | Chae et al. |
| 2009/0276542 A1 | 11/2009 | Aweya et al. |
| 2009/0287976 A1 | 11/2009 | Wang et al. |
| 2009/0300453 A1 | 12/2009 | Sahara |
| 2009/0307554 A1 | 12/2009 | Marinier et al. |
| 2009/0310534 A1 | 12/2009 | Lindskog et al. |
| 2009/0316626 A1 | 12/2009 | Lee et al. |
| 2009/0327829 A1 | 12/2009 | Yang et al. |
| 2010/0011269 A1 | 1/2010 | Budianu et al. |
| 2010/0011271 A1 | 1/2010 | Giancola et al. |
| 2010/0029295 A1 | 2/2010 | Touboul et al. |
| 2010/0034135 A1 | 2/2010 | Kim et al. |
| 2010/0037115 A1 | 2/2010 | Zheng |
| 2010/0062768 A1 | 3/2010 | Lindqvist et al. |
| 2010/0067507 A1 | 3/2010 | Park |
| 2010/0069112 A1 | 3/2010 | Sun et al. |
| 2010/0098010 A1 | 4/2010 | Kuo |
| 2010/0115367 A1 | 5/2010 | Hsu |
| 2010/0118777 A1 | 5/2010 | Yamada et al. |
| 2010/0118781 A1 | 5/2010 | Petrovic et al. |
| 2010/0142494 A1 | 6/2010 | Hsu |
| 2010/0167718 A1 | 7/2010 | Chiussi et al. |
| 2010/0169732 A1 | 7/2010 | Wu |
| 2010/0177690 A1 | 7/2010 | O'Keeffe et al. |
| 2010/0178875 A1 | 7/2010 | Oh et al. |
| 2010/0185911 A1 | 7/2010 | Cheng |
| 2010/0234035 A1 | 9/2010 | Fujishima et al. |
| 2010/0246513 A1 | 9/2010 | Lindskog et al. |
| 2010/0257419 A1 | 10/2010 | Sung et al. |
| 2011/0002429 A1 | 1/2011 | Williams et al. |
| 2011/0016362 A1 | 1/2011 | Holzaepfel et al. |
| 2011/0028166 A1 | 2/2011 | Ketchum et al. |
| 2011/0081930 A1 | 4/2011 | Shimonabe et al. |
| 2011/0134862 A1 | 6/2011 | Huang et al. |
| 2011/0145672 A1 | 6/2011 | Jongren et al. |
| 2011/0170517 A1 | 7/2011 | Bakker et al. |

(56) References Cited

U.S. PATENT DOCUMENTS

| | | |
|---|---|---|
| 2011/0182255 A1 | 7/2011 | Kim et al. |
| 2011/0194548 A1 | 8/2011 | Feder et al. |
| 2011/0194630 A1 | 8/2011 | Yang et al. |
| 2011/0211447 A1 | 9/2011 | Wang et al. |
| 2011/0268007 A1 | 11/2011 | Barany et al. |
| 2011/0287791 A1 | 11/2011 | Fujishima et al. |
| 2011/0310802 A1 | 12/2011 | Song et al. |
| 2012/0057572 A1 | 3/2012 | Evans et al. |
| 2012/0127947 A1 | 5/2012 | Usui |
| 2012/0140660 A1 | 6/2012 | Kang et al. |
| 2012/0147815 A1 | 6/2012 | Meyer et al. |
| 2012/0176884 A1 | 7/2012 | Zhang et al. |
| 2012/0176966 A1 | 7/2012 | Ling |
| 2012/0176980 A1 | 7/2012 | Moon et al. |
| 2012/0176996 A1 | 7/2012 | Kim et al. |
| 2012/0177153 A1 | 7/2012 | Cheng et al. |
| 2012/0183028 A1 | 7/2012 | Han et al. |
| 2012/0188929 A1 | 7/2012 | Zhang et al. |
| 2012/0189074 A1 | 7/2012 | Jin et al. |
| 2012/0195284 A1 | 8/2012 | Mann et al. |
| 2012/0207105 A1 | 8/2012 | Geirhofer et al. |
| 2012/0208581 A1 | 8/2012 | Ishida et al. |
| 2012/0213109 A1 | 8/2012 | Xu et al. |
| 2012/0250520 A1 | 10/2012 | Chen et al. |
| 2012/0250740 A1 | 10/2012 | Ling |
| 2012/0257570 A1 | 10/2012 | Jang et al. |
| 2012/0264470 A1 | 10/2012 | Bajj et al. |
| 2012/0300635 A1 | 11/2012 | Jersenius et al. |
| 2012/0300710 A1 | 11/2012 | Li et al. |
| 2012/0300766 A1 | 11/2012 | Chen et al. |
| 2012/0327882 A1 | 12/2012 | Park et al. |
| 2012/0329400 A1 | 12/2012 | Seo et al. |
| 2013/0016686 A1 | 1/2013 | Li et al. |
| 2013/0017852 A1 | 1/2013 | Liu et al. |
| 2013/0029711 A1 | 1/2013 | Kang et al. |
| 2013/0034197 A1 | 2/2013 | Aweya et al. |
| 2013/0083768 A1 | 4/2013 | Liu et al. |
| 2013/0100907 A1 | 4/2013 | Liu |
| 2013/0100948 A1 | 4/2013 | Irvine |
| 2013/0136053 A1 | 5/2013 | Kim et al. |
| 2013/0136104 A1 | 5/2013 | Samar et al. |
| 2013/0138271 A1 | 5/2013 | Danielsson et al. |
| 2013/0170353 A1 | 7/2013 | Liu |
| 2013/0170498 A1 | 7/2013 | Danielsson et al. |
| 2013/0194985 A1 | 8/2013 | Zetterman et al. |
| 2013/0201967 A1 | 8/2013 | Nentwig |
| 2013/0223307 A1 | 8/2013 | Ohlsson et al. |
| 2013/0223365 A1 | 8/2013 | Choi et al. |
| 2013/0223391 A1 | 8/2013 | Koo et al. |
| 2013/0242837 A1 | 9/2013 | Yang et al. |
| 2013/0242919 A1 | 9/2013 | Koo et al. |
| 2013/0250869 A1 | 9/2013 | Eriksson |
| 2013/0272170 A1 | 10/2013 | Chatterjee et al. |
| 2013/0279452 A1 | 10/2013 | Liu |
| 2013/0281049 A1 | 10/2013 | Lee et al. |
| 2013/0294403 A1 | 11/2013 | Srinivasan |
| 2013/0322270 A1 | 12/2013 | Ko |
| 2013/0343332 A1 | 12/2013 | Yao |
| 2014/0003389 A1 | 1/2014 | Wang et al. |
| 2014/0006458 A1 | 1/2014 | Hsieh et al. |
| 2014/0031036 A1 | 1/2014 | Koo et al. |
| 2014/0044057 A1 | 2/2014 | Gaal et al. |
| 2014/0071868 A1 | 3/2014 | Bergquist et al. |
| 2014/0086112 A1 | 3/2014 | Stern-Berkowitz et al. |
| 2014/0098797 A1 | 4/2014 | Kanamarlapudi et al. |
| 2014/0126438 A1 | 5/2014 | Zhu et al. |
| 2014/0147125 A1 | 5/2014 | Chow |
| 2014/0161070 A1 | 6/2014 | Chang et al. |
| 2014/0162664 A1 | 6/2014 | Stapleton et al. |
| 2014/0177549 A1 | 6/2014 | Knisely |
| 2014/0185601 A1 | 7/2014 | Ilyadis |
| 2014/0192826 A1 | 7/2014 | Zampetti |
| 2014/0198684 A1 | 7/2014 | Gravely et al. |
| 2014/0211690 A1 | 7/2014 | Nama et al. |
| 2014/0212269 A1 | 7/2014 | Kastner et al. |
| 2014/0219162 A1 | 8/2014 | Eyuboglu et al. |
| 2014/0219255 A1 | 8/2014 | Eyuboglu et al. |
| 2014/0219267 A1 | 8/2014 | Eyuboglu et al. |
| 2014/0226736 A1 | 8/2014 | Niu et al. |
| 2014/0241315 A1 | 8/2014 | Niu et al. |
| 2014/0321406 A1 | 10/2014 | Marinier et al. |
| 2015/0011219 A1 | 1/2015 | Saily et al. |
| 2015/0023284 A1 | 1/2015 | Zhao et al. |
| 2015/0085720 A1 | 3/2015 | Gaal et al. |
| 2015/0085796 A1 | 3/2015 | Xu et al. |
| 2015/0124769 A1 | 5/2015 | Zhang et al. |
| 2015/0172023 A1 | 6/2015 | Yang et al. |
| 2015/0193282 A1 | 7/2015 | Blocksome |
| 2015/0256297 A1 | 9/2015 | Yang et al. |
| 2015/0304960 A1 | 10/2015 | Yang et al. |
| 2015/0373729 A1 | 12/2015 | Lee et al. |
| 2016/0037550 A1 | 2/2016 | Barabell et al. |
| 2016/0044548 A1 | 2/2016 | Choi et al. |
| 2017/0077607 A1 | 3/2017 | Han et al. |
| 2017/0163330 A1 | 6/2017 | Raleigh et al. |
| 2017/0311350 A1 | 10/2017 | Chatterjee et al. |
| 2017/0317790 A1 | 11/2017 | Yao et al. |
| 2018/0007709 A1 | 1/2018 | Seo et al. |
| 2018/0097659 A1 | 4/2018 | Hanson |
| 2019/0075576 A1 | 3/2019 | Eyuboglu et al. |
| 2020/0092901 A1 | 3/2020 | Barabell et al. |
| 2020/0351806 A1 | 11/2020 | Eyuboglu et al. |
| 2021/0100009 A1 | 4/2021 | Eyuboglu et al. |
| 2021/0136784 A1 | 5/2021 | Eyuboglu et al. |
| 2021/0314975 A1 | 10/2021 | Barabell et al. |
| 2021/0345137 A1 | 11/2021 | Eyuboglu et al. |
| 2022/0303854 A1 | 9/2022 | Salkintzis et al. |
| 2022/0417878 A1 | 12/2022 | Eyuboglu et al. |
| 2023/0078813 A1 | 3/2023 | Eyuboglu et al. |
| 2023/0254840 A1 | 8/2023 | Eyuboglu et al. |

FOREIGN PATENT DOCUMENTS

| | | | |
|---|---|---|---|
| CN | 101106766 A | 1/2008 | |
| CN | 101534507 A | 9/2009 | |
| CN | 101622811 A | 1/2010 | |
| CN | 101945399 A | 1/2011 | |
| CN | 102111180 A | 6/2011 | |
| CN | 102281642 A | 12/2011 | |
| CN | 102340823 A | 2/2012 | |
| CN | 102347827 A | 2/2012 | |
| CN | 103026648 A | 4/2013 | |
| CN | 103369582 A | 10/2013 | |
| CN | 103548409 A | 1/2014 | |
| CN | 108541360 A | 9/2018 | |
| EP | 1134935 A2 | 9/2001 | |
| EP | 2101528 A1 | 9/2009 | |
| EP | 2352264 A1 | 9/2011 | |
| EP | 2448355 A1 | 5/2012 | |
| EP | 2753143 A1 | 7/2014 | |
| EP | 2787646 A1 | 10/2014 | |
| GB | 2515969 A * | 1/2015 | ............ H04W 16/18 |
| WO | 2008144363 A3 | 3/2009 | |
| WO | 2010078811 A1 | 7/2010 | |
| WO | 2012156482 A1 | 11/2012 | |
| WO | 2014124160 A2 | 8/2014 | |
| WO | 2014153125 A1 | 9/2014 | |
| WO | 2015191530 A2 | 12/2015 | |
| WO | 2017100096 A1 | 6/2017 | |

OTHER PUBLICATIONS

U.S. Patent and Trademark Office, "Notice of Allowance", U.S. Appl. No. 13/767,292, Nov. 30, 2017, pp. through 31, Published: EP.

U.S. Patent and Trademark Office, "Notice of Allowance", U.S. Appl. No. 14/734,311, Aug. 23, 2017, pp. 1 through 19, Published: US.

U.S. Patent and Trademark Office, "Notice of Allowance", U.S. Appl. No. 14/734,311, Dec. 14, 2017, pp. 1 through 14, Published: US.

(56) References Cited

OTHER PUBLICATIONS

U.S. Patent and Trademark Office, "Notice of Allowance", U.S. Appl. No. 14/734,311, Apr. 19, 2018, pp. 1 through 12, Published: US.
U.S. Patent and Trademark Office, "Notice of Allowance", U.S. Appl. No. 14/961,448, May 15, 2020, pp. 1 through 20, Published: US.
U.S. Patent and Trademark Office, "Notice of Allowance", U.S. Appl. No. 15/189,473, Apr. 25, 2018, pp. 1 through 13, Published: US.
U.S. Patent and Trademark Office, "Notice of Allowance", U.S. Appl. No. 15/191,005, Mar. 20, 2018, pp. 1 through 13, Published: US.
U.S. Patent and Trademark Office, "Notice of Allowance", U.S. Appl. No. 15/191,005, Jul. 31, 2018, pp. 1 through 10, Published: US.
U.S. Patent and Trademark Office, "Notice of Allowance", U.S. Appl. No. 15/230,936, Feb. 9, 2018, pp. 1 through 10, Published: US.
U.S. Patent and Trademark Office, "Notice of Allowance", U.S. Appl. No. 15/230,936, Apr. 22, 2019, pp. 1 through 13, Published: US.
U.S. Patent and Trademark Office, "Notice of Allowance", U.S. Appl. No. 15/230,936, Jul. 2, 2018, pp. 1 through 15, Published: US.
U.S. Patent and Trademark Office, "Notice of Allowance", U.S. Appl. No. 15/230,936, Aug. 9, 2019, pp. 1 through 22, Published: US.
U.S. Patent and Trademark Office, "Notice of Allowance", U.S. Appl. No. 15/230,936, Oct. 29, 2018, pp. 1 through 15, Published: US.
U.S. Patent and Trademark Office, "Notice of Allowance", U.S. Appl. No. 15/231,384, Nov. 28, 2018, pp. 1 through 15, Published: US.
U.S. Patent and Trademark Office, "Notice of Allowance", U.S. Appl. No. 15/942,285, Apr. 21, 2020, pp. 1 through 18, Published: US.
U.S. Patent and Trademark Office, "Notice of Allowance", U.S. Appl. No. 16/040,253, Sep. 18, 2019, pp. 1 through 17, Published: US.
U.S. Patent and Trademark Office, "Notice of Allowance", U.S. Appl. No. 16/152,255, May 17, 2021, pp. 1 through 27, Published: US.
U.S. Patent and Trademark Office, "Notice of Allowance", U.S. Appl. No. 16/152,266, Jun. 2, 2021, pp. 1 through 30, Published: US.
U.S. Patent and Trademark Office, "Notice of Allowance", U.S. Appl. No. 16/182,392, Oct. 15, 2020, pp. 1 through 17, Published: US.
U.S. Patent and Trademark Office, "Notice of Allowance", U.S. Appl. No. 16/692,860, May 5, 2021, pp. 1 through 14, Published: US.
U.S. Patent and Trademark Office, "Notice of Allowance", U.S. Appl. No. 16/934,852, Jan. 13, 2022, pp. 1 through 8, Published: US.
U.S. Patent and Trademark Office, "Notice of Allowance", U.S. Appl. No. 16/934,852, May 2, 2022, pp. 1 through 10, Published: US.
U.S. Patent and Trademark Office, "Notice of Allowance", U.S. Appl. No. 17/119,870, Feb. 27, 2023, pp. 1 through 84, Published US.
U.S. Patent and Trademark Office, "Notice of Allowance", U.S. Appl. No. 17/119,889, Jul. 13, 2022, pp. 1 through 126, Published: US.
U.S. Patent and Trademark Office, "Notice of Allowance", U.S. Appl. No. 17/119,889, Oct. 18, 2022, pp. 1 through 16, Published: US.
U.S. Patent and Trademark Office, "Notice of Allowance", U.S. Appl. No. 17/374,666, Mar. 6, 2023, pp. 1 through 21, Published: US.
U.S. Patent and Trademark Office, "Notice of Allowance", U.S. Appl. No. 18/048,736, Mar. 29, 2023, pp. 1 through 79, Published: US.
U.S. Patent and Trademark Office, "Notice of Panel Decision from Pre-Appeal Brief Review", U.S. Appl. No. 13/762,292, Apr. 12, 2017, pp. 1 through 2, Published: US.
U.S. Patent and Trademark Office, "Office Action", U.S. Appl. No. 13/762,283, Nov. 21, 2014, pp. 1 through 39, Published: US.
U.S. Patent and Trademark Office, "Office Action", U.S. Appl. No. 13/762,284, Oct. 23, 2014, pp. 1 through 14, Published: US.
U.S. Patent and Trademark Office, "Office Action", U.S. Appl. No. 13/762,292, Dec. 30, 2015, pp. 1 through 25, Published: US.
U.S. Patent and Trademark Office, "Office Action", U.S. Appl. No. 14/734,311, Jul. 14, 2016, pp. 1 through 66, Published: US.
U.S. Patent and Trademark Office, "Office Action", U.S. Appl. No. 14/961,448, Aug. 7, 2019, pp. 1 through 48, Published: US.
U.S. Patent and Trademark Office, "Office Action", U.S. Appl. No. 14/961,448, Aug. 16, 2017, pp. 1 through 74, Published: US.
U.S. Patent and Trademark Office, "Office Action", U.S. Appl. No. 14/961,448, Jan. 22, 2019, pp. 1 through 39, Published: US.
U.S. Patent and Trademark Office, "Office Action", U.S. Appl. No. 15/189,473, Dec. 13, 2017, pp. 1 through 53, Published: US.
U.S. Patent and Trademark Office, "Office Action", U.S. Appl. No. 15/191,005, Sep. 27, 2017, pp. 1 through 48, Published: US.
U.S. Patent and Trademark Office, "Office Action", U.S. Appl. No. 15/230,936, Jan. 12, 2017, pp. 1 through 10, Published: US.
U.S. Patent and Trademark Office, "Office Action", U.S. Appl. No. 15/230,936, Jun. 15, 2017, pp. 1 through 60, Published: US.
U.S. Patent and Trademark Office, "Office Action", U.S. Appl. No. 15/231,384, Jul. 12, 2018, pp. 1 through 82, Published: US.
U.S. Patent and Trademark Office, "Office Action", U.S. Appl. No. 15/942,285, Nov. 19, 2019, pp. 1 through 92, Published: US.
U.S. Patent and Trademark Office, "Office Action", U.S. Appl. No. 16/040,253, Feb. 1, 2019, pp. 1 through 68, Published: US.
U.S. Patent and Trademark Office, "Office Action", U.S. Appl. No. 16/152,255, Jan. 2, 2020, pp. 1 through 93, Published: US.
U.S. Patent and Trademark Office, "Office Action", U.S. Appl. No. 16/152,266, Jan. 2, 2020, pp. 1 through 86, Published: US.
U.S. Patent and Trademark Office, "Office Action", U.S. Appl. No. 16/182,392, May 21, 2020, pp. 1 through 69, Published: US.
U.S. Patent and Trademark Office, "Office Action", U.S. Appl. No. 16/182,392, Dec. 31, 2019, pp. 1 through 105, Published: US.
U.S. Patent and Trademark Office, "Office Action", U.S. Appl. No. 16/692,860, Jan. 21, 2021, pp. 1 through 93, Published: US.
U.S. Patent and Trademark Office, "Office Action", U.S. Appl. No. 17/119,870, Jul. 8, 2022, pp. 1 through 141, Published: US.
U.S. Patent and Trademark Office, "Office Action", U.S. Appl. No. 17/345,219, Feb. 13, 2023, pp. 1 through 103, Published: US.
State Intellectual Property Office, P.R. China, "Notification of the First Office Action", from CN Application No. 202110764898.X, Jun. 3, 2023, from Foreign Counterpart to U.S. Appl. No. 14/734,311, pp. 1 through 11, Published: CN.
European Patent Office, "Extended European Search Report from EP Application No. 221516644", from Foreign Counterpart to U.S. Appl. No. 13/762,283, May 12, 2022, pp. 1 through 11, Published: EP.
European Patent Office, "Extended European Search Report", from EP Application No. 201519912, from Foreign Counterpart to U.S. Appl. No. 14/734,311, Apr. 17, 2020, pp. 1 through 10, Published: EP.
European Patent Office, "Extended European Search Report", from EP Application No. 212027700, from Foreign Counterpart to U.S. Appl. No. 13/762,283, Mar. 14, 2022, pp. 1 through 15, Published: EP.
European Patent Office, "Notice of Publication from EP Application No. 14707024.7 dated Nov. 18, 2015", from Foreign Counterpart to U.S. Appl. No. 13/762,284, Nov. 18, 2015, pp. 1, Published: EP.
European Patent Office, "Summons to attend oral proceedings pursuant to Rule 115(1) from EP Application No. 14707024.7", from Foreign Counterpart to U.S. Appl. No. 13/762,283, Oct. 23, 2020, pp. 1 through 14, Published: EP.

(56) References Cited

OTHER PUBLICATIONS

Fujitsu, "Standardisation impact of antenna virtualization schemes in DL JP CoMP", R1-112659, 3GPP TSG RAN WG1 meeting #66, Athens, Greece, Aug. 22-26, 2011, pp. 1 through 5.

Garner, "IEEE 1588 Version 2", ISPCS, Sep. 24, 2008, pp. 1 through 89.

Haberland et al., "Base Stations in the Cloud", Alcatel-Lucent, Sep. 28, 2012, pp. 1 through 23, www.alcatel-lucent.com.

Intellectual Property India "Office Action" from IN Application No. 202128013444, from Foreign counterpart to U.S. Appl. No. 14/734,311, Feb. 24, 2022, pp. 1 through 5, Published: IN.

Intellectual Property India "Office Action" from IN Application No. 202128013669, from Foreign counterpart to U.S. Appl. No. 14/734,311, Feb. 24, 2022, pp. 1 through 5, Published: IN.

Intellectual Property India, "Office Action" from IN Application No. 201727000804, Sep. 29, 2020, from Foreign Counterpart to U.S. Appl. No. 14/734,311, pp. 1 through 7, Published: IN.

International Bureau, "Notification Concerning Transmittal of International Preliminary Report on Patentability from PCT Application No. PCT/US2014/015137 mailed Aug. 20, 2015", from Foreign Counterpart to U.S. Appl. No. 13/762,283, Aug. 20, 2015, pp. 1 through 13, Published: Switzerland.

International Searching Authority, "International Preliminary Report on Patentability from PCT Application No. PCT/US2015/034829 mailed Dec. 22, 2016", "from Foreign Counterpart of U.S. Appl. No. 14/734,311", Dec. 22, 2016, pp. 1 through 11, Published in: WO.

International Searching Authority, "International Preliminary Report on Patentability from PCT Application No. PCT/US2016/064750 mailed Jun. 21, 2018", "from Foreign Counterpart of U.S. Appl. No. 14/961,448", Jun. 21, 2018, pp. 1 through 11, Published in: WO.

International Searching Authority, "International Search Report from PCT Application No. PCT/US2014/015137 dated Sep. 22, 2014", from Foreign Counterpart to U.S. Appl. No. 13/762,283, Sep. 22, 2014, pp. 1 through 18, Published: EP.

International Searching Authority, "International Search Report from PCT Application No. PCT/US2015/034829 dated Dec. 8, 2015", from Foreign Counterpart to U.S. Appl. No. 14/734,311, Dec. 8, 2015, pp. 1 through 14, Published: EP.

International Searching Authority, "Invitation to Pay Additional Fees from PCT Application No. PCT/US2014/015137 dated Aug. 4, 2014", from Foreign Counterpart to U.S. Appl. No. 13/762,283, Aug. 4, 2014, pp. 1 through 8, Published: EP.

International Searching Authority, "Invitation to Pay Additional Fees from PCT Application No. PCT/US2015/034829 dated Oct. 1, 2015", from Foreign Counterpart to U.S. Appl. No. 14/734,311, Oct. 1, 2015, pp. 1 through 6, Published: EP.

International Searching Authority, "Notification of Transmittal of the International Search Report and Written Opinion of the International Searching Authority from PCT Application No. PCT/US2016/064750 dated Mar. 8, 2017", from Foreign Counterpart to U.S. Appl. No. 14/961,448, Mar. 8, 2017, pp. 1 through 14, Published: KR.

Ma et al., "Radiostar: Providing Wireless Coverage Over Gigabit Ethernet", Bell Labs Technical Journal, 2009, pp. 1 through 18, vol. 14, No. 1, Wiley Periodicals.

Namba et al., "Colony-RAN Architecture for Future Cellular Network", Future Network & MobileSummit 2012 Conference Proceedings, Jul. 4, 2012, pp. 1 through 8, IIMC International Information Management Corporation, 2012.

Newpostcom, "Uplink control signaling for CoMP scenario", 3GPP TSG RAN WG1 Meeting #68bis, R1-121341, Jeju, Korea, Mar. 26-30, 2012, pp. 1 through 6.

Nokia, "ARQ operation with HARQ-ARQ interaction", Document # R2-062765, 3GPP TSG-RAN WG2 Meeting #55, Seoul, Korea, Oct. 9-13, 2006, pp. 1 through 8.

State Intellectual Property Office, P.R. China, "Notice of Allowance from CN Application No. 201680080837.9 dated Dec. 15, 2020", from Foreign Counterpart to U.S. Appl. No. 14/961,448, pp. 1 through 2, Published: CN.

State Intellectual Property Office, P.R. China, "Notice to Grant" from CN Application No. 201580040533.5, Jun. 2, 2021, from Foreign Counterpart to U.S. Appl. No. 14/734,311, pp. 1 through 3, Published: CN.

U.S Patent and Trademark Office, "Corrected Notice of Allowability", U.S. Appl. No. 13/762,292, Dec. 15, 2017, pp. 1 through 6, Published: US.

U.S. Patent and Trademark Office, Advisory Action from U.S. Appl. No. 14/961,448, Dated Aug. 16, 2018, pp. 1 through 7, Published in: US.

U.S. Patent and Trademark Office, "Advisory Action", U.S. Appl. No. 13/762,292, Feb. 6, 2017, pp. 1 through 4, Published: US.

U.S. Patent and Trademark Office, "Advisory Action", U.S. Appl. No. 14/734,311, Jun. 20, 2017, pp. 1 through 2, Published: US.

U.S. Patent and Trademark Office, "Corrected Notice of Allowability from U.S. Appl. No. 15/230,936 mailed Aug. 24, 2018" pp. 1 through 10, Published in: US.

U.S. Patent and Trademark Office, "Corrected Notice of Allowability", U.S. Appl. No. 15/191,005, Aug. 15, 2018, pp. 1 through 6, Published: US.

U.S. Patent and Trademark Office, "Corrected Notice of Allowability", U.S. Appl. No. 15/230,936, Mar. 9, 2018, pp. 1 through 26, Published: US.

U.S. Patent and Trademark Office, "Corrected Notice of Allowability", U.S. Appl. No. 15/231,384, Jan. 17, 2019, pp. 1 through 6, Published: US.

U.S. Patent and Trademark Office, "Ex Parte Quayle", U.S. Appl. No. 16/934,852, Oct. 13, 2021, pp. 1 through 97, Published: US.

U.S. Patent and Trademark Office, "Examiner-Initiated Interview Summary from U.S. Appl. No. 14/734,311 mailed Mar. 23, 2017", p. 1, Published in: US.

U.S. Patent and Trademark Office, "Final Office Action", U.S. Appl. No. 13/762,283, Aug. 21, 2015, pp. 1 through 47, Published: US.

U.S. Patent and Trademark Office, "Final Office Action", U.S. Appl. No. 13/762,292, Sep. 27, 2016, pp. 1 through 18, Published: US.

U.S. Patent and Trademark Office, "Final Office Action", U.S. Appl. No. 14/734,311, Apr. 7, 2017, pp. 1 through 53, Published: US.

U.S. Patent and Trademark Office, "Final Office Action", U.S. Appl. No. 14/961,448, Feb. 20, 2020, pp. 1 through 46, Published: US.

U.S. Patent and Trademark Office, "Final Office Action", U.S. Appl. No. 14/961,448, Mar. 13, 2018, pp. 1 through 47, Published: US.

U.S. Patent and Trademark Office, "Final Office Action", U.S. Appl. No. 15/230,936, Nov. 8, 2017, pp. 1 through 48, Published: US.

U.S. Patent and Trademark Office, "Final Office Action", U.S. Appl. No. 16/040,253, Jul. 11, 2019, pp. 1 through 33, Published: US.

U.S. Patent and Trademark Office, "Final Office Action", U.S. Appl. No. 16/152,255, Feb. 4, 2021, pp. 1 through 28, Published: US.

U.S. Patent and Trademark Office, "Final Office Action", U.S. Appl. No. 16/152,266, Feb. 3, 2021, pp. 1 through 26, Published: US.

U.S. Patent and Trademark Office, "Notice of Allowability", U.S. Appl. No. 14/734,311, May 1, 2018, pp. 1 through 8, Published: US.

U.S. Patent and Trademark Office, "Notice of Allowance", U.S. Appl. No. 13/762,283, Apr. 1, 2016, pp. 1 through 9, Published: US.

U.S. Patent and Trademark Office, "Notice of Allowance", U.S. Appl. No. 13/762,284, May 8, 2015, pp. 1 through 5, Published: US.

U.S. Patent and Trademark Office, "Notice of Allowance", U.S. Appl. No. 13/762,284, Aug. 26, 2015, pp. 1 through 12, Published: US.

U.S. Patent and Trademark Office, "Notice of Allowance", U.S. Appl. No. 13/762,284, Dec. 18, 2015, pp. 1 through 7, Published: US.

U.S. Patent and Trademark Office, "Notice of Allowance", U.S. Appl. No. 13/762,292, Feb. 25, 2016, pp. 1 through 6, Published: US.

"3rd Generation Partnership Project; Technical Specification Group Radio Access Network; Evolved Universal Terrestrial Radio Access (E-UTRA); Requirements for support of radio resource management", 3GPP, Mar. 2008, pp. 1 through 25, 3GPP Organizational Partners.

"3rd Generation Partnership Project; Technical Specification Group Radio Access Network; Evolved Universal errestrial Radio Access (E-UTRA); Base Station (BS) radio transmission and reception", 3GPP, Dec. 2007, pp. 1 through 47, 3GPP Organizational Partners.

(56) References Cited

OTHER PUBLICATIONS

"Small Cell Virtualization Functional Splits and Use Cases", Small Cell Forum, Jun. 2015, pp. 1 through 58, www.smallcellforum.com.
Australian Government IP Australia, "Examination report No. 1 for standard patent application from AU Application No. 2019205993", from Foreign Counterpart to U.S. Appl. No. 14/734,311, Jun. 15, 2020, pp. 1 through 4, Published: AU.
Australian Government IP Australia, "Examination report No. 1 for standard patent application from AU Application No. 2021201369", from Foreign Counterpart to U.S. Appl. No. 16/692,860, Nov. 4, 2021, pp. 1 through 2, Published: AU.
Australian Government IP Australia, "Examination report No. 1 for standard patent application", from AU Application No. 2022201683, from Foreign Counterpart to U.S. Appl. No. 14/734,311, Feb. 7, 2023, pp. 1 through 3, Published: AU.
Australian Government IP Australia, "Examination report No. 1 for your standard patent application", from AU Application No. 2022204338, from Foreign Counterpart U.S. Appl. No. 14/734,311, Feb. 27, 2023, pp. 1 through 4, Published: AU.
Australian Government IP Australia, "Notice of acceptance for patent application from AU Application No. 2015274867", from Foreign Counterpart to U.S. Appl. No. 14/734,311, Apr. 16, 2019, pp. 1 through 3, Published: AU.
Australian Government IP Australia, "Notice of acceptance for patent application", from AU Application No. 2015205993, from Foreign Counterpart to U.S. Appl. No. 14/734,311, Dec. 3, 2020, pp. 1 through 3, Published: AU.
Australian Government IP Australia, "Notice of acceptance for patent application", from AU Application No. 2021201369, Mar. 15, 2022 from Foreign Counterpart to U.S. Appl. No. 14/734,311, pp. 1 through 3, Published: AU.
Australian Government IP Australia, "Office Action from AU Application No. 2015274867 dated Sep. 24, 2018", from Foreign Counterpart to PCT Application No. PCT/US2015/034829, Sep. 24, 2018, pp. 1 through 3, Published: AU.
Belhouchet et al., "46 Wireless Systems, LTE Technology, Session 3: LTE Overview—Design Targets and Multiple Access Technologies", ITU/BDT Arab Regional Workshop, Jan. 27-19, 2010, Tunisia, pp. 1 through 82, ERT.
Canadian Intellectual Property Office, "Office Action from CA Application No. 2,938,949", from Foreign Counterpart to U.S. Appl. No. 13/762,283, Oct. 22, 2020, pp. 1 through 5, Published: CA.
Canadian Intellectual Property Office, "Office Action from CA Application No. 2,938,949", from Foreign Counterpart to U.S. Appl. No. 13/762,283, Aug. 24, 2021, pp. 1 through 5, Published: CA.
Canadian Intellectual Property Office, "Office Action from CA Application No. 2,951,548", from Foreign Counterpart to U.S. Appl. No. 14/734,311, May 20, 2021, pp. 1 through 4, Published: CA.
Canadian Intellectual Property Office, "Office Action from CA Application No. 2938949", from Foreign Counterpart to U.S. Appl. No. 13/762,283, Dec. 16, 2019, pp. 1 through 3, Published: CA.
Canadian Intellectual Property Office, "Office Action from CA Application No. 3,084,571", from Foreign Counterpart to U.S. Appl. No. 13/762,283, Jul. 12, 2021, pp. 1 through 6, Published: CA.
Canadian Intellectual Property Office, "Office Action from CA Application No. 3,084,571", from Foreign Counterpart to U.S. Appl. No. 13/762,283, Apr. 4, 2022, pp. 1 through 6, Published: CA.
Canadian Intellectual Property Office, "Office Action", Dec. 5, 2022, from CA Application No. 2,951,548, from Foreign Counterpart to U.S. Appl. No. 14/734,311, pp. 1 through 4, Published: CA.
Canadian Intellectual Property Office, "Office Action" from CA Application No. 2,938,949, Jun. 29, 2022, from Foreign Counterpart to U.S. Appl. No. 13/762,283, pp. 1 through 5, Published: CA.
Canadian Intellectual Property Office, "Office Action" from CA Application No. 2,951,548, from Foreign Counterpart to U.S. Appl. No. 14/734,311, Feb. 9, 2022, pp. 1 through 6, Published: CA.
Canadian Intellectual Property Office, "Office Action", from CA Application No. 3,132,456, from Foreign Counterpart to U.S. Appl. No. 13/762,283, Dec. 2, 2022, pp. 1 through 3, Published: CA.
China National Intellectual Property Administration, "First Office Action from CN Application No. 201580040533.5 mailed Jun. 26, 2019", from Foreign Counterpart to U.S. Appl. No. 16/040,253, pp. 1 through 29, Published: CN.
China National Intellectual Property Administration, "First Office Action from CN Application No. 201680080837.9", from Foreign Counterpart to U.S. Appl. No. 14/961,448, Jun. 30, 2020, pp. 1 through 31, Published: CN.
China National Intellectual Property Administration, "Rejection Decision from CN Appication No. 201580040533.5", from Foreign Counterpart to U.S. Appl. No. 14/734,311, Sep. 3, 2020, pp. 1 through 15, Published: CN.
China National Intellectual Property Administration, "Second Office Action from CN Application No. 201580040533.5", from Foreign Counterpart to U.S. Appl. No. 14/734,311, Jan. 21, 2020, pp. 1 thiough 17, Published: CN.
China National Intellectual Property Administration, "Third Office Action from CN Application No. 201580040533.5", from Foreign Counterpart to U.S. Appl. No. 14/734,311, Feb. 5, 2021, pp. 1 through 17, Published: CN.
Dotsch, et al., "Quantitative Analysis of Split Base Station Processing and Determination of Advantageous Architectures for LTE", Bell Labs Technical Journal, 2013, pp. 1 through 24, vol. 18, No. 1, Wiley Periodicals.
Eidson, John, "IEEE-1588 Standard for a Precision Clock Synchronization Protocol for Networked Measurement and Control Systems—A Tutorial—", Oct. 10, 2005, Agilent Technologies, pp. 1 through 94, (c) 2005, Agilent Technologies.
Eidson, John, "IEEE-1588 Standard Version 2—A Tutorial—", Oct. 2, 2006, Agilent Technologies, pp. 1 through 21, (c) 2006, Agilent Technologies.
European Patent Office, "Communication pursuant to Article 94(3) EPC from EP Application No. 16175956.8", from Foreign Counterpart to U.S. Appl. No. 13/762,283, Mar. 25, 2021, pp. 1 through 5, Published: EP.
European Patent Office, "Communication pursuant to Article 94(3) EPC" from EP Application No. 15731443.6, Feb. 5, 2019, from Foreign Counterpart to U.S. Appl. No. 14/734,311, Feb. 5, 2019, pp. 1 through 5, Published: EP.
European Patent Office, "Communication pursuant to Article 94(3) EPC", from EP Application No. 15731443.6 dated Mar. 21, 2018, from Foreign Counterpart to U.S. Appl. No. 14/734,311, Mar. 21, 2018, pp. 1 through 7, Published: EP.
European Patent Office, "Communication pursuant to Article 94(3) EPC", from EP Application No. 20151997.2, from Foreign Counterpart to U.S. Appl. No. 14/734,311, Apr. 20, 2021, pp. 1 through 7, Published: EP.
European Patent Office, "Communication pursuant to Article 94(3) from EP Application No. 14707024.7 dated Oct. 5, 2016", from Foreign Counterpart to U.S. Appl. No. 13/762,283, Oct. 5, 2016, pp. 1 through 6, Published: EP.
European Patent Office, "Communication pursuant to Article 94(3) from EP Application No. 14707024.7 mailed May 2, 2018", "from Foreign Counterpart of U.S. Appl. No. 13/762,283", May 2, 2018, pp. 1 through 5, Published in: EP.
European Patent Office, "Communication pursuant to Article 94(3) from EP Application No. 14707024.7", from Foreign Counterpart to U.S. Appl. No. 13/762,283, May 23, 2019, pp. 1 through 8, Published: EP.
European Patent Office, "Communication pursuant to Article 94(3) from EP Application No. 16175955.0", from Foreign Counterpart to U.S. Appl. No. 13/762,283, Feb. 10, 2020, pp. 1 through 6, Published: EP.
European Patent Office, "Communication pursuant to Article 94(3) from EP Application No. 16175956.8", from Foreign Counterpart to U.S. Appl. No. 13/762,283, Feb. 10, 2020, pp. 1 through 8, Published: EP.

(56) References Cited

OTHER PUBLICATIONS

European Patent Office, "Communication under Rule 71(3) EPC from EP Application No. 14707024.7", from Foreign Counterpart to U.S. Appl. No. 13/762,283, Jul. 2, 2021, pp. 1 through 151, Published: EP.
European Patent Office, "Communication under Rule 71(3) EPC from EP Application No. 16175955.0", from Foreign Counterpart to U.S. Appl. No. 13/762,283, Apr. 29, 2021, pp. 1 through 165, Published: EP.
European Patent Office, "Communication under Rule 71(3) EPC from EP Application No. 16175955.0", from Foreign Counterpart to U.S. Appl. No. 13/762,283, Oct. 25, 2021, pp. 1 through 144, Published: EP.
European Patent Office, "Communication under Rule 71(3) EPC from EP Application No. 16873637.9", from Foreign Counterpart to U.S. Appl. No. 14/961,448, Mar. 9, 2020, pp. 1 through 45, Published: EP.
European Patent Office, "Communication under Rule 71(3) EPC" from EP Application No. 16175956.8, from Foreign Counterpart to U.S. Appl. No. 13/762,283, Jun. 28, 2020, pp. 1 through 283, Published: EP.
European Patent Office, "Communication under Rule 71(3) EPC", from EP Application No. 15731443.6, from Foreign Counterpart to U.S. Appl. No. 14/734,311, Oct. 16, 2019, pp. 1 through 204, Published: EP.
European Patent Office, "Communication under Rule 71(3) EPC", from EP Application No. 16175956.8, from Foreign Counterpart to U.S. Appl. No. 13/762,283. Dec. 21, 2022, pp. 1 through 146, Published: EP.
European Patent Office, "Communication under Rule 71(3) EPC", from EP Application No. 20151997.2, from Foreign Counterpart to U.S. Appl. No. 14/734,311, Nov. 28, 2022, pp. 1 through 202, Published: EP.
European Patent Office, "Extended European Search Report from EP Application No. 16175955.0 dated Oct. 10, 2016", from Foreign Counterpart to U.S. Appl. No. 13/762,283, Oct. 10, 2016, pp. 1 through 10, Published: EP.
European Patent Office, "Extended European Search Report from EP Application No. 16175956.8 dated Oct. 10, 2016", from Foreign Counterpart to U.S. Appl. No. 13/762,283, Oct. 10, 2016; pp. 1 through 10, Published: EP.
European Patent Office, "Extended European Search Report from EP Application No. 16873637.9 mailed Jul. 5, 2019", from Foreign Counterpart to U.S. Appl. No. 14/961,448, pp. 1 through 13, Published: EP.
European Patent Office, "Extended European Search Report", from EP Application No. 23158855.9, from Foreign Counterpart to U.S. Appl. No. 14/734,311, May 31, 2023, pp. 1 through 11, Published: EP.

U.S. Patent and Trademark Office, "Office Action", U.S. Appl. No. 17/898,938, Aug. 28, 2023, pp. 1 through 85, Published: US.
U.S. Patent and Trademark Office, "Office Action", U.S. Appl. No. 18/301,651, Nov. 30, 2023, pp. 1 through 87, Published: US.
U.S. Patent and Trademark Office, "Final Office Action", U.S. Appl. No. 17/345,219, Aug. 17, 2023, pp. 1 through 29, Published: US.
U.S. Patent and Trademark Office, "Office Action", U.S. Appl. No. 17/374,666, Sep. 29, 2022, pp. 1 through 103, Published: US.
U.S. Patent and Trademark Office, "Restriction Requirement", U.S. Appl. No. 13/762,292, May 27, 2015, pp. 1 through 6, Published: US.
U.S. Patent and Trademark Office, "Restriction Requirement", U.S. Appl. No. 15/942,285, Aug. 14, 2019, pp. 1 through 6, Published: US.
U.S. Patent and Trademark Office, "Restriction Requirement", U.S. Appl. No. 16/182,392, Oct. 17, 2019, pp. 1 through 7, Published: US.
U.S. Patent and Trademark Office, "Supplemental Notice of Allowability from U.S. Appl. No. 15/189,473 mailed Jun. 13, 2018" pp. 1 through 8, Published: US.
U.S. Patent and Trademark Office, "Supplemental Notice of Allowability from U.S. Appl. No. 15/189,473 mailed Jun. 5, 2018" pp. 1 through 6, Published in: US.
U.S. Patent and Trademark Office, "Supplemental Notice of Allowability from U.S. Appl. No. 15/191,005 mailed Mar. 29, 2018" pp. 1 through 6, Published in: US.
U.S. Patent and Trademark Office, "Supplemental Notice of Allowability from U.S. Appl. No. 15/191,005 mailed Jun. 5, 2018" pp. 1 through 6, Published in: US.
U.S. Patent and Trademark Office, "Supplemental Notice of Allowability", U.S. Appl. No. 15/191,005, Apr. 11, 2018, pp. 1 through 8, Published: US.
Zhu, ZhenBo et al., "Virtual Base Station Pool: Towards a Wireless Network Cloud for Radio Access Networks", May 17-19, 2010, pp. 1 through 10, Published in: Bertinoro, Italy.
O-RAN Alliance, "O-RAN Working Group 4 (Open Fronthaul Interfaces WG) Control, User and Synchronization Plane Specification, ORAN, WG4.CUS.0-v08.01 Technical Specification", Revised Apr. 28, 2022, pp. Cover through 335, Published: DE.
Canadian Intellectual Property Office, "Office Action", dated Jun. 11, 2024 from CA Application No. 2,951,5482,938,949, from Foreign Counterpart to U.S. Appl. No. 14/734,311, pp. 1 through 4, Published: CA.
China National Intellectual Property Administration, "Notification of the Second Office Action", dated May 30, 2024 from CN Application No. 202110764898.X, from Foreign Counterpart to U.S. Appl. No. 14/734,311, pp. 1 through 17, Published: CN.

\* cited by examiner

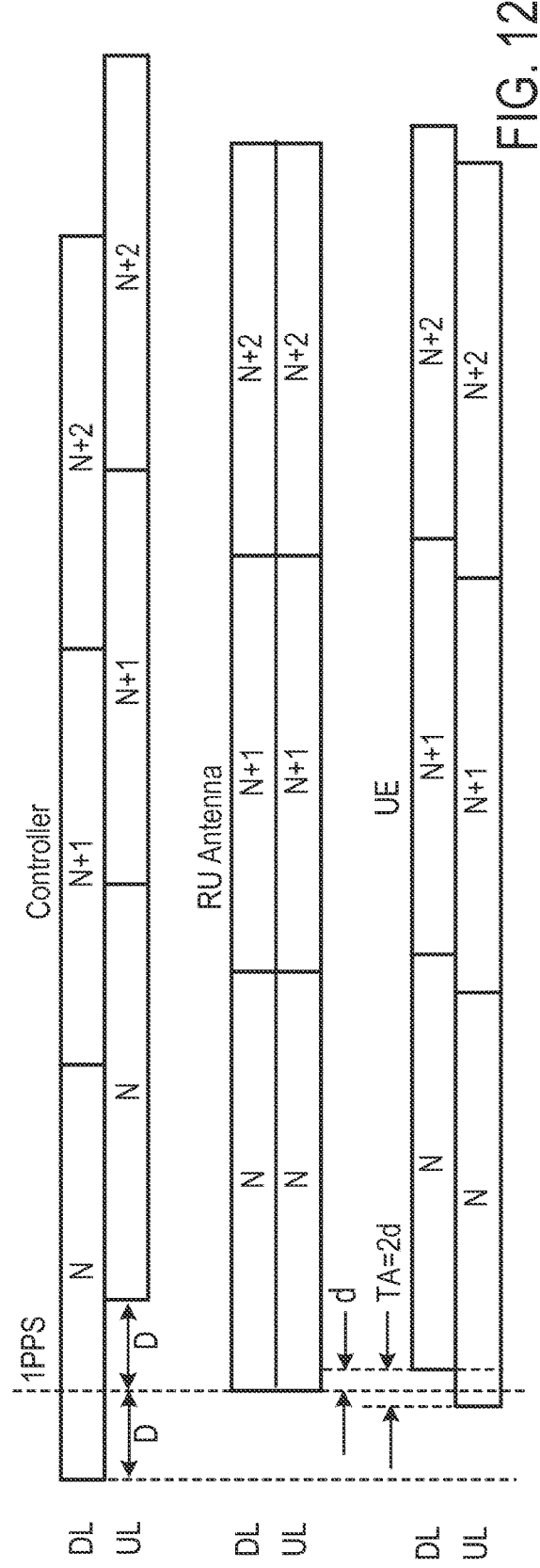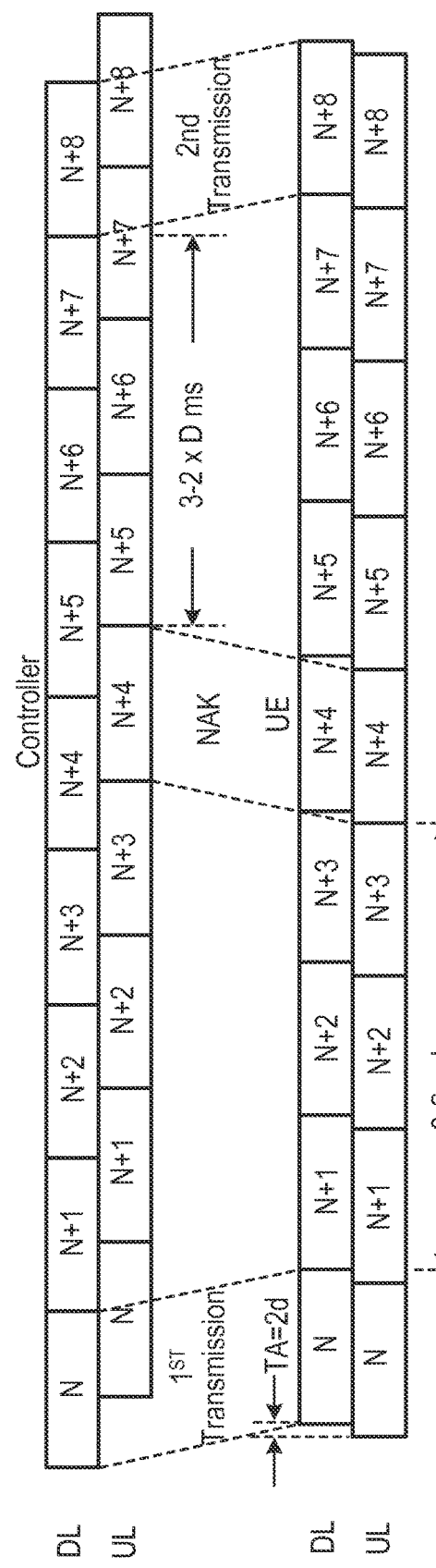

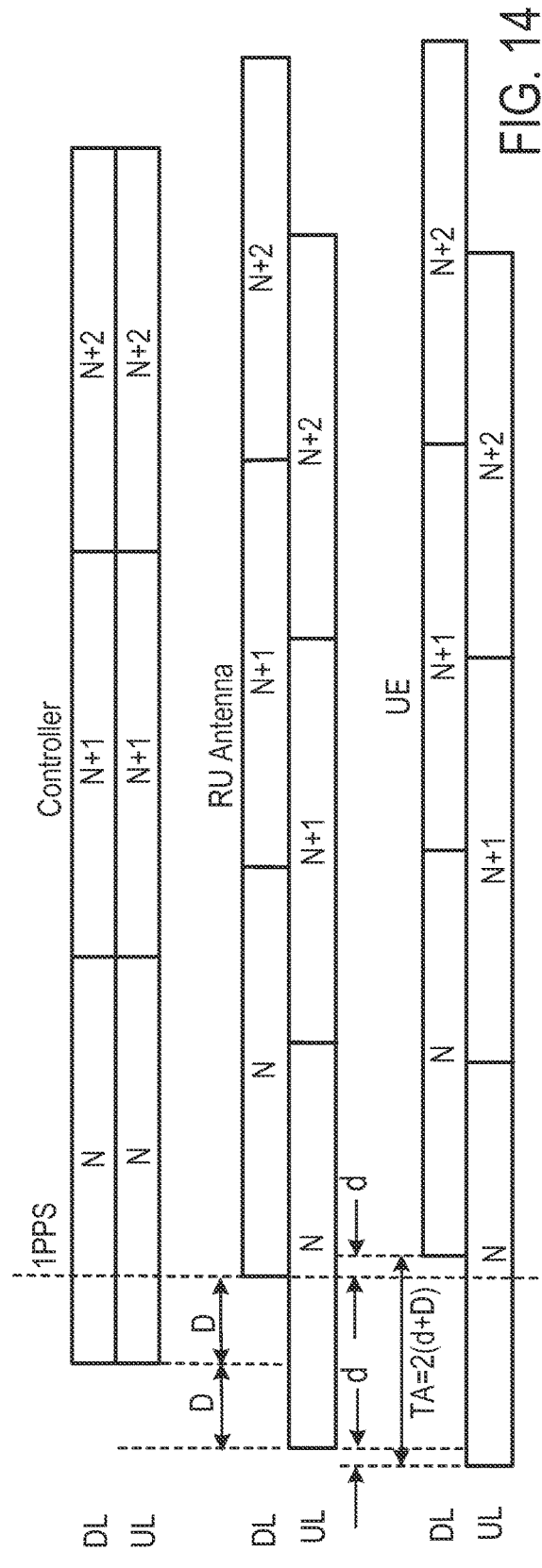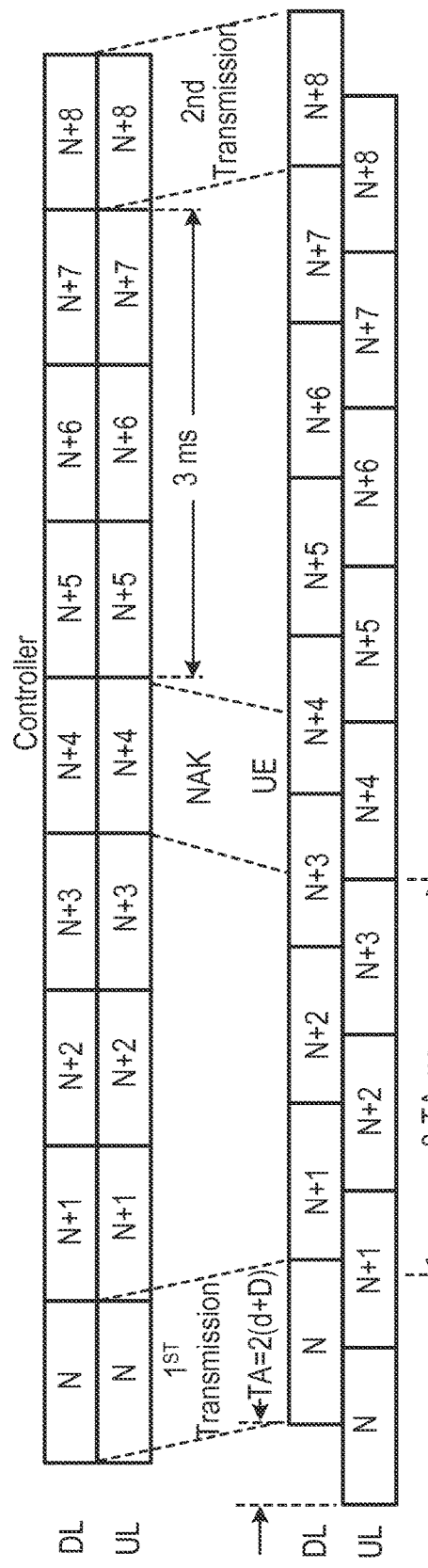
FIG. 14
FIG. 15

RADIO ACCESS NETWORKS

CROSS-REFERENCE TO RELATED APPLICATIONS

This application is a continuation of U.S. application Ser. No. 17/374,666, filed on Jul. 13, 2021 and titled "RADIO ACCESS NETWORKS," which is a continuation of U.S. application Ser. No. 16/152,266, filed on Oct. 4, 2018 and titled "RADIO ACCESS NETWORKS" (issued on Aug. 24, 2021 as U.S. Pat. No. 11,102,663) which is a continuation of U.S. application Ser. No. 15/191,005, filed on Jun. 23, 2016 and titled "RADIO ACCESS NETWORKS" (issued on Nov. 27, 2018 as U.S. Pat. No. 10,142,858), which is a continuation of U.S. application Ser. No. 13/762,284, filed on Feb. 7, 2013 and titled "RADIO ACCESS NETWORKS" (issued on Jun. 28, 2016 as U.S. Pat. No. 9,380,466), the contents of all of which are hereby incorporated by reference.

TECHNICAL FIELD

This disclosure relates to radio access networks.

BACKGROUND

The widespread use of mobile devices, such as smartphones, has increased the demand for mobile data transmission capacity and for consistent and high-quality radio frequency (RF) coverage at in-building and other densely populated locations. Traditionally, inside buildings, mobile operators rely on a Distributed Antenna System (DAS) to allow users to connect to the operators' networks for voice and data transmission.

SUMMARY

In one aspect, this disclosure features a communication system comprising remote units and a controller. Each of the remote units comprises one or more radio frequency (RF) units to exchange RF signals with mobile devices. At least some of the RF signals comprise information destined for, or originating from, a mobile device. The controller comprises one or more modems and is connected to an external network. At least one of the modems is a baseband modem and is configured to pass first data corresponding to the information. The at least one of the modems is configured to perform real-time scheduling of the first data corresponding to the information. The controller is separated from the remote units by an intermediate network. The intermediate network comprises a switched Ethernet network over which second data corresponding to the information is carried in frames between the controller and the remote units.

In another aspect, this disclosure features a communication system comprising remote units, a reference timing source, a controller, a controller clock, and a remote unit clock. The remote units exchange radio frequency (RF) signals with mobile devices. At least some of the RF signals comprise information destined for, or originating from, a mobile device. The reference timing source is synchronized with a coordinated universal time (UTC) or a Global Positioning System (GPS). The controller comprises one or more modems and is connected to an external network. At least one of the modems is a baseband modem and is configured to pass first data corresponding to the information. The controller is separated from the remote units by an intermediate network over which second data corresponding to the information is transmitted in frames between the controller and the remote units. The second data comprises baseband data. The controller clock is synchronized with the reference timing source. The controller clock provides timing information to the controller. The remote unit clock is synchronized with the controller clock. The remote unit clock provides timing information to a remote unit. The controller and the remote unit are configured to transmit time stamp messages to synchronize the controller clock and the remote unit clock. The controller and the remote units are configured to transmit the time stamp messages by avoiding contention between time stamp transmissions and baseband data transmissions or between time stamp transmissions of different remote units to the controller.

In another aspect, the disclosure features a communication system comprising remote units and a controller. The remote units exchange radio frequency (RF) signals with mobile devices. At least some of the RF signals comprise information destined for, or originating from, a mobile device. The controller comprises one or more modems and is connected to an external network. At least one of the modems is a baseband modem and is configured to pass first data corresponding to the information. The controller is separated from the remote units by an intermediate network over which second data corresponding to the information is carried in frames between the controller and the remote units. The second data comprises baseband data and the intermediate network is configured to transport in frames baseband data. At least some of the baseband data is compressed in a frequency domain. The remote units and the controller are configured to compress the baseband data for transmission over the intermediate network.

The aspects of the disclosure may also include one or more of the following features. The intermediate network comprises multiple switches. The external network comprises the Internet. The mobile devices are cellular communication devices that communicate using the long term evolution (LTE) standard. The remote units are configured to perform some modem functionality. The controller is devoid of RF radio functionality. The switched Ethernet network comprises multiple switches. At least one of the multiple switches is connected to at least one remote unit over a 1 gigabit/second Ethernet link. Each remote unit comprises multiple RF antennas and is configured to transmit and/or receive RF signals from one or more mobile devices simultaneously over one or more radio channels. The controller comprises one or more processing devices, the one or more processing devices being programmed to associate one or more of the modems with one or more of the remote units to thereby configure communication cells that comprise one or more remote units. The one or more processing devices are programmed to associate one or more of the modems with one or more of the remote units to thereby configure the communication cells dynamically. The one or more modems control a set of the remote units through the switched Ethernet network to form a cell, each remote unit in the cell comprising one or more antennas, the one or more antennas being associated with a common cell identifier. The common cell identifier comprises the long term evolution (LTE) Cell-ID. All remote units associated with the cell are configured to communicate over a single long term evolution (LTE) channel. Each remote unit associated with the cell comprises a pair of antennas, and at least two pairs of antennas of remote units associated with the cell are controllable to communicate with a single pair of antennas on a single mobile device. Each remote unit associated with the cell comprises one or more antennas. Each antenna corresponds to a virtual antenna port. All antennas assigned to a same virtual antenna port simulcast a common signal. The remote units assigned to the same virtual antenna port carry the same LTE downlink reference signals associated with the same virtual antenna port. The virtual antenna port includes a Channel State Information Reference Signal (CSI-RS) scrambling ID. The mobile device sends more than one Channel State Information (CSI) feedback. Each of the antennas of the remote units is assigned to a different virtual antenna port. The remote units in the cell are synchronized to communicate using a same frequency. The remote units in the cell are configured to implement a network-based synchronization protocol to effect synchronization. The controller comprises one or more processing devices, the one or more processing devices being programmed to modify an association of one or more of the modems with one or more of the remote units to thereby re-configure existing communication cells defined by one or more remote units. Re-configuring existing communication cells comprises splitting at least one existing communication cell into two or more new communication cells. Re-configuring existing communication cells comprises combining at least two existing communication cells into a single new communication cell. The controller is configured to modify the association based on commands received from a management system. The controller is configured to modify the association based on time-of-day. The controller is configured to modify the association based on changes in a distribution of demand for communication capacity. The cell is configured to virtually split to send data to two or more mobile devices on the same resources without substantial interference based on radio frequency isolation between the two or more mobile devices. The resources are time-frequency resources of long term evolution (LTE). The controller is configured to determine which mobile devices to send data on the same resource based on signals received from the mobile devices. The mobile devices comprise receivers and the data sent to the receivers by the remote units in the cell is not on the time-frequency resource. The cell is configured to virtually split to receive information from two or more mobile devices on the same resources without substantial interference based on radio frequency isolation between the two or more mobile devices. Two or more mobile devices use the same demodulation reference sequence. The two or more mobile devices use the same PUCCH resource consisting of a cyclic shift and orthogonal cover code. The controller is configured to detect RACH preamble transmissions from the two or more mobile devices sent in the same PRACH opportunity. The controller comprises one or more processing devices, the one or more processing devices being programmed to associate one or more additional modems with one or more of the remote units in response to a change in demand for communication capacity. In response to a decrease in demand for network capacity, the one or more processing devices are programmed to consolidate the one or more remote units among a decreased number of the one or more modems. The cell is a first cell and the modem is a first modem; and the one or more modems comprise a second modem programmed to control a second set of the remote units through the switched Ethernet network to form a second cell, each RF unit in the second cell comprising one or more second antennas, the one or more second antennas being associated with a second common cell identifier. The first cell and the second cell comprise different numbers of remote units, different shapes, and/or transmit radio signals covering different sized areas. The controller comprises one or more processing devices, the one or more processing devices being programmed to associate the first and second modems with different remote units in order to dynamically change shape and/or an area covered by each of the first cell or the second cell. The first and second modems are co-located with the controller, and the controller coordinates the transmissions of the first and second modems to reduce interference between the first and second cells. At least one remote unit is configured to exchange Wi-Fi signals with a corresponding device. The controller comprises one or more processing devices, the one or more processing devices being programmed to receive second data from the switched Ethernet network and to process the second data to generate first data. At least some of the remote units are configured to receive power through the switched Ethernet network. The controller and the remote units are configured to communicate using the IEEE1588 protocol. The communication system also includes a network manager in communication with the controller that directs operation of the controller. The external network comprises an operator's core network and the network manager is located in the operator's core network. The network manager is located locally with respect to the controller. Two or more remote units are configured to send the second data to a mobile device on two or more RF channels so that the mobile receives the second data simultaneously from the two or more remote units. The controller is configured to aggregate communication from different channels between the controller and the remote units and the controller and the external network to process the first data and to send the second data to the remote units.

The aspects of the disclosure may also include one or more of the following features. The first data comprises Internet Protocol (IP) data and the controller is configured to perform real-time media access control of the IP data corresponding to the information. The reference timing source comprises a GPS receiver. The GPS receiver is located in the controller. The controller and the remote units are configured to exchange time stamps using the IEEE 1588 protocol. The controller and the remote units comprise a system-on-chip to generate and process the time stamp messages. The intermediate network is a switched Ethernet network. The remote unit uses the time stamp messages to estimate and correct an error of the remote unit clock. The estimation is based on a priori knowledge about downlink and uplink time stamp delays. The a priori knowledge about the downlink and uplink time stamp delays comprises a ratio of the downlink time stamp delay to the uplink time stamp delay. The a priori knowledge about the downlink and uplink time stamp delays comprises a ratio of an average downlink time stamp delay to an average uplink time stamp delay. The error comprises a timing phase error and the remote unit is configured to estimate the timing phase error by weighting and/or offsetting measured time stamps in the uplink and the downlink according to the a priori knowledge. The time stamp messages are transmitted with high priority according to the IEEE 802.1q protocol. The time stamp messages and the baseband data are transmitted on different virtual local area networks (VLANs). The time stamp messages and the baseband data are transmitted on the same virtual local area network (VLAN) using different priority markings of the IEEE 802.1q protocol. The baseband data and the time stamp messages are transmitted using dedicated Ethernet ports and dedicated Ethernet links of the switched Ethernet network. The communication system comprises a plurality of controllers and one of the controllers is a master controller and is configured to transmit the time stamp messages with remote units associated with the master controller and with remote units associated with the other controllers of the plurality of controllers. The controller is configured to advance in time a subframe of baseband data to be delivered to a remote unit to compensate a time delay between the remote unit clock and the controller clock. The controller is configured to advance in time the subframe of baseband data for a pre-determined amount. The pre-determined amount is determined based on a time delay for transmitting the baseband data over the intermediate network. The controller is configured to send information to the mobile devices for the mobile devices to advance a timing phase of the RF signals to be transmitted to the remote units relative to the RF signals received by the mobile devices from the remote units. The controller is configured to increase processing time available to the controller for the controller to process the baseband data transmissions by choosing an amount of the timing phase to be advanced to be greater than a time delay for transmitting RF signals in a round trip between a remote unit and a mobile device. A remote unit is configured to advance in time subframes of the baseband data to be transmitted to the controller. The remote units are configured to communicate with the controller on a communication channel, and a frequency of the communication channel is derived from the controller clock. The controller clock comprises a crystal oscillator configured to generate clocks for baseband processing in the controller. The remote unit clock comprises a crystal oscillator configured to generate clocks for analog-digital-analog converters (A/D/As), RF synthesizers, and/or baseband processing in each remote unit. The controller and the remote unit are configured to transmit time stamp messages in multiple round-trips between the controller and the remote unit. The remote unit is configured to adjust the remote unit clock based on one of the transmissions in multiple round-trips that is deemed to be most reliable to correct an offset between the controller clock and the remote unit clock. The one of the transmissions in multiple round-trips that is deemed to be most reliable comprises a transmission that predicts a smallest offset between the controller clock and the remote unit clock. The remote unit is configured to not to make any correction to the remote unit clock when an estimate of an offset between the controller clock and the remote unit clock based on the transmissions of the time stamp messages is deemed to be unreliable. The estimate of the offset is deemed to be unreliable when the estimate exceeds a pre-configured threshold. The controller clock is in direct coupling with the reference timing source and the remote unit clock is not in direct coupling with the reference timing source.

The aspects of the disclosure may also include one or more of the following features. A rate of transmission of the baseband data over the intermediate network is at most 1 Gb/s. The baseband data is represented by complex-valued signals having real and imaginary components, and the controller is configured to compress the baseband data by quantizing the complex-valued signals in the frequency domain to produce quantized baseband data, and to transmit binary data representative of the quantized baseband data to the remote units. The remote units are configured to reconstruct the quantized baseband data upon receipt of the compressed baseband data. The remote units are configured to apply an inverse fast Fourier transform on the reconstructed baseband data. The controller is configured to quantize the baseband data in the frequency domain using a quantizer having a fixed rate and a fixed step size. The controller is configured to quantize independently the real and imaginary components of the baseband data in the frequency domain. The controller is configured to send information about the fixed rate and the fixed step size to the remote units when the remote units and the controller are connected. The controller is configured to quantize the baseband data in the frequency domain using a quantizer having a fixed rate and an adjustable step size. The controller is configured to send side information about the fixed rate and a step size to a remote unit once per subframe. The controller is configured to quantize the baseband data in the frequency domain using a quantizer having a rate and a step size. The rate and the step size both are adjustable. The controller adjusts the step size according to energy of the quantized baseband data. The controller adjusts the rate according to a modulation and coding scheme of the baseband data. The RF signals are compatible with the long term evolution (LTE) standard. The controller is configured to send side information about the rate of the quantizer to a remote unit for each of plural resource element groups (REG) and physical resource blocks (PRB) in each orthogonal frequency-division multiplexing (OFDM) symbol of a subframe. The controller is configured to compress the baseband data by not sending to the remote units any data for unused resource element groups (REGs) or physical resource blocks (PRBs) in each orthogonal frequency-division multiplexing (OFDM) symbol of the baseband data. The baseband data in the frequency domain belongs to, or is derived from, a discrete-amplitude signal constellation, and the controller is configured to compress the baseband data without quantization by sending binary data representing the discrete-amplitude signals to the remote units. The discrete-amplitude signal constellation comprises a quadrature amplitude modulation (QAM) signal constellation. The RF signals carry orthogonal frequency-division multiplexing (OFDM) symbols, and the controller is configured to send the binary data to the remote units in the same order as the corresponding OFDM symbols are to be transmitted by the remote units over the air to the mobile devices. The remote units are configured to compress the baseband data by quantizing the baseband data in the frequency domain to produce quantized baseband data, and to transmit binary data representative of the quantized baseband data to the controller. A remote unit is configured to receive data in time domain from the mobile device and to apply a fast Fourier transform to the data in the time domain to produce the baseband data in the frequency domain. A remote unit is configured to quantize the baseband data in the frequency domain using a quantizer having a fixed rate and a fixed step size. A remote unit is configured to quantize the baseband data in the frequency domain using a quantizer having a fixed rate and an adjustable step size. The frames of the baseband data comprise orthogonal frequency-division multiplexing (OFDM) symbols and the remote unit is configured to select a step size based on an average energy of the quantized baseband data. The average energy is an average of energies of baseband data that belong to a long term evolution (LTE) channel. The remote unit is configured to select a step size based on a distribution of the baseband data in the frequency domain. The remote unit is configured to send side information about the quantizer to the controller for the controller to reconstruct the received quantized baseband data. A remote unit is configured to quantize the baseband data in the frequency domain using a quantizer having a rate and a step size, the rate and the step size both being adjustable. The frames of the baseband data comprise subframes comprising LTE physical resource blocks (PRBs), and the remote unit is configured to adjust the rate of the quantizer on a per PRB basis. The remote unit is configured to select a quantizer rate based on a modulation and coding scheme of the baseband data determined by the controller. The remote units are configured to quantize the baseband data using quantizers having adjustable rates. The quantizer rates for the baseband data are adjusted according to the LTE resource blocks. The quantizer rates are chosen to be zero to purge transmissions of the baseband data for some of the resource blocks. The controller is configured to send side information to the remote units and the information is used by the remote units to determine the quantizer rates. The controller is configured to determine the side information to be sent to the remote units based on information received from the mobile devices. The controller is configured to determine the side information based on a target signal-to-noise plus interference ratio (SINR) at the controller. The information received from the mobile devices corresponds to LTE Sounding Reference Signal (SRS) transmissions by the mobile devices. The information received from the mobile devices corresponds to LTE Physical Random Access Channel (PRACH) transmissions by the mobile devices. The information received from the mobile devices corresponds to uplink transmission on the Physical Uplink Shared Channel (PUSCH) by the mobile devices. A remote unit comprises two or more receiver antennas for receiving the RF signals from the mobile devices, and the remote unit is configured to quantize the baseband data corresponding to the different antennas using different quantizers. The quantizers for different antennas have different step sizes. The quantizers for different antennas have different step sizes and different rates. The different rates are determined by the controller. The controller is configured to send side information to the remote unit to indicate the determined quantizer rate for each receive antenna. A remote unit comprises two or more receiver antennas for receiving the RF signals from the mobile devices. The remote unit is configured to quantize the baseband data using a quantizer having a rate selected based on correlation of the RF signals received at different receivers of the remote unit. The controller is configured to determine a coefficient based on the correlation of the RF signals and to determine the rate of the quantizer using the coefficient. The remote unit is configured to determine the rate of the quantizer using a coefficient determined by the controller based on the correlation of the RF signals. The remote unit is configured to determine a coefficient based on the correlation of the RF signals and to determine the rate of the quantizer using the coefficient. All baseband data except for those corresponding to Physical Random Access Channel (PRACH) transmissions from a mobile device is compressed in the frequency domain. A remote unit is configured to compress the baseband data by quantizing the received PRACH transmissions after performing a correlation in the frequency domain. The remote unit is configured to compress the baseband data by quantizing the received PRACH transmissions in a time-domain after converting an output of the correlation back into the time domain. At least one modem of the controller is configured to execute real-time media access control (MAC) functions for the IP data corresponding to the information.

Other features, objects, and advantages of the disclosure will be apparent from the description and drawings, and from the claims.

DESCRIPTION OF DRAWINGS

FIG. 12 is a diagram showing an example of subframes boundaries.

FIG. 13 is a diagram showing an example of downlink hybrid automatic repeat request (HARQ) operation.

FIG. 14 is a diagram showing an example of subframe alignment.

FIGS. 15 and 16 are diagrams showing examples of HARQ timing for the downlink and the uplink, respectively.

DETAILED DESCRIPTION

Figure 1:
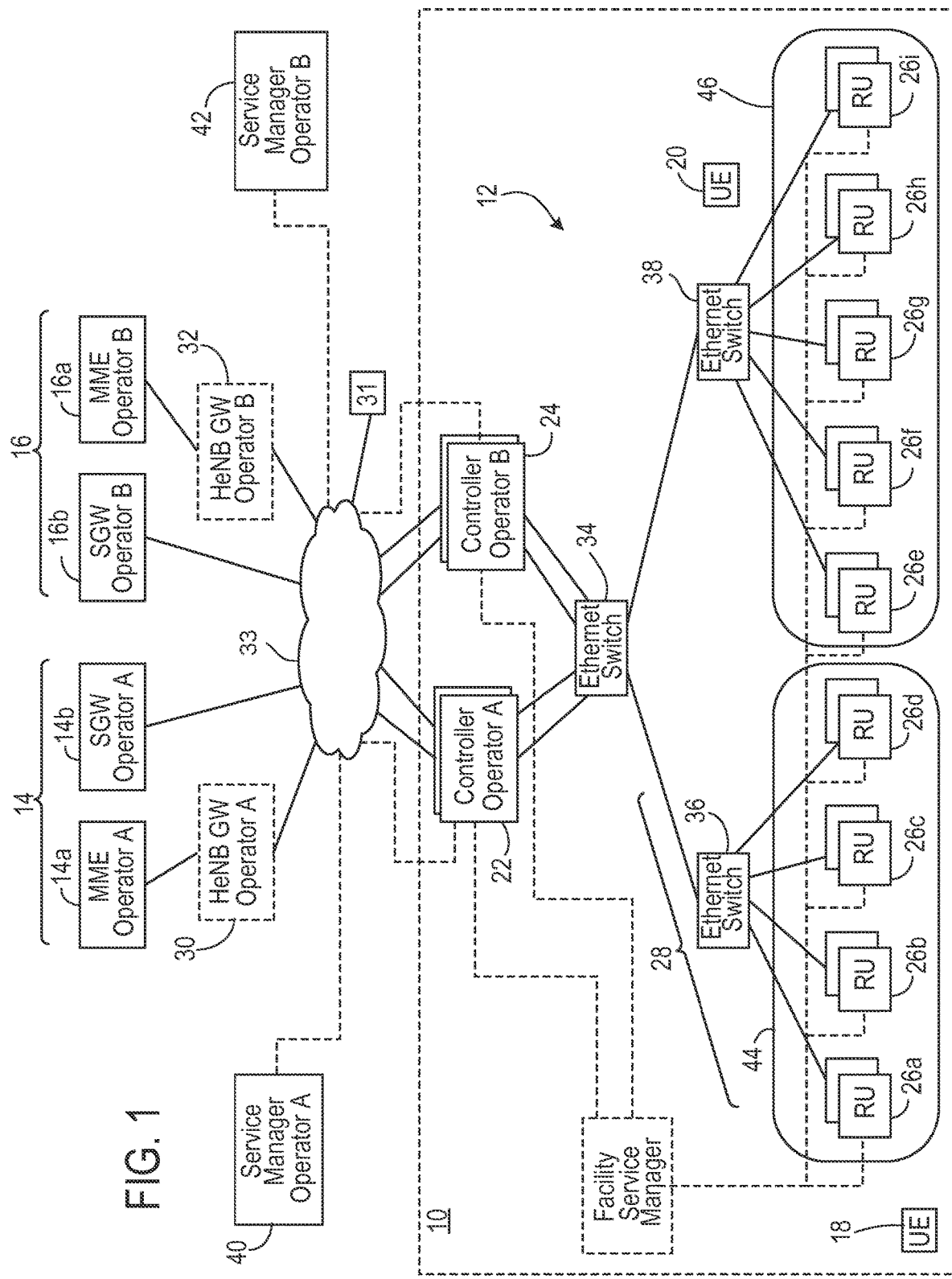
FIG. 1 is a block diagram of an example of a radio network.

Referring to FIG. 1, a radio network 12 is deployed on a site 10 so that one or more mobile operators, such as operator A 14, operator B 16, can provide mobile network access to one or more user equipments (UE(s)) 18, 20, such as smartphones, at the site 10. The site may be an enterprise or corporate building, a public venue, such as a hotel, hospital, university campus, or even an outdoor area such as a ski area, a stadium or a densely-populated downtown area. The radio network 12 includes controllers (each of which can also be referred as a Controller Unit (CU)) 22, 24 and Remote Units (RU) 26a-26i connected by an Ethernet network 28. The CUs 22, 24 are connected (backhauled) to the operator's core network, which may include nodes defined in the Long Term Evolution (LTE) standard such as the mobility management entity (MME) 14*a*, 16*a* and Serving Gateways (SGW) 14*b*, 16*b*, optionally through Home eNodeB gateways (HeNB GW) 30, 32. The CUs may connect to the operator's core network via the Internet or other IP-based packet transport network 33 (for the purpose of discussion, we may only refer to the network 33 as the Internet, although other networks are possible). The CUs may also include certain MME functionality (not shown) and SGW functionality (not shown), thus allowing traffic to flow directly between the UE and a destination node 31 on the Internet or on the local IP network at the site 10 without traversing the operator's core network.

Each CU 22, 24 performs the functions of a base station, except for certain baseband modem and RF functions that are performed by the RUs. Each CU also manages one or more of the RUs. Each CU may be associated with a mobile operator such that the RUs they manage may operate on a spectrum that belongs to that mobile operator. It is also possible for a CU to be shared between multiple mobile operators. Among other things, the CUs will schedule traffic to/from the UEs. Each CU 22, 24 is also connected to a service manager 40, 42, which is typically located in operator's core network. The service manager is responsible for the configuration, activation and monitoring of the radio network. There may also be a local facility service manager, which can allow a local IT personnel to install and maintain the radio network. The RUs 26*a*-26*i* contain the RF transceivers to transmit RF signals to and from the user equipment and perform RF front-end functions, among other functions.

Generally, a traditional base station, such as a traditional small cell, includes a Radio Frequency (RF) unit, a digital baseband modem unit and a network processing unit. Such a traditional base station performs both the RF functionality and the baseband processing. In some implementations, one or more traditional base stations can be in communication with a centralized controller. The baseband functionalities can be split between the traditional base station and the centralized controller of the traditional base station(s) such that the centralized controller performs only the upper layer (e.g., layer 3 or higher) processing functions of the baseband functionality.

The CUs of the disclosure do not perform any RF functions. Each CU can include one or more baseband modems each for performing functions of all layers of baseband functionalities, including the Media Access Control (MAC) layer (Layer 2) processing, and upper layer (Layer 3 and above) processing. For example, real-time scheduling, which is part of the MAC layer is performed by a baseband modem of a CU of the disclosure. Baseband modems may also perform physical layer (Layer 1) processing. In addition, the baseband modems or the CUs may also perform other functions similar to the traditional base station, such as the function of the network processing unit, e.g., processing Internet Protocol (IP) data.

In some implementations, real-time scheduling refers to assigning user data to time and/or frequency resources based on CSI. In downlink scheduling, CSI is supplied by the UE. In the LTE standard, the downlink CSI may include a Channel Quality Indicator (CQI), Precoding Matrix Indicator (PMI) or Rank Indicator (RI). In uplink scheduling, CSI is determined by the controller based on transmissions received from the UEs. In the LTE standard, uplink CSI may be determined based on the signals transmitted by the UE, for example the Sounding Reference Signal (SRS). The baseband modem functions performed by the controller may also include downlink error control coding, uplink error control decoding, uplink multi-antenna diversity combining of signals received by different RUs, channel estimation, and other upper layer functions related to the wireless transmission or reception.

The CUs and the RUs of the network 12 perform distinctive functions in the radio network and are connected by the Ethernet network 28. The CUs 22, 24 determine the capacity of the data/signal transmission at the site 10, while the RUs 26*a*-26*i* provide RF/signal coverage to the site 10.

The CUs 22, 24 contain one or more processors on which software is stored to instruct the processors to perform certain network and baseband modem functions. The processors can be hardware formed by Integrated Circuits (ICs) and other electrical components. Each CU 22, 24 contains one or more baseband modem processors (see FIGS. 2A and 2B) or is configured to perform the functions of one or more baseband modems. Each baseband modem may be implemented on one or multiple processors. When a baseband modem is implemented on multiple processors, each processor may be responsible for processing the signals associated with selected groups of UEs. The CUs are configured to perform no RF functionality. The RUs are controlled by the CUs and are implemented by hardware blocks, such as radio transceivers (see, FIGS. 2A and 2B).

The RUs may have transmit antennas that are integral to them or the antennas may be external and connect to the RUs via antenna cables. There may be less software functionality running on the RUs as compared to the CUs 22, 24. In some implementations, the RUs are configured to perform no baseband modem functionality. In other implementations, the RUs may perform some baseband modem functionality. For example, in the LTE standard, the RUs may implement the Fast Fourier Transform (FFT) and the Inverse FFT (IFFT) functions. In some implementations, RUs may perform additional downlink baseband modem functions. The baseband modems in the CUs and the RUs are connected through a standard off-the-shelf switched Ethernet network 28 with one or more Ethernet switches 34, 36, 38. In some implementations, all CUs and RUs at the site 10 are connected to each other through the Ethernet network 28.

One or more RUs together with a baseband modem in a given CU form a physical cell. In the example shown in FIG. 1, a cell 44 includes RUs 26*a*-26*d* controlled by one or more baseband modems (not shown) in the CU 22, and a cell 46 includes RUs 26*e*-26*i* controlled by one or more baseband modems (not shown) in the CU 24. The RUs 26*a*-26*i* can be deployed at different locations of the site 10, e.g., different rooms, floors, buildings, etc., to provide a RF coverage across the site as uniformly as possible. Each CU may have one or more baseband modems and can control one or more cells. Nominally each baseband modem has the data transmission capacity of a single LTE sector. The number of baseband modems available at the site determines the data capacity that can be delivered to the site.

The radio network 12 of FIG. 1 can be implemented with various air interface technologies. Currently, 4G LTE is expected to become the dominant wireless technology around the globe. LTE is a standard developed by 3GPP, a standards organization. The first version of the LTE standard was made available in 3GPP Release 8. Subsequently, the LTE standard was refined in Releases 9 and 10. Release 11 is currently under development and several more releases of the standard will be developed in the future. In the remainder of this disclosure, we use 3GPP Releases 8-11 for the LTE standard as examples in describing the implementations of the radio networks. However, the radio networks and other systems and methods of this disclosure can be utilized with any release of the LTE standard, including Frequency-Division Duplex (FDD) and Time-Division Duplex (TDD) variants, or with a variety of other future or existing air interface technologies, such as the IEEE 802.11, which is more popularly known as Wi-Fi, or IEEE 802.16, which is also known as Wi-Max, or even 3G air interfaces such as Universal Mobile Telecommunications System (UMTS).

Most commercial LTE networks are synchronous so that the timing phases of all transmissions from the eNodeBs are aligned with GPS (global positioning system) time or UTC (coordinated universal time). In a standalone LTE eNodeB, the GPS/UTC time is provided by a GPS receiver, which is a physical component on the eNodeB hardware. In some implementations, the hardware of the CUs 22, 24 include a physical GPS receiver to provide timing to the radio network 12. In deployments where the CUs 22, 24 are far away from any satellite view, e.g., located deep inside a building, the physical GPS receiver (not shown) can be external to the CU hardware and can deliver the timing information to the CUs 22, 24 through, e.g., the IEEE1588 PTP (precision time protocol). In some implementation, a source of timing for the radio network 12 is a timing server (not shown) located in the operator's network (e.g., the network 14, 16) that provides timing to the CUs 22, 24 using, e.g., the IEEE1588 protocol. The RUs 26a-26i do not necessarily contain any GPS receiver, and receive timing information either from the CUs or directly from an external GPS receiver via IEEE1588 or other high-precision timing protocols. Synchronization is discussed in detail further below.

Figure 2A:
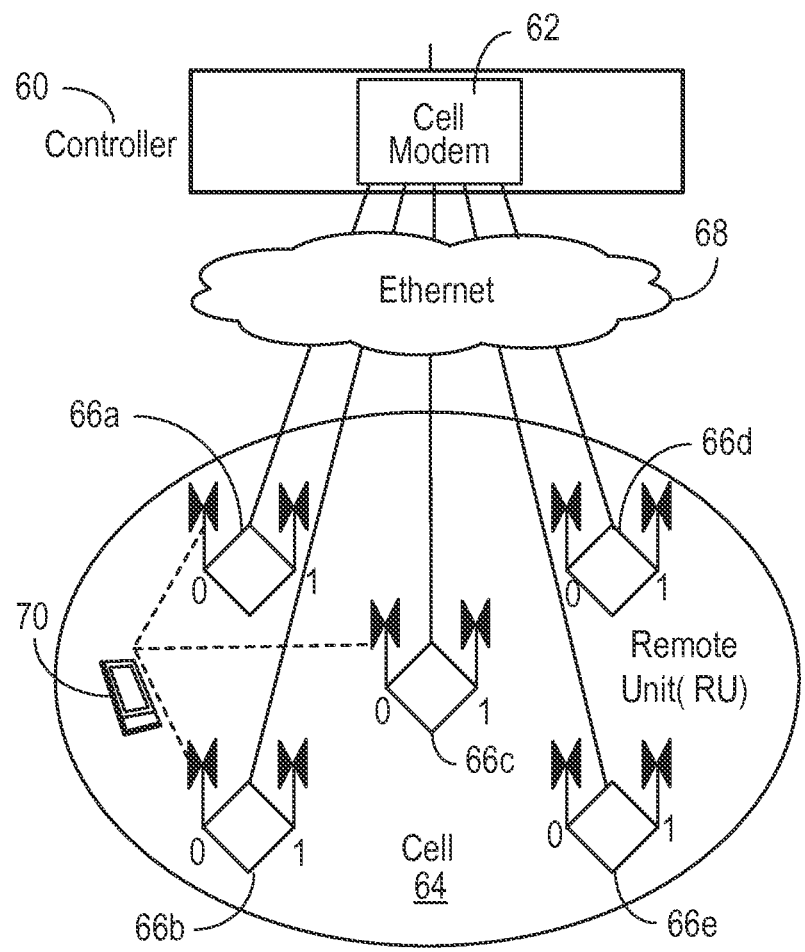
FIGS. 2A and 2B are block diagrams showing an example of one cell connected to a controller (CU) and two cells connected to a controller (CU).

Referring to FIG. 2A, a CU 60 includes a baseband modem 62 connected to RUs 66a-66e through an Ethernet network 68. RUs 66a-66e belong to the same cell 64. The positions of the RUs are chosen to provide RF coverage, which depends primarily on the transmitter power of the RUs and the RF propagation environment at the site. The data capacity of a single baseband modem can be shared by all UEs that are in the coverage area of the RUs that belong to the corresponding cell. The number of RUs to be assigned to a single cell can be determined based on the number of UEs in the coverage area of the RUs, the data capacity needs of each UE, as well as the available data capacity of a single baseband modem, which in turn depends on the various capacity-enhancing features supported by the baseband modem.

In a radio network, the size and shape of the cells can be varied in a site according to the traffic demand. In high traffic areas cells can be made smaller than in low traffic areas. When traffic demand distribution across the site varies according to time-of-day or other factors, the size and shape of cells can also be varied to adapt to those variations. For example, during the day more capacity can be delivered to the lobby areas of a hotel than to the room areas, whereas at night more capacity can be delivered to the room areas than the lobby areas.

Figure 2B:
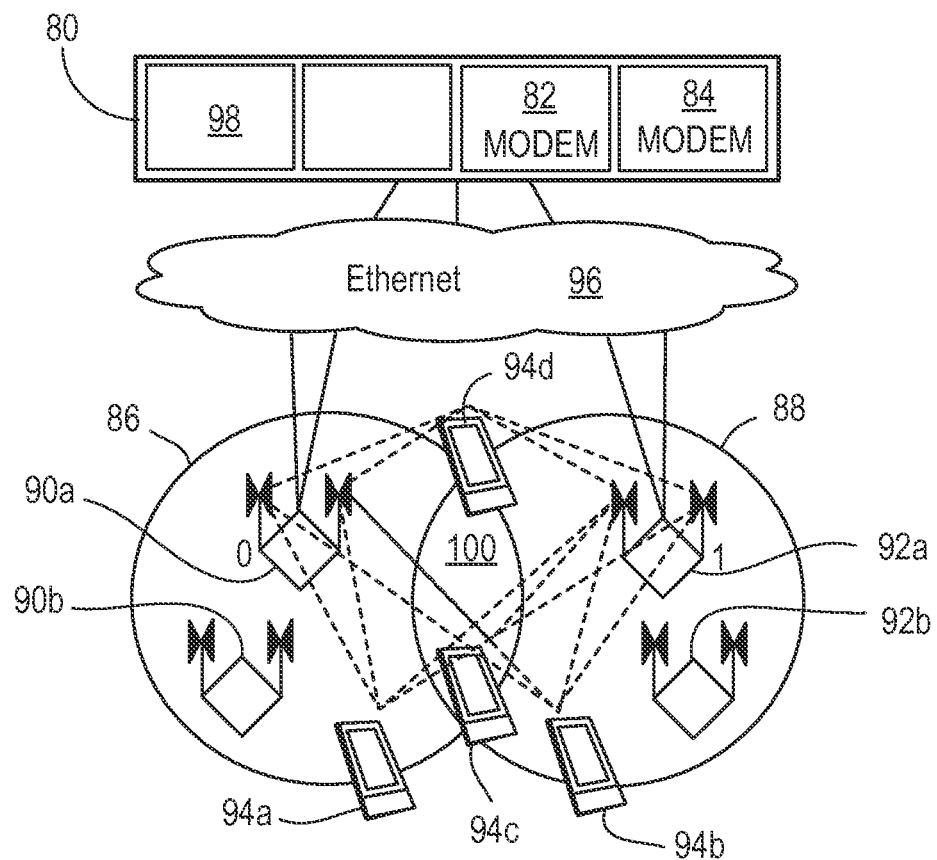

The RUs 66a-66e can provide uniform signal strength throughout the cell 64 without introducing any cell boundaries. When the capacity of a single baseband modem 62 is insufficient to serve the area, additional modems can be added to the CU or unused modems can be enabled in the CU to split an existing cell into multiple cells. More capacity can be delivered with multiple cells. For example, as shown in FIG. 2B, a CU 80 includes modems 82, 84 controlling respective cells 86, 88 through an Ethernet network 96. Each cell 86, 88 includes one or more RUs 90a, 90b, 92a, 92b to provide RF coverage to UEs 94a-94d. The cells 86, 88 can be used by the subscribers of one mobile operator, or by different mobile operators. If needed, additional CUs with more baseband modems can also be added. Additional RUs may be added to expand or improve the RF coverage.

In addition to the modems or modem functionalities, the CU 80 contains a coordination unit 98 that globally coordinates the scheduling of transmission and reception of the modems 82, 84 to reduce or eliminate possible interference between the cells 86, 88. For example, the centralized coordination allows devices 94c, 94d that are located within the overlapping boundary region 100 of the two cells 86, 88 to communicate without substantial inter-cell interference. The details of the centralized coordination are discussed further below. The interference issues that are likely to take place in the boundary regions of multiple cells within the entire building or site occur less frequently because of the relatively few number of cells needed. The CU(s) can readily perform the centralized coordination for the relatively few number of cells and avoid inter-cell interference. In some implementations, the coordination unit 98 may be used as an aggregation point for actual downlink data. This may be helpful for combining downlink traffic associated with different cells when multi-user MIMO is used between users served on different cells. The coordination unit may also be used as an aggregation point for traffic between different modem processors that belong to the same baseband modem.

Figure 2C:
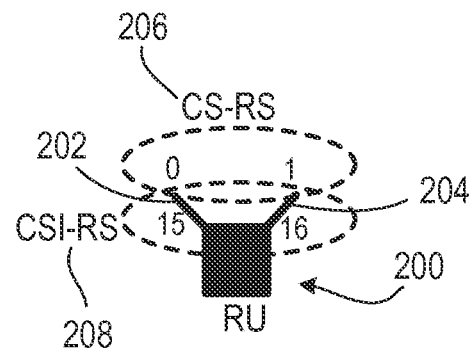
FIG. 2C is a schematic diagram of an example of a remote unit (RU).

Unless specified, the discussions below are mostly directed to one cell, and can be readily extended to multiple cells. Referring to FIG. 2C, a RU 200 for use in the radio network of FIGS. 1 and 2A-2B can have two antennas 202, 204 for transmitting RF signals. Each antenna 202, 204 transmits RF signals on one or more LTE channels (or carriers). The cell to which the RU 200 and its antennas 202, 204 belong carries an ID (Cell-ID). The CU and its RUs and antennas may support multiple LTE channels, each with a different Cell-ID. In addition, each antenna 202, 204 is assigned to a unique Release 8 logical antenna port (ports 0, 1, 2 or 3) and possibly a unique Release 9/10 logical antenna port (ports 15, 16, . . . , 22). For the purpose of discussion, the antennas 202, 204 are also referred to as physical antennas, while the logical antenna ports are also referred to as virtual antenna ports. In the example shown in FIG. 2C, the antenna 202 is assigned to the Release 8 logical antenna port 0 and the Release 9/10 logical antenna port 15; and the antenna 204 is assigned to the Release 8 logical antenna port 1 and the Release 9 or Release 10 logical antenna port 16. The logical antenna ports, together with the Cell-ID and other parameters configured in the CU, determine the CS-RS (cell-specific reference signal) 206 the antennas transmit under Release 8, or the CSI-RS (Channel State Information-reference signal) 208 the antennas transmit under Release 9 or Release 10.

The RF signals transmitted by the antennas 202, 204 carry the LTE synchronization signals PSS/SSS, which include a marker for the Cell-ID. In use, an idling UE monitors the reference signals associated with a Cell-ID, which represents one LTE channel in one cell. A connected UE may transmit and receive RF signals on multiple LTE channels based on channel aggregation, a feature of the LTE standard defined in Release 10 (details discussed below).

The RU 200 can also have more than two antennas, e.g., four, six, or eight antennas. In some implementations, all RUs in the radio network (e.g., the radio network 12 of FIG. 1) have the same number of transmit and receive antennas. In other implementations, the RUs have different numbers of transmit or receive antennas.

The radio networks described above can be readily upgraded in the CUs, e.g., to support future LTE or other standards, without making substantial changes, e.g., any changes, to the deployed RUs. In some implementations, when the RUs support multiple frequency channels simultaneously, an upgrade for carrier aggregation can be performed by enabling additional channels in the same RU or alternatively by deploying new RUs that add more channels. In carrier aggregation using a single RU or multiple RUs, the aggregated channels may be in the same or different frequency bands. Likewise, when the RUs support frequency bands for the TDD (time-division duplex) version of the LTE standard, Time-Division (TD)-LTE capability may be added at a later date by upgrading the CU's and possibly the RU's software/firmware, or by adding a new CU. If Wi-Fi support is required, Wi-Fi capability may be added to the RUs. WiFi transceivers in the RUs can be managed by the same or a different controller and can be managed by the same service managers, both at the site and in the operator's network. Such upgrades can be performed in a cost effective manner, e.g., by making hardware changes (sometimes at most) in a relatively small number of CUs in a central location (as opposed to replacing a large number of RUs that are spread across the site).

Radio Network Deployment

Figure 3:
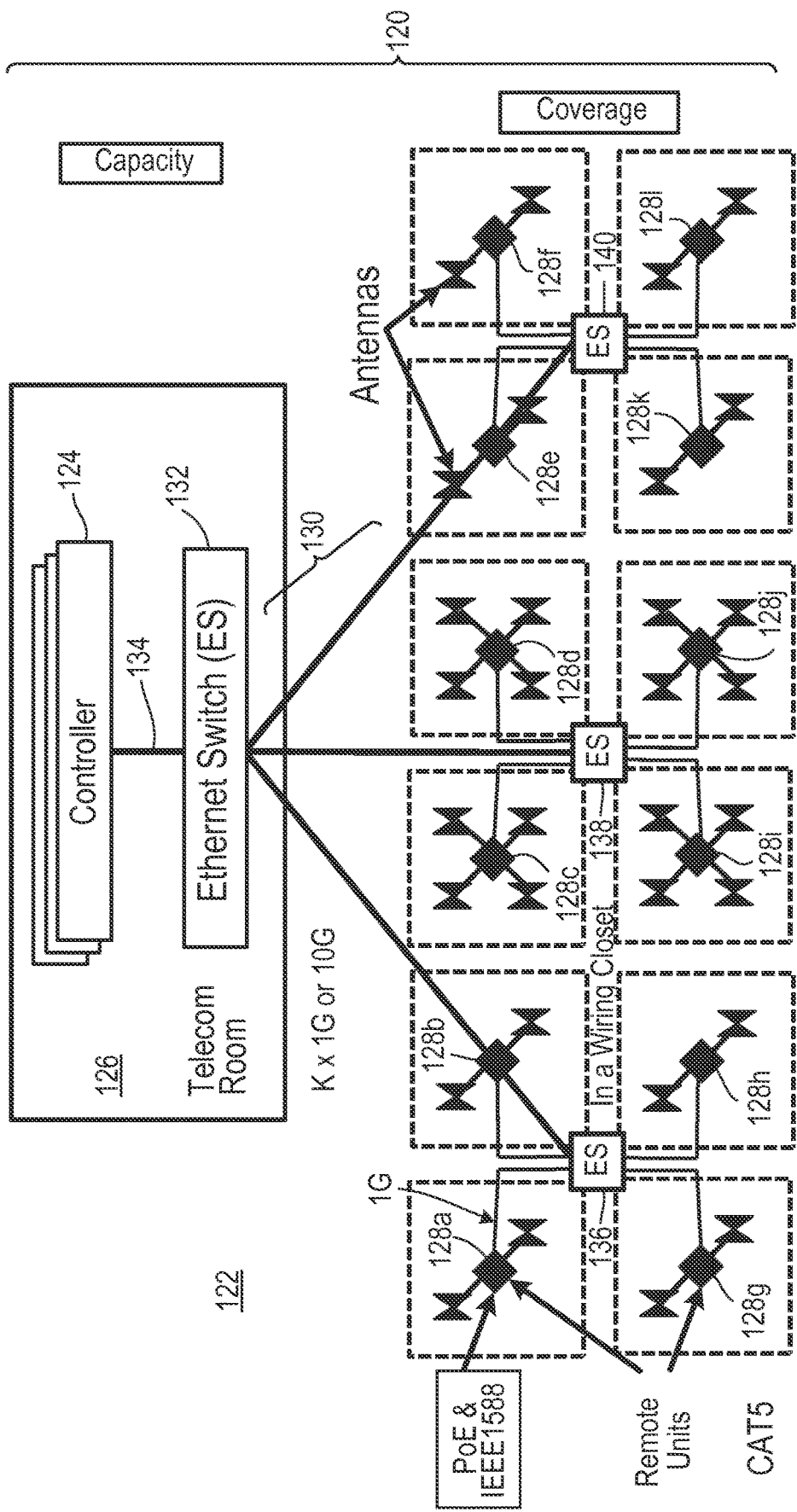
FIG. 3 is a block diagram schematically showing the deployment of an example radio network on a site.

Referring to FIG. 3, a radio network 120 is deployed at a site 122. One or more CUs 124 are installed in a room 126, e.g., a telecom room, locally at the site 122. The RUs 128a-128l are distributed around the site 122. In some implementations, some RUs are wall-mounted with integrated antennas, some RUs are hidden in one or more closets, and some RUs are installed above the ceiling tile and attach to a wall-mount antenna via an external antenna cable.

The RUs 128a-128l connect to the CUs 124 through a switched Ethernet network 130, which includes twisted pair and/or fiber optic cables, and one or more Ethernet switches. Components of the Ethernet network 130 are standard off-the-shelf equipment available on the market. In some implementations, the Ethernet network 130 is dedicated to the radio network alone. In other implementations, the radio network 120 shares the Ethernet network 130 with other local area traffic at the site 122. For example, in an enterprise network such other traffic may include local traffic generated by various computers in the enterprise that may be connected to the same Ethernet switches. The radio network traffic can be segregated from other traffic by forming a separate Virtual Local Area Network (VLAN) and high-priority QoS (Quality of Service) can be assigned to the VLAN to control latency. In the example shown in FIG. 3, the CUs 124 are connected to a co-located Ethernet switch 132 (in the same room 126). In some implementations, the connection 134 uses a single 10 Gb/s Ethernet link running over fiber optic or Category 6 twisted pair cable, or multiple 1 Gb/s Ethernet links running over Category 5/6 twisted pair cables.

Those RUs (not shown in FIG. 3) that are near the telecom room 126 may directly connect to the Ethernet switch 132 in the telecom room 126. In some implementations, additional Ethernet switches 136, 138, 140 are placed between the Ethernet switch 132 and the RUs 128a-128l, e.g., in wiring closets near the RUs. Each wiring closet can contain more than one Ethernet switch (like the switch 136, 138, 140), and many Ethernet switches can be placed in several wiring closets or other rooms spread around the site. In some implementations, a single Category 5/6 twisted pair cable is used between a RU and its nearest Ethernet switch (e.g., between the RU 128a and the Ethernet switch 136). The Ethernet switches 136, 138, 140 connect to the Ethernet switch 132 in the telecom room 126 via one or more 1 Gb/s or 10 Gb/s Ethernet links running over fiber optic or Category 6 twisted pair cables. In some implementations, multiple RUs are integrated into a single physical device (not shown) to support multiple frequencies and possibly multiple mobile operators.

Antenna Mapping in a Cell

Figure 4A:
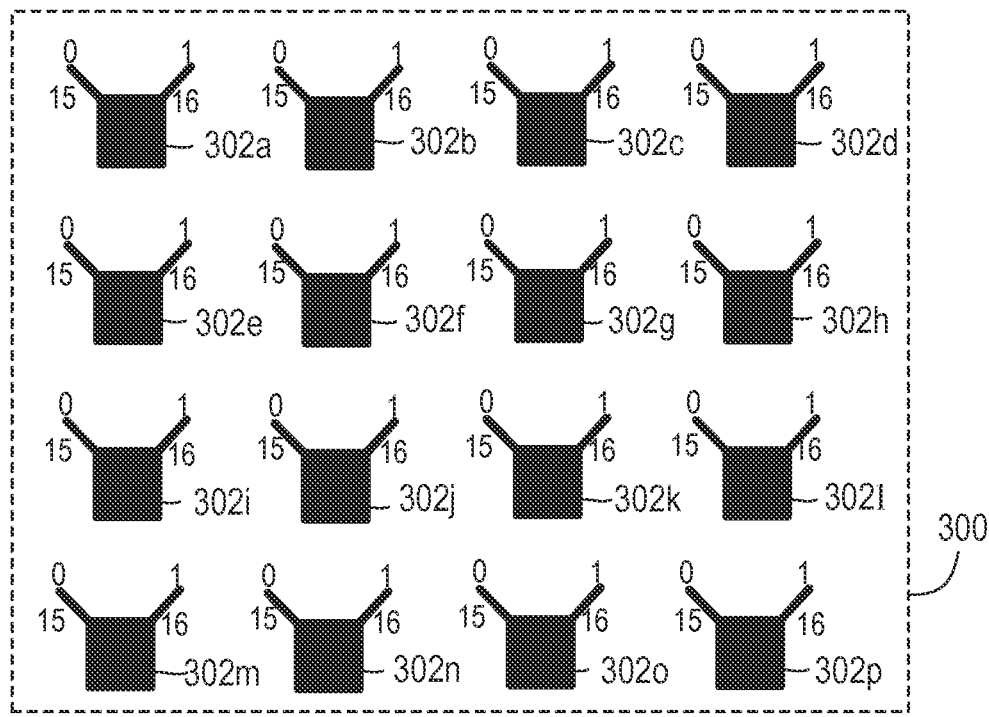
FIGS. 4A-4C are schematic block diagrams of examples of antenna mapping schemes in a cell.

Referring to FIG. 4A, a cell 300 (controlled by a single modem or a single CU) contains sixteen RUs 302a-302p. The N (an integer, e.g., 1, 2, 4, etc.) physical antennas of each RU may be mapped to the same group of CS-RS or CSI-RS virtual antenna ports 0 . . . N−1. In the example shown in FIG. 4A, N is two, and the mapping is done in the same manner as shown in FIG. 2C. All RUs 302a-302p in the cell 300 transmit the same Cell-ID on the same LTE channel, and all antennas share the same Cell-ID and broadcast the same Cell-ID in the Primary and Secondary Synchronization Signals (PSS/SSS). (When a RU serves multiple channels, different channels may be using different Cell-IDs.) When a UE is located in the cell 300, the UE receives the reference signals of the same logical antenna port, e.g., port 0, from different physical antennas of different RUs. To the UE, the RUs appear as part of a single cell on a single LTE channel.

Figure 4B:
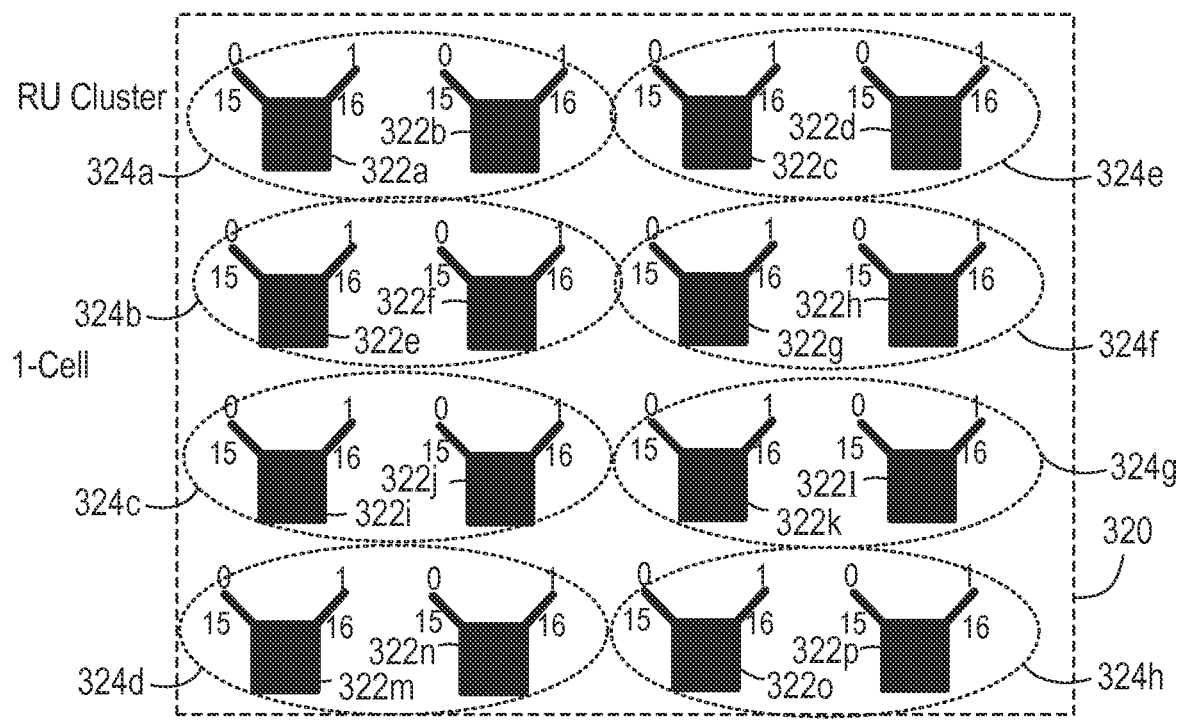

Alternatively, multiple RU clusters each containing one or more RUs are formed within a single cell. The antennas in the cluster are assigned to different CS-RS or CSI-RS virtual antenna ports, but share the same Cell-ID. For example, as shown in FIG. 4B, a cell 320 contains 16 RUs 322a-322p each having two antennas and eight clusters 324a-324f each containing two RUs. Within each cluster 324a-324f, the four physical antennas of the two neighboring RUs are assigned to four different CS-RS virtual antenna ports 0, 1, 2 and 3 and four different CSI-RS virtual antenna ports 15 through 18. As a result, a cluster having a total of N (N is four in FIG. 4B) physical antennas appears to the user equipment as a single cell with N transmit antenna ports.

Compared to the cell configuration shown in FIG. 4A, the number of antenna ports seen by the user equipment is doubled in FIG. 4B. The configuration of FIG. 4B can improve the performance of the UE, especially when the UE is near the coverage boundaries of two or more neighboring RUs. Assuming that the UE has two antennas for receiving signals, under Release 8, the UE can communicate with the radio network through 4×2 single-user MIMO. In systems compatible with Releases 9-11 of the LTE standard, up to 4 RUs with 2 transmit antennas each can be used to form an 8-antenna cluster, and then the UE can implement 8×2 single-user MIMO. The same UE within a radio network having the configuration shown in FIG. 4A can communicate through 2×2 single-user MIMO. Even higher order MIMO communication, e.g., 4×4, 8×8, are possible for UEs with 4 or 8 receive antennas.

Increasing the number of physical transmit antennas involved in MIMO communications, e.g., using the configuration of FIG. 4B, does not substantially increase the processing complexity, except when the number of layers in spatial multiplexing increases, e.g., from 2 (FIG. 4A) to 4 (FIG. 4B). Although clusters of two RUs are shown and discussed, as explained above, a cluster can include other numbers of RUs, and cell 320 can include clusters having different sizes.

In some implementations, a wrap-around structure is used by the CU in assigning the physical antennas to logical (or virtual) antenna ports, such that anywhere within the coverage of the cell 320, a UE can receive from as many logical antenna ports as possible. This wrap-around structure can allow the single-user closed-loop MIMO to operate inside the cell 320 seamlessly over a large coverage area.

Downlink Simulcast and Coordinated Transmission

Referring again to FIGS. 4A and 4B, all antennas are assigned to the same logical (or virtual) antenna port transmit the same reference signals (CS-RS or CSI-RS) in a time-synchronized manner. The assignment can reduce the effects of shadow fading through macrodiversity. The assignment can also present a multipath channel to each UE (not shown). Under Release 8, a UE reports a single CSI feedback (including CQI (channel quality Indicator) and PMI/RI (pre-coding matrix indicator/rank indicator)) based on the CS-RS or CSI-RS reference signals it receives from all transmitting antenna ports in the cell. When antennas of different RUs are transmitting the same reference signal, the UE may experience richer scattering and a more MIMO-friendly Rayleigh-like channel without significant interference from other transmit antennas in the same cell. Furthermore, the UE only sees one cell, and there is no need for any handoff when the UE is in the coverage area of multiple RUs that belong to the same cell.

A single broadcast channel PBCH (physical broadcast channel) is used in the cell 300 or the cell 320. The cells 300, 320 also implement a single downlink control region for transmitting signals on PDCCH (physical downlink control channel), PHICH (physical hybrid-ARQ (automatic repeat request) indicator channel) and PCIFCH (physical control format indicator channel). Other common logical channels, such as the paging channel PCCH, that are transmitted over PDSCH (physical downlink shared channel) are also shared.

As discussed previously, all physical antennas that are assigned to the same logical or virtual antenna ports, such as the Release 8 logical antenna ports and the Release 10 CSI-RS resources, transmit the same control signals and reference signals. In the example shown in FIG. 4B, all PDCCH/PHICH/PCIFCH transmissions use 4-antenna TX diversity and all transmissions from those antennas assigned to the same logical antenna port are identical. A UE within the cell 320 perceives transmissions from those antennas assigned to the same antenna port as if the transmissions are delivered from a single antenna through a multipath channel.

Figure 4C:
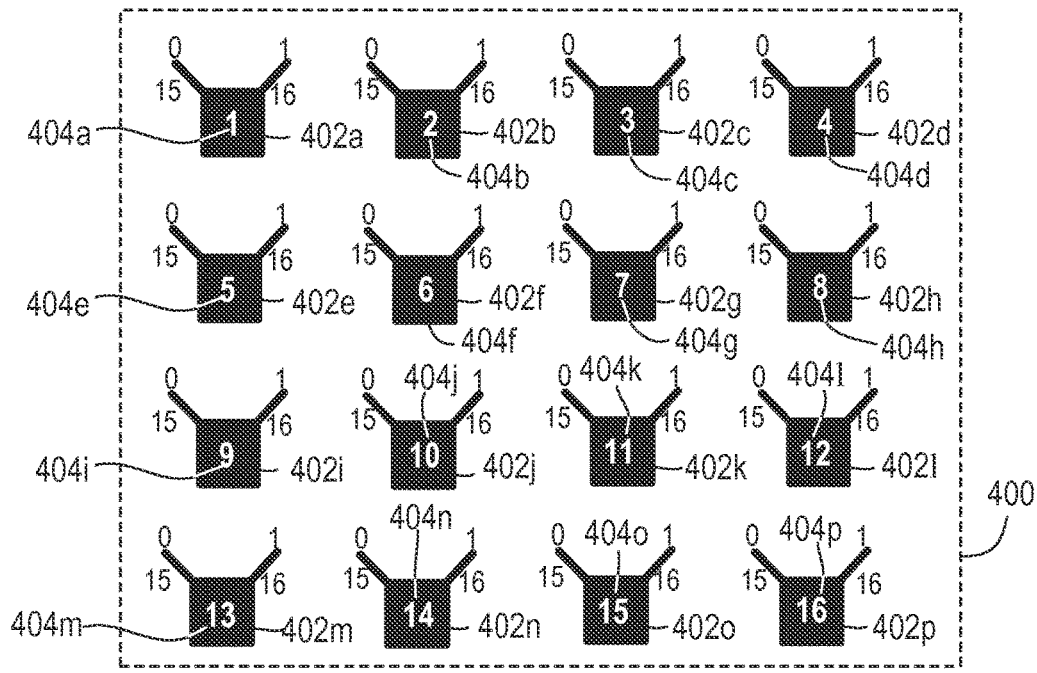

Furthermore, new capabilities in Release 11 can be implemented to improve the downlink MIMO operation inside a large cell, like the cells 300, 320, that has many RUs. In Release 11, multiple non-zero CSI-RS resources can be used inside a single cell. As an example, referring to FIG. 4C, each RU 402a-402p (or clusters of RUs) of a cell 400 is assigned to a different CSI-RS resource with a distinct CSI scrambling ID 404a-404p. Each RU with the distinct CSI scrambling ID operates as if it were a virtual cell, even though they share the same Cell-ID with other RUs in the same cell. The multiple CSI-RS resources (and scrambling IDs) in the cell 400 are monitored by the UE. In some implementations, the UE can be configured by the CU (not shown, e.g., the CU 22, 24 of FIG. 1) of the radio network to perform the monitoring of multiple CSI-RS resources.

A UE (not shown) in the cell 400 sends multiple CSI reports to the CU of the radio network for multiple RUs whose CSI-RS transmissions the UE monitors. From each CSI report, the CU obtains a CQI for the respective RU and uses the CQI for determining signal strength from that RU. The CU can use these multiple CQI reports along with multiple PMI/RI reports received from the UE to more accurately determine the precoder coefficients. Accordingly, the multiple CSI reports can reduce the CSI quantization error and improve the overall performance of the radio network. For example, when a UE reports CSI independently for two adjacent RUs, such as RUs 402a, 402b, the CU determines the precoder coefficients with greater accuracy than when only a single non-zero CSI-RS resource is reported. Furthermore, Release 11 supports enhanced CQI reporting based on accurate interference measurements by the UE. Release 11 also includes an E-PDCCH (enhanced physical downlink control channel), which can be used to increase the control channel capacity in the cell 400. All these features of Release 11 enhance the functionality of the present disclosure.

In some implementations where the radio network supports multiple cells, downlink transmissions in different cells can be coordinated to reduce interference. Coordination may be achieved using techniques such as Hard and Soft Frequency Reuse (HFR/SFR) or Release 11 Coordinated Multipoint (CoMP), which are described in more detail later.

Uplink Diversity Reception

The uplink transmissions by a UE that is being served by a cell with multiple remote units will be received by all the RX antennas in these RUs. When the UE is near the coverage boundaries of two or more RUs, its transmissions may be received by RX antennas of these RUs. In this situation, the uplink performance can be improved by performing diversity combining (i.e., Maximal Ratio Combining (MRC), Interference Rejection Combining (IRC) or Successive Interference Cancellation (SIC) in the controller) across signals received by multiple RUs. By having multiple RUs send the received IQ data to the controller, multi-antenna/multi-RU combining can be achieved.

When there are two or more cells in the radio network, uplink transmissions of a UE that is being served by a first cell may be received by the RX antennas of one or more RUs that belong to other cells. In this situation, uplink performance can also be improved by performing diversity combining (e.g., MRC, IRC or SIC) across signals received by multiple RUs, including the RUs that belong to different cells.

Virtual Cell Splitting

The capacity in the radio network can be increased by a cell splitting procedure. In the procedure, RUs in a single cell are split between two cells, increasing the capacity at the site. The two cells can deliver up to twice the capacity because two UEs can be served in two different cells on the same time-frequency resource.

Alternatively, the capacity of a single cell can be increased by using virtual cell splitting. The cells each containing multiple RUs as discussed above can be virtually split, by allowing multiple UEs to transmit simultaneously using the same time-frequency resources, using either multi-user MIMO, which is an extension of single-user MIMO to multiple UEs supported in the LTE standard, or RF isolation. In contrast to real cell splitting, virtual cell splitting does not impact the reference signals or common control channels. Virtual cell splitting increases cell capacity by allowing multiple UEs to transmit or receive data using the same time frequency resources.

1. Downlink Virtual Cell Splitting

A. Multi-User MIMO

In some implementations, virtual cell splitting is implemented with multi-user MIMO, which is used to send data to multiple UEs on the same PDSCH time-frequency resource. The multiple UEs can be served on the same time-frequency resource even when these UEs receive strong RF signals from the same antennas. Multi-user MIMO technique is an integral part of the LTE standard.

In multi-user MIMO, a unique set of precoder weights is applied to modulation symbols destined to each UE to prevent interference between co-scheduled UEs. In particular, when each UE has a single antenna, individually generalized beams are formed for each UE. When each UE has multiple antennas, the CU and the RUs may provide spatial multiplexing (i.e., sending multiple layers of modulation symbols) to each UE, in addition to serving the multiple UEs on the same time-frequency resource.

Multi-user MIMO can be used with the antenna mapping schemes shown in FIGS. 4A and 4B. For example, in the antenna mapping scheme of FIG. 4A, two UEs can be served on the same time-frequency resource by one or more RUs. The CU for the cell 300 forms two beams in directions of the strongest RF paths for the two UEs, without causing significant interference between the two UEs.

In Release 8, multi-user MIMO is supported in downlink transmission mode 5. Each UE having a single antenna reports to the CU a 2×1 precoding vector selected from a 4-entry precoding codebook and an associated CQI, which is based on single-user beamforming using the selected precoding vector. When the precoding vectors selected by two UEs are orthogonal to each other, the CU may schedule the two UEs on the same time-frequency resource using half of the available transmit energy for each UE.

For two UEs that have no inter-user interference cancellation capabilities, the multi-user MIMO with the antenna mapping scheme of FIG. 4A does not introduce substantial interference when each UE receives downlink signals from both antennas of a RU at about the same strength, and when the selected precoding vectors of the two UEs are orthogonal to each other.

Multi-user MIMO can also be implemented with advanced UEs that are capable of using knowledge about the modulation structure of the interfering signals from co-scheduled UEs to reduce the interference. In some implementations, a UE with two or more antennas can remove part of the interference using spatial filtering.

In transmission Mode 8 or 9 of Release 9 or 10, multi-user MIMO can be implemented using DM-RS (demodulation reference signal), which allows the CU to use any precoder without being limited to those precoders that are defined in the standard in so-called codebooks. The UE reports to the CU the CSI implicitly by selecting a precoder from a predetermined codebook. In some implementations, the UE determines the CSI using the CSI-RS reference signal, which can support up to 8 antenna ports. In Release 10, the same CSI-RS signal is transmitted from all physical antennas of the RUs that are assigned to the same CSI-RS logical antenna port and the UE reports only one CSI (i.e., CQI/PMPRI) for each (physical) cell. In Transmission Mode 9, the CU can schedule up to 4 UEs on the same time-frequency resource with up to 2 layers per UE and up to 4 layers per RB (Resource Block). The CU transmits DM-RS on 12 REs (Resource Elements) per RB and the 12 REs are used for all UEs that are co-scheduled on the same resource. The transmission based on DM-RS can provide flexibility and simplification in scheduling.

In some implementations, when the CU knows the channel coefficients, it chooses the precoding vectors for the UEs to provide each UE with the maximum SINR (Signal-to-Interference and Noise Ratio) without the UE experiencing substantial interference. As discussed previously, interference suppression capabilities provided by the UEs can further facilitate reliable multi-user MIMO.

Release 11 supports using multiple CSI-RS signals inside a physical cell and allows a UE to send more than one CQI/PMI/RI report per physical cell. This can improve the performance of the multi-user MIMO. For example, in Release 11, each RU (or each group of RUs) may be assigned to a CSI-RS reference signal sequence that is different from those assigned to the other RUs in the same cell. Each UE is requested to report the CSI individually for multiple RUs in the cell. The CQI/PMI/RI information obtained from the multiple reports can be more accurate than information obtained from a single report. Based on the accurate information, the CU can determine with greater precision the precoding vectors in multi-user MIMO and reduce inter-user interference. In some implementations, the CU configures each UE with a selected set, e.g., but not necessarily the entire set, of CSI-RS resources available in the cell so that the UE does not have to send CSI reports for all CSI-RS resources in the cell.

B. RF Isolation

Virtual cell splitting in a cell can also be achieved based on RF isolation among the UEs in the cell. In some implementations, multiple UEs are served simultaneously on the same time-frequency resource via RUs or antennas whose coverage areas do not substantially overlap. For a first UE, instead of simulcasting the same PDSCH signal on all physical antennas that are assigned to the same virtual antenna port, only a few RUs and physical antennas that provide the strongest signals to the given UE are allowed to transmit the signals to the first UE. Transmissions from other RUs and physical antennas to the first UE are purged. One or more of the RUs that are not transmitting to the first UE can instead transmit to a second UE on the same time-frequency resource. When the transmissions from the physical antennas of the RUs serving the first UE are received at a very low level by the second UE, and likewise when the transmissions from the physical antennas of the RUs serving the second UE are received at a very low level by the first UE, no significant interference occurs, even when the UEs do not have any interference suppression capabilities. DM-RS reference signals are transmitted similarly to the PDSCH signals. For example, the DM-RS reference signals for the first UE are transmitted only from the antennas of the RUs that are serving the first UE. In Release 10, multi-user MIMO can be used to send up to 4 layers to two or more UEs. Generally, such limitations do not apply in the RF isolation method, but in some implementations, additional steps may need to be implemented to reduce or avoid interference between UEs.

Figure 5A:
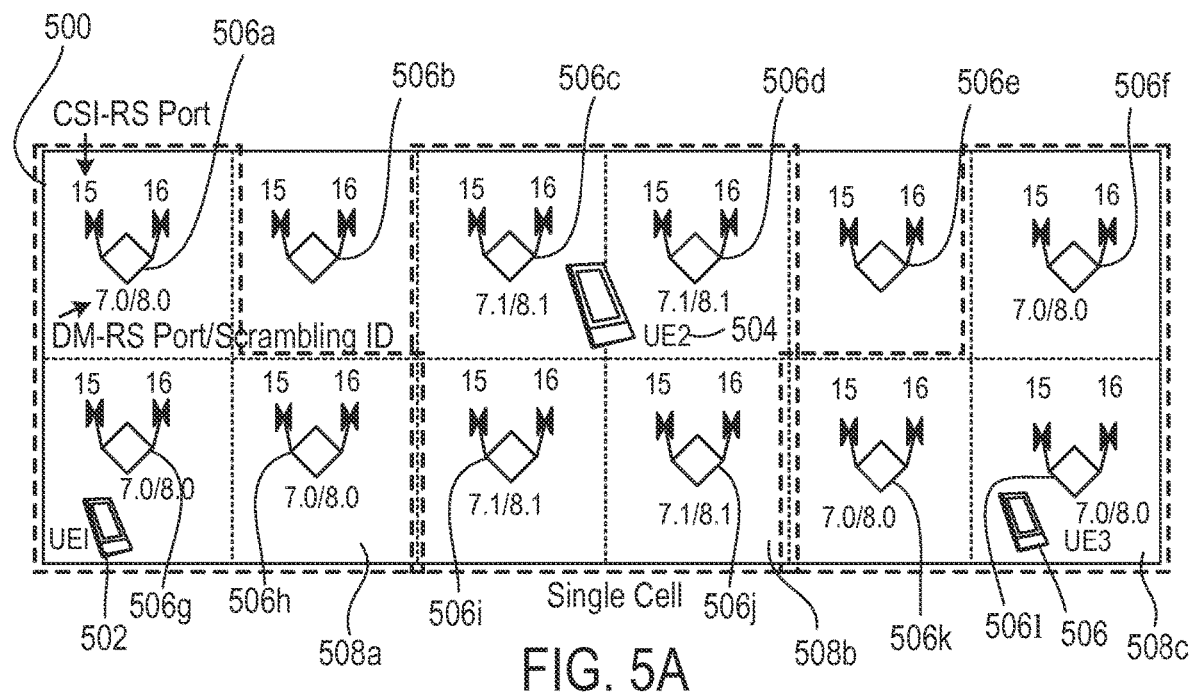
FIG. 5A is a block diagram schematically showing an example of virtual splitting in a cell.

In the example shown in FIG. 5A, two UEs 502, 506 at different locations in a single cell 500 are co-scheduled on the same time-frequency resource based on RF isolation with up to 2 layers per UE. The cell 500 includes 12 RUs 506a-506l, each having two physical antennas and transmitting CSI-RS on virtual antenna ports 15 and 16. To serve the two UEs that are spatially far apart in a given subframe, the single cell 500 is virtually split to form three virtual cells 508a, 508b, 508c. The RUs 506a, 506b, 506g, 506h in the virtual cell 508a serve the user equipment 502. The RUs 506e, 506f, 506k, 506l in the virtual cell 508c serve the user equipment 506. The RUs 506c, 506d, 506i, 506j in the virtual cell 508b do not serve any UE in order to avoid causing interference to the UEs 502 and 506. The total number of layers co-scheduled in the single cell 500 is 4. The virtual cells described above are not static like physical cells. The virtual cells can vary dynamically from one subframe to the next and across resource blocks. In some implementations, the dynamic variation applies only to the shared data channel PDSCH. For example, there may be no virtual cell splitting in one subframe, while in another subframe, two different virtual cell splitting may be applied in two different groups of resource blocks. In some implementations, a virtual cell may have a single RU without simulcasting, which can eliminate the intentional multipath caused by simulcasting. The virtual cells represent the ability of the system to serve multiple UEs in the same cell on the same time-frequency resource.

The RUs within the same virtual cell transmit the same DM-RS reference signal selected from four available ports/scrambling index {7.0, 7.1, 8.0, 8.1}. The virtual cells that are located adjacent to each other (or close to each other without directly bordering each other), such as the virtual cells 508a, 508b and the virtual cells 508b, 508c, use different DM-RS port numbers. Those virtual cells that are relatively far apart, e.g., the virtual cells 508a, 508c, can reuse the same DM-RS reference signal based on the RF isolation. In such implementations, signal transmissions between the UEs and the radio network are performed without significant interference between the virtual cells.

In some implementations, the CU chooses a MCS (Modulation and Coding Scheme) for each co-scheduled UE based on the CQI values, determined by the UE from the CS-RS or CSI-RS signals, reported by the UE. The CS-RS or CSI-RS signals are transmitted continuously by all physical antennas in the physical cell, including some antennas that may at times not transmit in the shared data channel PDSCH. The CS-RS or CSI-RS signals transmitted from the physical antennas that are near the UE, when received at sufficiently high strength, are seen by the UE as multiple transmission paths, or RF multipath. In some implementations, the UE can predict a higher (or lower) CQI based on the multipath than the actual CQI the UE will experience when receiving on PDSCH with less multipath. In such implementations, the HARQ (hybrid automatic repeat request) capability in the LTE standard can provide dynamic adaptability to reduce the effect caused by the mismatch between the predicted CQI and the actual CQI. In some implementations, when the actual channel conditions are worse than the conditions predicted by the CQI, the CU retransmits the data or signals with incremental redundancy to achieve the maximum data rate that the channel can support.

The virtual cell splitting techniques described above using multi-user MIMO or RF isolation can be utilized in systems that are compatible with all Releases of the LTE standard. Release 8 UEs use CS-RS, instead of DM-RS, for demodulation, which in some situations, may cause mismatch during demodulation. Still in many cases, virtual cell splitting in the manner described above is highly desirable when there is a strong RF isolation between the transmitting and the non-transmitting antennas such that the UEs can achieve total throughput higher than when either UE is served on a dedicated time-frequency resource.

In Releases 9 and 10, in some implementations, the single CQI/PMI/RI feedback sent by the UEs may not be sufficient for the CU to determine reliably which RUs and physical antennas are most likely to provide the strongest signal to each UE (in the downlink direction). In such implementations, the CU can also use information about the strength of uplink signals, such as the Sounding Reference Signal (SRS) or PUCCH control signals or PUSCH uplink data, received by the RUs from the UEs to determine the antennas that are likely to provide the strongest signal to each UE on the downlink. After the CU determines the RUs or physical antennas for transmission to a given UE, the CU chooses the precoding vector weights as described above so that signals to a UE are transmitted from antennas that the UE hears strongly.

The virtual cell splitting using RF isolation can be implemented with higher accuracy in Release 11, where the UEs are capable of sending multiple CQI reports for different RUs. The CU uses these CQI reports to determine which RUs or physical antennas transmit signals that are likely to be received by co-scheduled UEs at a high strength.

2. Uplink Virtual Cell Splitting

Referring again to FIG. 5A, it is possible to implement virtual cell splitting also on the uplink. The CU may schedule multiple UEs on the same time-frequency resource and reduce or remove any interference between co-scheduled UEs in the CU using Interference Rejection Combining (IRC) or Successive Interference Cancellation (SIC). These techniques can rely upon spatial filtering as in multi-user MIMO or as in RF isolation. On the uplink, the UEs 502, 504, 506 share certain uplink resources that are available in the cell 500. The uplink resources can include the cyclic shift for DM-RS reference signals and the Orthogonal Cover Code (OCC) that are assigned to UEs for PUSCH (Physical Uplink Shared CHannel) transmissions and the resource indices assigned to UEs for PUCCH (Physical Uplink Control CHannel) transmissions. The CU can create virtual cells on the uplink by reusing the same resources among UEs in the same physical cell. The number of UEs that can simultaneously transmit on the same time-frequency resource is limited at least partially by the availability of the uplink resources in the single cell. Reusing the same resources among UEs can increase the total capacity available on the uplink.

A. PUSCH Transmissions

The DM-RS reference signals used by a UE depend on the number of Resource Blocks (RBs) assigned to that UE. For PUSCH transmissions, the number of RBs can be as high as 108. A DM-RS reference signal having a length of 12×N is derived from a base sequence of the same length, where N is the number of RBs assigned to the UE. Up to 12 DM-RS reference sequences (or interchangeably, signals) can be derived from each base sequence using a cyclic shift in the time domain. These cyclically-shifted reference sequences are orthogonal to each other. When the channel for transmitting the reference sequences is sufficiently flat across one RB, two UEs can transmit their DM-RS reference signals with different cyclic shifts on the same RB. The CU can then estimate respective uplink channels for the transmissions from the two UEs without experiencing any substantial interference between them. When the channel is not sufficiently flat, fewer than 12 orthogonal DM-RS reference sequences can be generated by cyclically shifting a base sequence.

In some implementations, the orthogonal DM-RS reference sequences are used for single-user spatial multiplexing (up to 4 layers) and multi-user MIMO. In Release 10, an orthogonal cover code can be applied to the two DM-RS sequences such that two layers can be transmitted using the same cyclic shift, while keeping the DM-RS reference signals orthogonal.

In some implementations, the UEs that are served by the same physical cell (e.g., the cell 500 of FIG. 5A) use the same base sequence for PUSCH transmissions. When multiple UEs transmit on the same time-frequency resource, the CU coordinates the assignment of cyclic shifts and the orthogonal covers in uplink scheduling to keep the DM-RS reference signals transmitted on the same time-frequency resource orthogonal. In such implementations, a sufficient number of cyclic shifts remain available for the assignment and for use in spatial multiplexing or multi-user MIMO in each cell. For example, when 6 cyclic shifts of the base sequence are available and the 6 cyclic shifts are coupled with a pairwise orthogonal cover code, the CU can serve as many as 12 layers on the same uplink time-frequency resource with orthogonal DM-RS reference signals.

In some implementations, a physical cell described previously (e.g., the single cell 500 of FIG. 5A) can be arbitrarily large. In a large cell, when there is extensive use of simultaneous uplink transmissions on the same time-frequency resource, the CU may be short of available cyclic shifts and orthogonal covers to maintain the orthogonality among the DM-RS reference signals. Similar to the RF isolation on the downlink, the uplink can reuse the one or more DM-RS reference signals on the same time-frequency resource when the uplink transmissions by the co-scheduled respective UEs do not substantially interfere with each other. In some implementations, when there is no substantial overlap between signals received from the co-scheduled UEs by certain groups of RUs or receive antennas, the same DM-RS reference signal can be used for those UEs. The CU can determine which groups of receive antennas or RUs are receiving significant signals from a UE based on PUCCH, SRS (Sounding Reference Signals) and prior PUSCH transmissions, and can assign cyclic shifts and OCCs accordingly.

In some implementations, when there are multiple cells served by one or more controllers, it is also possible to assign the same base sequence to all cells. This allows the controller to assign all UEs to cyclic shifts of the same base sequence and to ensure orthogonality between UEs, including those UEs that are served by different cells. Based on the RF isolation, the controller can also reuse the same cyclic shifts in different parts of the site and increase the number of UEs that can be supported.

In a radio network compatible with the Release 11 standards, different RUs in a cell (such as the cell 500 of FIG. 5A) may be assigned to different DM-RS base sequences. In some implementations, orthogonality between different cyclic shifts of different base sequences is not guaranteed, but the number of available DM-RS sequences is increased. Accordingly, the size of the cell can be increased and more UEs can be served on the same time-frequency resource.

B. PUCCH & PRACH Transmissions

For PUCCH transmissions, for example for transmitting HARQ ACK/NAKs or Channel State Information (CSI), different UE transmissions in different cells use different base sequences to avoid collisions among UE transmissions in the different physical cells. This can be achieved by ensuring that the Cell-IDs used by neighboring cells do not overlap modulo 30. Group hopping, a feature of the LTE standard, can also be used to randomize the interference between the PUCCH transmissions from different UEs in different physical cells.

Orthogonal cyclic shifts of the base sequences (and possibly OCCs) are used in PUCCH transmissions to allow multiple UEs to transmit on the same time-frequency resources. In some implementations, it is possible to reuse the cyclic shifts (and OCCs when used) in different parts of the cell to increase the number of UEs that transmit at the same time. RF isolation can be used by the controller to determine which UEs may reuse the one or more base sequence cyclic shifts and orthogonal covers for the same time-frequency resource based on transmissions received from the UEs, for example, in PRACH (Physical Random Access CHannel) or previous PUCCH or PUSCH transmissions.

The interference between a cell (e.g., any single cell described previously) and any nearby macro cells (e.g., a mobile network providing coverage outside the site 10 in FIG. 1) is randomized and kept small. In some implementations, the CU chooses base sequences for use in PUSCH or PUCCH transmissions that are different from the base sequences used in nearby macro cells. Furthermore, the CU can also implement group hopping.

Figure 5B:
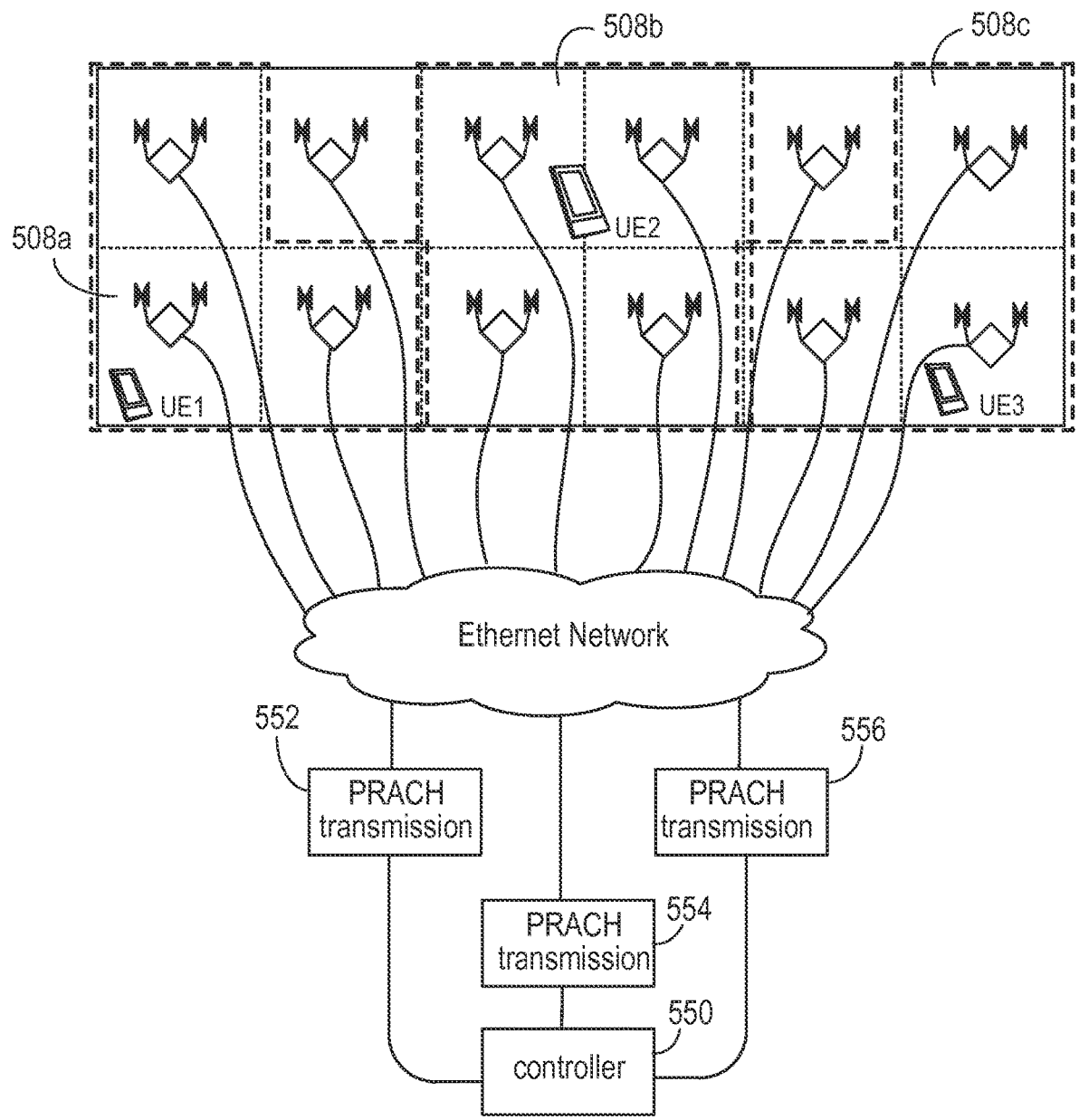
FIG. 5B is a block diagram schematically showing an example of a controller detecting Physical Random Access Channel (PRACH) transmissions.

In some implementations, it is also possible for two or more UEs that transmit on the Random Access Channel (RACH) using the same preamble to be detected by the radio network of the present disclosure. Each cell will have 64 preambles available in every PRACH opportunity. By individually processing the received signals from each RU or group of RUs, the controller may reliably detect multiple PRACH transmissions that use the same preamble and that are free of significant interference among them. For example, referring to FIG. 5B, the controller 550 individually processes the signals from each RU or group of RUs (e.g., virtual cells 508a, 580b, 508c) to detect multiple PRACH transmissions 552, 554, 556 that use the same preamble.

Dynamic Coverage and Capacity Adjustment

Referring again to FIGS. 2A and 2B, the RF coverage and capacity provided in the radio network are decoupled. The RUs 66a-66e, 90a, 90b, 92a, 92b provide the coverage and the baseband modems 62, 82, 84, or the CUs 60, 80 provide the capacity. In some implementations, some RUs in a radio network are deployed more densely and with more transmitter power than other RUs in order to overcome possible interference from nearby eNodeBs, for example, macro cells. In some radio networks of this disclosure, RUs are deployed very closely to each other, because they can belong to the same cell and therefore do not cause any inter-cell interference. Such very dense deployments are sometimes not possible with traditional base stations. The number of baseband modems (and cells) needed for a site depends on the number of users, the amount of data usage per user, and the distribution of users across the site as a function of time, etc. In general, a minimum number of baseband modems (and cells) is used to keep the cost low and to avoid unnecessary cell boundaries. When the demand for coverage and/or capacity changes, the radio network of this disclosure can dynamically adjust its coverage and capacity.

1. Dynamic Capacity Reallocation

In some implementations, when multiple RUs share the same cell/baseband modem, the capacity of the baseband modem is shared by all the UEs that fall within the coverage area of all the RUs that are assigned to the baseband modem. In an area of relatively high data usage, the RUs that form the cell may cover a smaller area than RUs in another cell that covers an area of relatively low data usage. For example, at a site using 4 modems (and 4 cells) and 24 RUs, the 4 cells can have 2, 4, 8 and 10 RUs, respectively, providing different cell sizes that match the coverage and capacity demand. The assignment of RUs to the cells can be dynamically changed based on changes in capacity demand. The changes can be made manually, e.g., by having a local person modify the RU to controller mapping, semi-automatically, e.g., based on Time-of-Day (ToD), or automatically, e.g., by the controller based on detecting a change in traffic distribution. The changes can reallocate the capacity at the site, without any substantial changes to the deployed equipment.

Figure 6A:
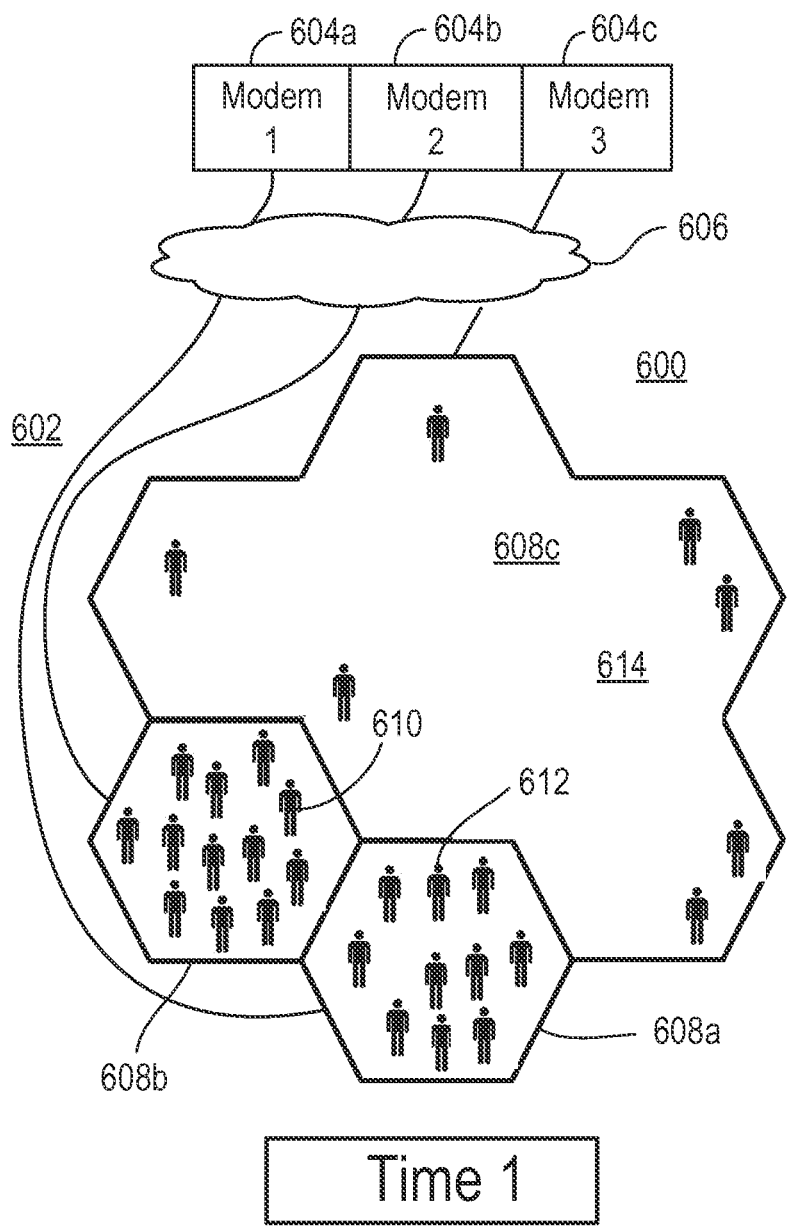
FIGS. 6A and 6B are schematic block diagrams of an example of a radio network with different cell configurations at different times.
Figure 6B:
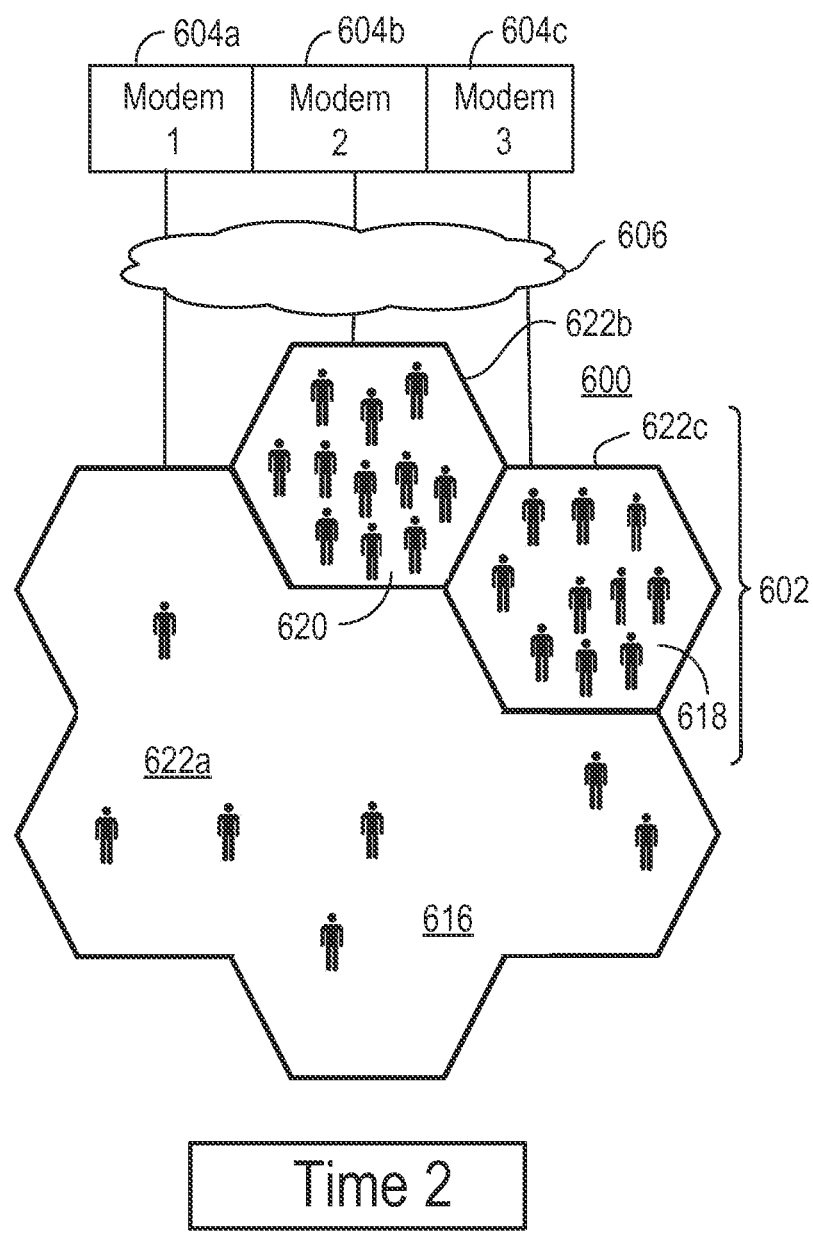

As an example, referring to FIGS. 6A and 6B, a radio network 602 including three modems 604a, 604b, 604c controlling three respective cells 608a, 608b, 608c through an off-the-shelf Ethernet network 606 is deployed at a site 600. The site 600 can be a commercial building that includes shopping areas and office space, which have different capacity demands (as schematically shown by different numbers of users in the figures) at different ToD. The cells may each include different numbers of RUs (not shown) to cover different-sized areas, while providing substantially the same traffic capacity. The shapes of the covered areas by the different cells can also be different.

Referring particularly to FIG. 6A, at a given time (time 1, e.g., work hours on a weekday), most users of the site 600 are concentrated in small areas 610, 612 (e.g., office spaces), while the user density is relatively low in the larger area 614 (e.g., the shopping areas). To meet the different capacity demands in the different areas of the site 600, the cells 608a, 608b having a relatively small number of RUs are formed to cover the areas 610, 612, and the cell 608c having a relatively large number of RUs is formed to cover the area 614. Each cell 608a, 608b, 608c has substantially the same capacity.

The capacity demands at the site 600 may dynamically change. Referring to FIG. 6B, at another given time (time 2, e.g., lunch hours on a weekday), there is a high density of users in areas 618, 620 (e.g., restaurant areas in the shopping area 614 of FIG. 6A) and there are relatively few users are in the area 616 (e.g., office areas 610, 612 and store areas in the shopping area 614 of FIG. 6A). In response, one or more RUs at the site 600 are reassigned to different modems, manually, semi-automatically, or automatically, to form new cells 622a, 622b, 622c that cover the respective areas 616, 620, 618. The cell 622a contains a relatively large number of RUs. The cells 622b, 622c contain a relatively small number of RUs. Each cell 622a, 622b, 622c has substantially the same capacity. Dynamic capacity reallocation is implemented over the Ethernet network.

2. Total Capacity Increase

In some implementations, instead of or in addition to redistribution of capacity demands on a site (e.g., the site 600 of FIGS. 6A and 6B), the site also experiences an increase in the demand for total capacity. For example, the number of mobile subscribers increases, and/or the amount of data demand per subscriber increases. In these implementations, additional modem(s) (and accordingly additional cell(s)) can be introduced. For example, an existing unused modem in a CU of the radio network can be enabled and some of the RUs already deployed at the site can be reassigned to the new modem. This is a form of real cell splitting, which can be implemented in a convenient manner, e.g., as a software upgrade, and typically does not require any hardware changes to the installed RUs. Alternatively or in addition, one or more new modems can be added in a CU and/or one or more new CUs can be added to the radio network at the site. In some implementations, the total capacity of the site may be increased without affecting the previously deployed modems, cells, and RUs. The addition of more modems or CU hardware is significantly less expensive, both in terms of equipment and installation cost, as compared to adding many new access points across the site. The physical cell splitting method described above is implemented using the Ethernet network.

Downlink Inter-Cell Interference Control

In some implementations, inter-cell interference on PDSCH is reduced using hard frequency reuse (HFR). HFR can be implemented as a static or semi-static scheme, where the available resource blocks are divided between groups of cells according to K-way frequency reuse, where K is typically 3 or 7, so that each cell uses one-third (or one-seventh) of the available resource blocks. When only one cell transmits in each resource block, cells in the same frequency reuse group will not see any PDSCH interference from the others. Implementing HFR may cost (K−1)/K× 100% of the available bandwidth.

Figure 17A:
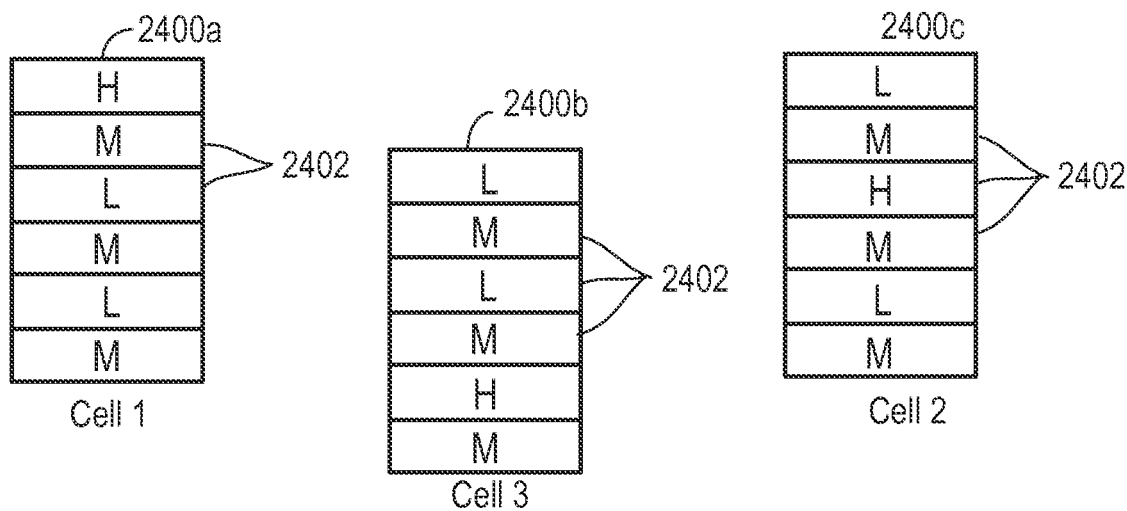
FIG. 17A is a block diagram showing an example of Soft Frequency Reuse (SFR) in LTE.

Alternatively, inter-cell interference on PDSCH can be reduced using Soft Frequency Reuse (SFR). In SFR, available resources are partitioned between neighboring cells in the same frequency reuse group. Different from HFR where each resource block is assigned a binary state (on/off), i.e., full power or no power at all, in SFR, each resource block can be assigned any transmit power level. For example, consider the following scheme with 3 different power levels (high (H), medium (M), low (L)). Referring to FIG. 17A, in every cell 2400a, 2400b, 2400c, each resource block 2402 is assigned to one of these power levels (H, L, or M), such that in resource blocks where a cell is assigned a high power, its two neighboring cells are assigned a low power. As a result, each cell will have two times as many low-power resource blocks as high-power ones. Each eNodeB will assign the UEs that it is serving to one of the power levels, typically during connection set up, based on the average SNR the UE is experiencing and possibly other factors such as the amount of data the UE has for transmission. The UEs that are in good conditions, e.g., located near the center of a given cell, or that have little data to send are assigned a low PDSCH power level, whereas UEs in poor conditions, e.g., located near the cell edge or having a lot of data for transmission are assigned a high PDSCH power. Accordingly, when the controller is serving a cell edge user, the UE will experience both a higher received signal power and a lower interference power level, boosting its average received SNR. When the UEs move and their channel conditions change, the controller can change the transmit power level for the UE by sending a higher layer reconfiguration message. When scheduling UEs for transmission on resource blocks, the controller may effectively need to run parallel schedulers, one per power level. In some implementations, the strict partitioning of the resources may lead to scheduling efficiency loss, for example, due to loss of some multi-user diversity. Such inefficiencies can become visible when the PDSCH power distribution of active UEs is mismatched relative to the power distribution of the resource blocks. Fixed power allocation can also be inefficient because it sometimes unnecessarily forces a low power transmission for a UE, even though a transmission at a higher power level may not cause any interference to a cell edge UE served by a neighboring cell in the same frequency reuse group when the UE is on the opposite side of the neighboring cell.

Coordinated Scheduling

The efficiencies of SFR can be improved by implementing the resource/power partitioning dynamically as part of a centralized multi-cell scheduler in the controller. The controller can dynamically allocate resource blocks and transmission power based on Radio Resource Management (RRM) reports received from the UEs. The implementation can avoid the need to assign transmit power levels to resource blocks semi-statically as in HFR or SFR.

In LTE, each cell will periodically broadcast its NeighborList in a System Information Block (SIB) Type 4 (SIB4). A connected UE will monitor the cells in the NeighborList and send Measurement Reports to the serving cell. These reports can be sent periodically or based on certain triggers.

The reporting period and the triggers are configured by the serving cell using an RRC-Reconfiguration message. Each UE's Measurement Report includes two measurements per cell: i) Reference Signal Received Power (RSRP) and ii) Reference Signal Received Quality (RSRQ). RSRP is the average received power of a CS-RS RE and is indicative of the received signal strength, and RSRQ is an additional signal quality indicator, which also provides a crude measure of interference. In some implementations, coordinated scheduling in the controller will work as follows:

Each baseband modem will send to the central coordinator the Neighbor List RSRP reports received from each of the connected UEs it is serving, as well as the amount of data each UE has waiting for transmission. Baseband modems may send these reports upon certain event triggers, for example when a UE is newly connected or disconnected, or when there is a significant change in the UEs RSRP reports. It is also possible for the central coordinator to poll the baseband modems to get these RSRP reports.

Central coordinator will use the received information to construct a bandwidth and PDSCH power allocation map for each UE and will periodically send this information to their serving baseband modems. The basic logic for creating this bandwidth allocation map is discussed below.

Individual cell modems communicate the PDSCH power allocation to the UEs, e.g., shortly after setting up the connection. For every subframe, individual baseband modems schedule UE data for transmission on PDSCH. Baseband modems schedule transmissions in a manner that is consistent with the power levels and the bandwidth resources allocated to each UE by the central coordinator.

Figure 17B:
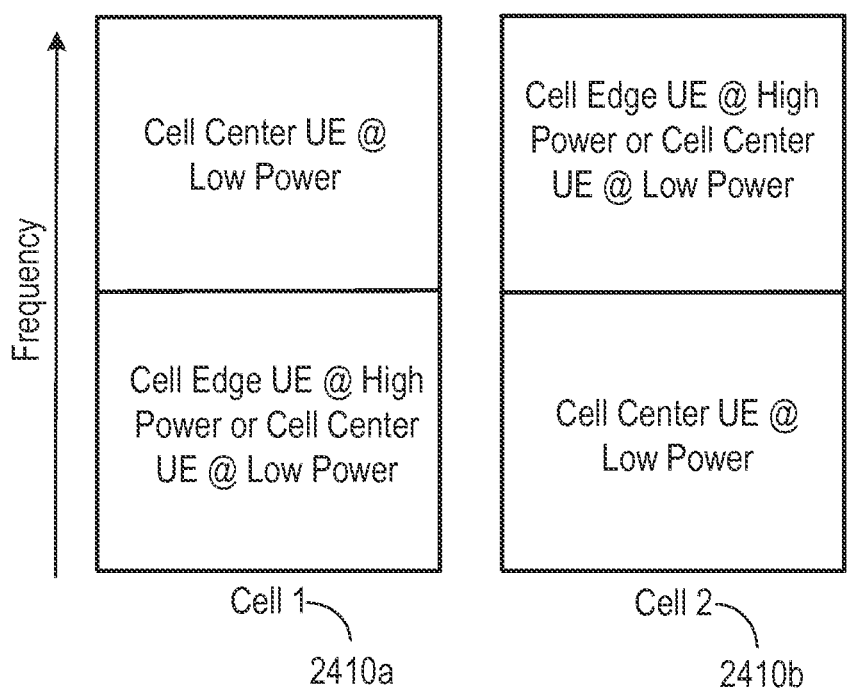
FIG. 17B is a block diagram showing an example of two cells implementing coordinated scheduling.

Next, examples using two adjacent cells are provided with FIG. 17B. Suppose each cell 2410a, 2410b has one connected UE, and each UE has similar amounts of data waiting for transmission. If both UEs are away from cell boundary, the central coordinator would allocate the full transmission band to both UEs since neither would experience significant inter-cell interference. If both UEs are near the cell boundary, then the cell coordinator would allocate 50% of the transmission bandwidth to each UE at full power. If one UE is near the cell boundary but the other is away from the cell boundary, then the cell coordinator could allocate the full transmission band to both UEs, but assign a lower power level to the UE away from the cell boundary to reduce interference with the UE near the cell boundary in the other cell. When the UEs have significantly different amounts of data waiting for transmission, the cell coordinator may give more bandwidth to the UE with more data.

In a more complex case where each cell has 10 connected UEs with 50% near the cell boundary and 50% away from the cell boundary and UEs near cell boundary have similar amounts of data as the UEs away from the cell boundary, central coordinator could allocate resources as follows: UEs that are away from the cell boundary are allocated the full transmission bandwidth, but at a reduced power level and UEs near the cell boundary are allocated 50% of the transmission band in a non-overlapping manner, but at full power. This is illustrated in the diagram below.

If the ratio of the number of UEs at cell edge to the number of UEs at cell center is different from 1:1 or the amount of data the UEs have for transmission near cell edge is different from the amount of data the UEs have for transmission at the cell center, the central coordinator can adjust the bandwidth and power allocation scheme to match the data needs of the UEs. The adaptability of the allocation can make the system significantly more bandwidth-efficient, while improving the cell-edge performance for disadvantaged UEs.

In some cases, there may be interference between the radio network and other networks, such as the macro network, and such interference is also considered and reduced. Release 8 supports messages in the X2 interface to allow eNodeBs to exchange information on power levels that are used in each of the resource blocks of the eNodeBs. In some implementations, the X2 interface is used between the controller of the disclosure and eNodeBs of the other radio networks (e.g., macrocells). The use can facilitate exchange of information between the controller and the eNodeBs to support coordinated scheduling. As an example, each eNodeB can indicate to the controller for each resource block whether the power level in that resource block will remain below a certain threshold, which is also separately signaled. This will allow the controller to schedule those UEs located at cell edges in resource blocks where the neighboring cells are transmitting below a certain power level. Similar techniques can be used to coordinate transmissions by different controllers in the same radio network, in which each controller can be informed about the SFR (Soft Frequency Reuse) power assignments via a management system or using a variant of the X2 interface.

Interference Control Techniques for Release 10 UEs

In some implementations, inter-cell control channel interference for hierarchical networks with closed access or range extension can be reduced by having the cells turn off (blank) power in all resource blocks in certain subframes. When no PDSCH data is transmitted in a subframe, there is also no control messages sent on the downlink control channel, which significantly reduces PDCCH interference. Moreover, by configuring these blank frames as so-called MBSFN (Multicast/Broadcast Subframes), one can also eliminate interference from CS-RS REs in the PDSCH region.

In an MBSFN subframe, CS-RS is only transmitted in the control region of the subframe. This at least eliminates the CS-RS interference into PDSCH (although not necessarily to PDCCH) transmissions in neighboring cells. MBSFN subframes in LTE were developed in Release 8 to carry broadcast/multicast signals, but they can also be used to send no data at all. A cell can be configured to send MBSFN subframes according to a certain pattern, and the pattern can be communicated to UEs via the System Information Block (SIB). Only 6 out of 10 subframes (#1, 2, 3 and 6, 7, 8) in a radio frame can be used for MBSFN. MBSFN frames have a control region of up to 1 OFDM symbol for 1 or 2 TX antennas and 2 OFDM symbols for 4 TX antennas.

Using blank MBSFN subframes alone may not eliminate inter-cell interference between PBCH, system information (SIB) and PSS/SSS transmissions. In some implementations, the inter-cell interference is between a small cell and a single macro cell, and the interference can be reduced or eliminated by offsetting the subframe numbering in the small cell relative to the macro cell. For example, if the relative subframe number of the small cell network has an offset of 2 relative to the macrocell network (i.e., subframe #0 in small cell network coincides with subframe #2 in the macrocell network), and macrocell subframes 2 and 7 are ABS/MBSFN subframes, small cell UEs can receive PSS/SSS and PBCH without any interference from the macrocell.

In some implementations, the macro cell coordinates its transmissions only with the controller and it is not necessary for the macro cell eNodeB to coordinate its transmissions with multiple base stations.

Coordinated MultiPoint (CoMP)

CoMP refers to a broad set of techniques that involve coordination between neighboring cells to reduce the effects of inter-cell interference. Full-blown coordination is referred to as Joint Transmission (JT). In JT, two or more baseband modems cooperate to serve their UEs via all RUs that they jointly control. All available antennas can be used to serve one UE with Single-User MIMO or multiple UEs simultaneously using Multi-User MIMO. In some cases where JT is implemented, UEs send CSI feedback not only for the antenna ports of their serving cell, but also for antenna ports of neighboring cells.

Figure 20A:
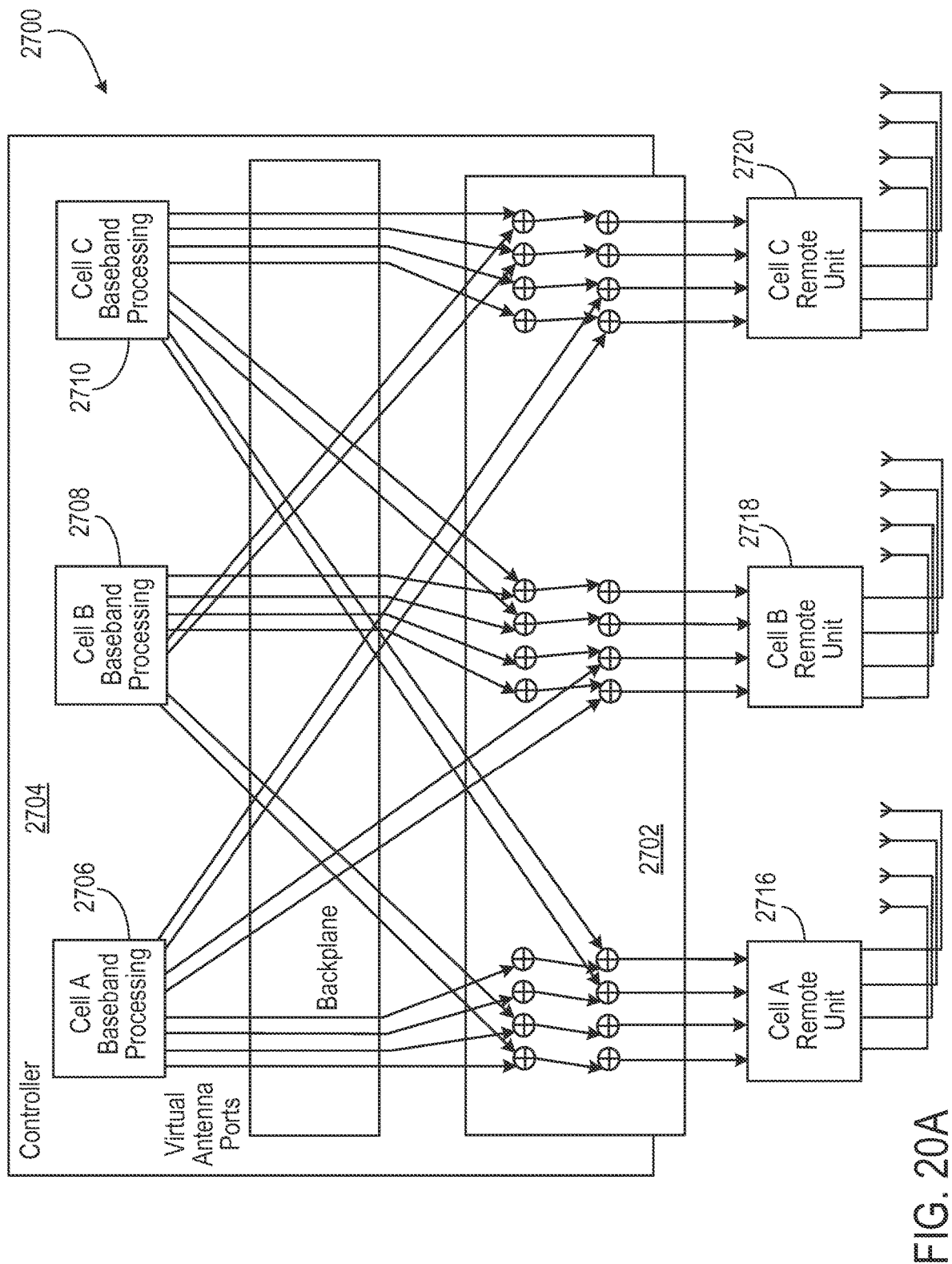
FIG. 20A-20C are schematic diagrams showing examples of combining signals from different baseband modems at the controller, by the baseband modems, and at the remote units, respectively.

In JT, similar to the single-cell multi-user MIMO, transport blocks for different UEs are processed in parallel and then combined before the IFFT. However, different baseband modems handle the processing of transport blocks of UEs in different cells. In some implementations, the controller may include a coordination unit for coordinating scheduling in different baseband modems. The coordination unit may also serve as an aggregation point for combining processed transport blocks originating in different baseband modems. As an example, a radio network 2700 shown in FIG. 20A includes three cells formed by baseband modem 2706 and remote unit(s) 2716, baseband modem 2708 and remote unit(s) 2718, and baseband modem 2710 and remote unit(s) 2720. The controller 2704 controlling the three cells includes a coordination unit 2702, that serves as an aggregation point for combining (represented by the symbol "(")") transport blocks originating from different modems 2704, 2708, 2710.

Figure 20B:
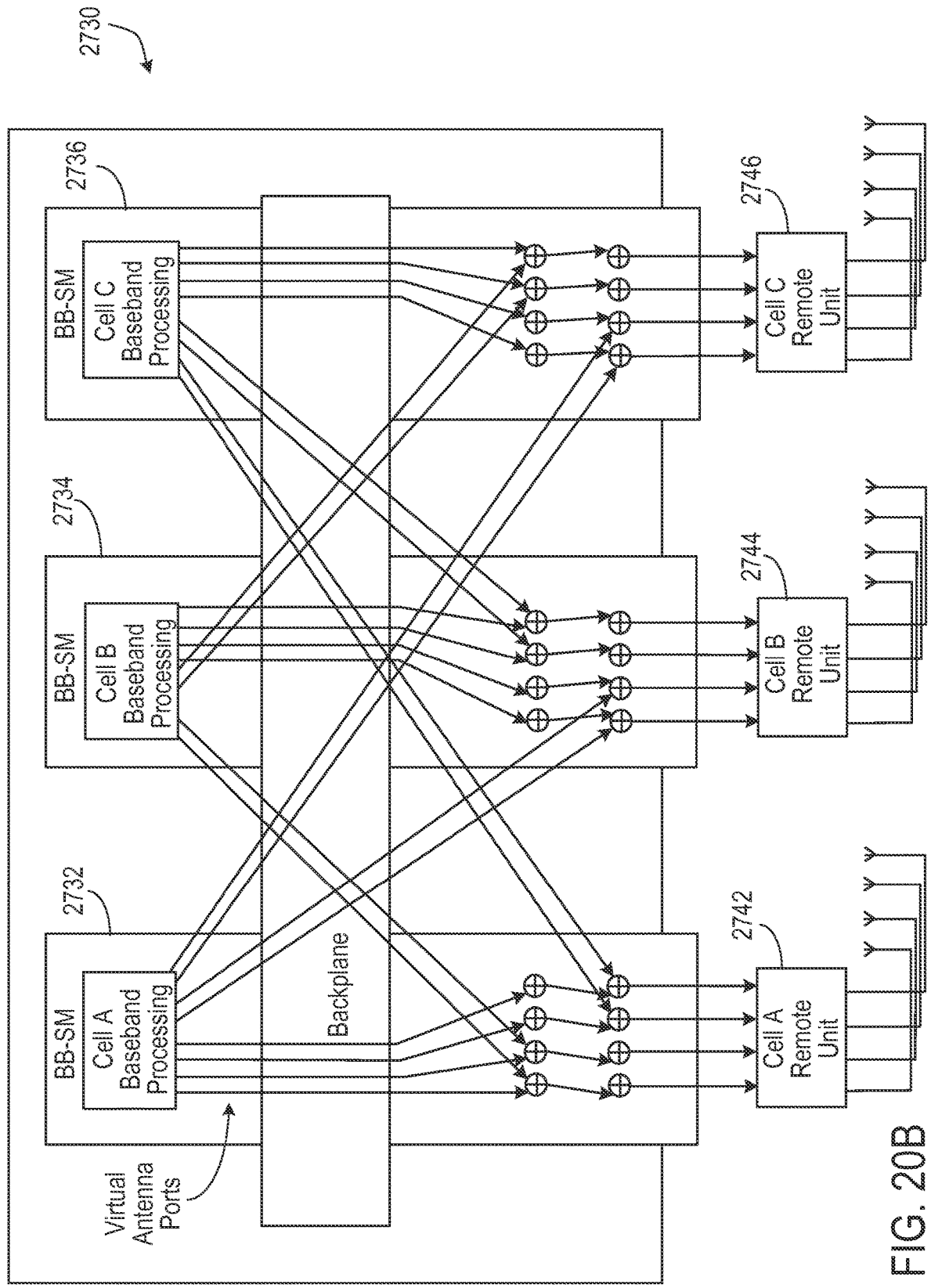

Alternatively, as shown in FIG. 20B, in a radio network 2730, baseband modems 2732, 2734, 2736 controlling cells that including remote unit(s) 2742, remote unit(s) 2744, remote unit(s) 2746, respectively, may directly exchange data among themselves so that each baseband modem can combine all signals destined to the UEs (not shown) they serve.

Figure 20C:
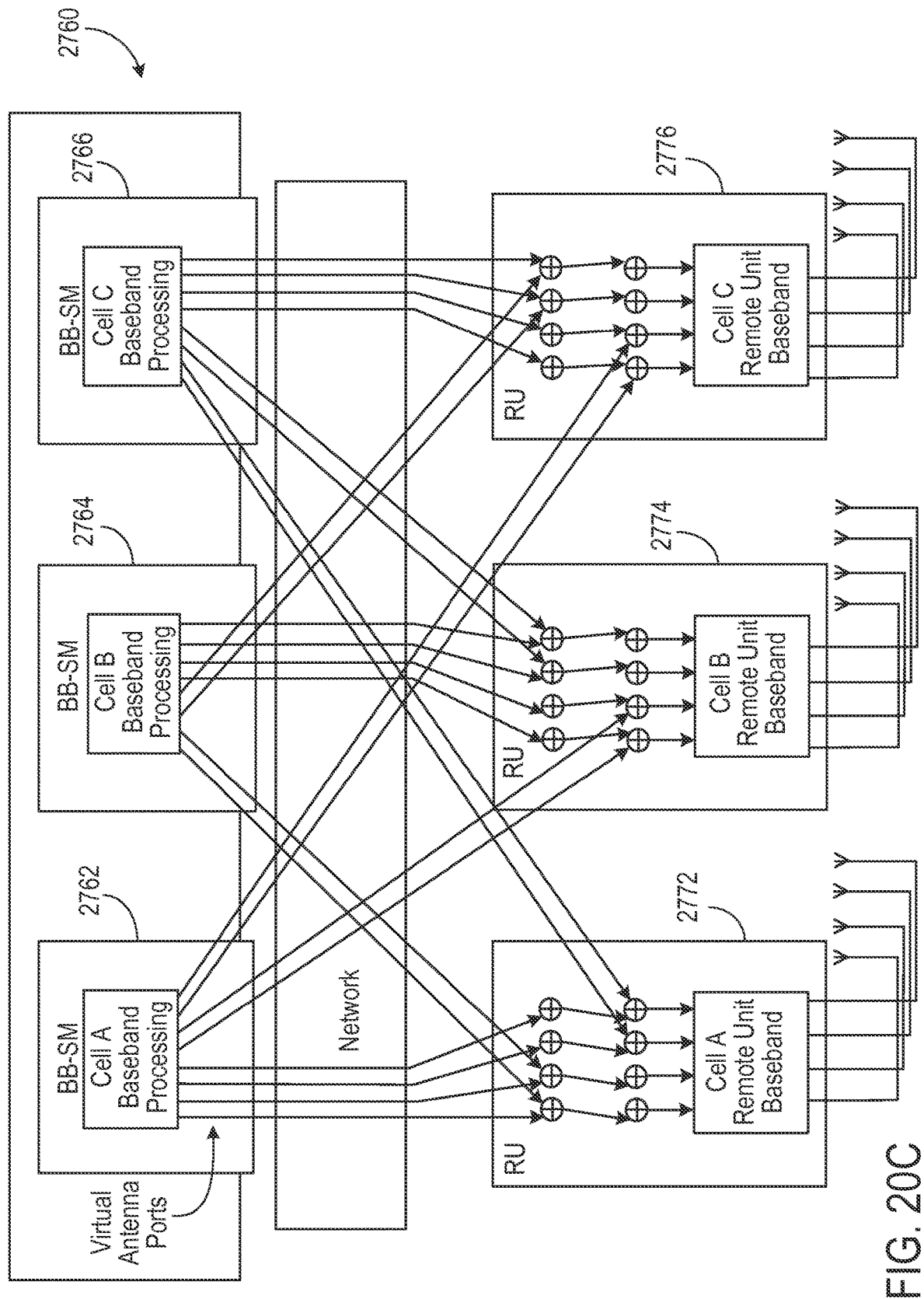

In some implementations, referring to FIG. 20C, in a radio network 2760, each baseband modem 2762, 2764, 2766 sends processed transport blocks to the RUs 2772, 2774, 2776 and the RUs perform the combining before applying the IFFT.

A somewhat reduced CoMP capability is called Dynamic Point Selection (DPS). In DPS, the serving cell sends PDSCH transmission on a time-frequency resource via only one cell TX antennas based on feedback cell selection received from the UE. The selected cell can be varied dynamically from one subframe to the next, and even between resource blocks within the same subframe. The selected cell may be different from the serving cell of the UE.

Another form of CoMP is Coordinated Beamforming (CB). In CB, when a serving cell is transmitting to a UE from its RUs, it also accounts for interference it will be creating for another UE in a neighboring cell. By choosing the precoding vector(s) to null the interference to the neighbor cell UE, the controller allows the baseband modem of a neighboring cell to serve the other UE at a higher data rate.

Release 11 has new capabilities to support coordinated transmission. For example, Release 11 allows UEs to report CSI for multiple CSI-RS, which may belong to different cells.

Communications Between the Controllers and the Remote Units

As explained previously, the CUs and the RUs of a radio network are connected through a switched Ethernet network (see, e.g., FIG. 3). Nominally, the interface between the CUs and the RUs will carry time-domain IQ symbols (sometimes also referred to as signals) in Ethernet frames. However, the bit rate of the time-domain IQ symbols may be too high for an Ethernet network. In some implementations, instead of sending the time-domain IQ symbols a compressed representation of the time-domain IQ symbols is sent to reduce the bit rate and to provide a data rate between the CUs and the RUs that is compatible with the low-cost switched Ethernet network. In some implementations, on the downlink, the CUs of the radio network send the IQ symbols when they are in the frequency-domain and prior to performing the IFFT (inverse fast Fourier transform) on the frequency-domain IQ symbols. A CU sends the frequency-domain IQ data representing each OFDM symbol to an RU, for example, by quantizing the real and imaginary components of the frequency-domain symbols. The quantizer output bits are then packetized in Ethernet frames and transmitted to the RUs over the Ethernet network. The RU reconstructs the quantized frequency-domain IQ symbols before applying the IFFT, inserting a cyclic prefix and performing the filtering, modulation and RF processing.

For the purpose of discussion, a radio network for a 10 MHz FDD LTE system is used as an example. For each TX antenna port, each OFDM symbol has 600 subcarriers and there are 14 OFDM symbols in every 1 ms subframe. Each subframe has 8,400 Resource Elements (REs) in total. Each RE corresponds to one subcarrier in one OFDM symbol. On the downlink, the first 1-3 OFDM symbols in a subframe are primarily used for control signaling (e.g., PDCCH, PHICH, and PCFICH) and the remaining OFDM symbols carry primarily user data on the shared data channel (PDSCH). Reference signals and other common channels are spread across the time-frequency axis.

Compressing the IQ symbols in the frequency domain can reduce the bit rate of the traffic sent over the Ethernet network. The compressed frequency-domain IQ symbols are transmitted over the Ethernet network without guard band zeros or any cyclic prefix. When the CU uses a 12-bit quantizer to compress the frequency-domain IQ symbols, the nominal bit rate of the frequency-domain IQ stream is about 403 Mb/s for 2 TX antennas and 806 Mb/s for 4 TX antennas. This represents a 45% reduction in bit rate compared to quantizing the time-domain IQ stream using the same quantizer (735 Mb/s for 2 TX antennas and 1471 Mb/s for 4 TX antennas). The rate between the CU and the RUs is reduced and the CU and the RUs are allowed to communicate through Ethernet links operating at a speed in the order of Gb/s with less latency.

On the uplink, in addition to RF processing and demodulation, the RUs remove the cyclic prefix from the time-domain IQ samples for each received OFDM symbol and apply the FFT to produce the frequency-domain IQ symbols. The information carried by the symbols is then quantized, packetized in Ethernet frames, and transmitted to the CU over the Ethernet network. When the 12-bit quantizer is used, the resulting bit rate of the frequency-domain IQ symbols on the uplink is substantially the same as that discussed for the downlink.

Described below are several more techniques that can further significantly reduce the data rate between the CU and the RUs.

1. Downlink Compression within a Cell

A. General Description of the Downlink Compression

Typically all antennas of the RUs that belong to the same antenna port in the same cell (unless explicitly specified as a virtual cell, the cells are physical) transmit the same LTE signal. Accordingly, on the downlink, for each antenna port the CU sends the same frequency-domain IQ symbol to each RU in the cell. The frequency-domain IQ symbols that the CU needs to send to the RUs include the CS-RS and CSI-RS reference signals, the control channels PUCCH, PCIFCH and PHICH, the shared data channel PDSCH, and the common channels PBCH and PSS/SSS.

In some implementations, the CU performs a simple form of compression by broadcasting the frequency-domain IQ symbols to all RUs in the cell using broadcast Ethernet frames. To implement the broadcast, all RUs in the same cell are configured to belong to the same VLAN (virtual local area network). The CU sends to its nearest Ethernet switch an Ethernet broadcast frame that carries an ID of the VLAN. The Ethernet switch in turn sends the Ethernet broadcast frame to all the RUs on the VLAN that are directly attached to the Ethernet switch and to other Ethernet switches that provide paths to other RUs on the same VLAN. In such implementations, traffic load on the Ethernet switches on the downlink does not grow with the number of RUs that belong to the same cell.

The broadcast on the Ethernet network and the implementation of the VLANs can simplify processing complexity and reduce the data rate between the CU and the Ethernet network. The reduction in the data rate is desirable to reduce the Ethernet frame size and latencies at the switches.

For the purpose of discussion, the previously introduced example of a radio network implementing the 10 MHz FDD LTE with 2 TX antennas is also used as an example in the discussion below. The 8,400 frequency-domain IQ symbols in each 1 ms subframe are organized in the form of a resource grid that has 600 OFDM subcarriers in 14 OFDM symbols. The 14 OFDM symbols are split into two time slots each having a length of 0.5 ms. Each time slot is further split into 50 PRBs (physical resource blocks), each containing 84 frequency-domain IQ symbols arranged in the form of a 7×12 grid. In some implementations, each PRB carries at most one PDSCH mixed with reference signals, such as the CS-RS and the CSI-RS. The PRBs can also carry one or more LTE downlink control channels PDCCH, PHICH or PCFICH, or the common channels PSS/SSS and PBCH, mixed with the CS-RS and the CSI-RS.

The downlink frequency-domain IQ symbols are discrete-amplitude symbols chosen from a signal constellation. The PSS/SSS is carried on frequency-domain IQ symbols that lie on a circle. The PDCCH, PCFICH, PBCH, CS-RS, CSI-RS and DM-RS are carried on frequency-domain IQ symbols chosen from a QPSK/BPSK signal constellation. Without precoding, the frequency-domain IQ symbols that carry the PDSCH are chosen from a QPSK (quadrature phase-shift-keying), 16-QAM (quadrature amplitude modulation), or 64-QAM signal constellation. The PDSCH modulation order is chosen based on the signal quality reported by a UE. In the presence of precoding, the frequency-domain IQ symbols that carry PDSCH are based on the product of a precoding matrix with an input vector, whose components are symbols chosen from a QPSK, 16-QAM, or 64-QAM constellation.

The CU can choose downlink frequency-domain IQ symbols directly from a discrete-amplitude QAM constellation or by applying a matrix operation to symbols chosen from a discrete-amplitude QAM constellation. The average energy of the frequency-domain IQ symbols can vary between different downlink channels, but is fixed for a given channel within a Resource Element Group, or REG (for control channels) or a PRB (for PDSCH). A REG is a group of 4 consecutive REs in an OFDM symbol. In some implementations, the PDSCH on the $4^{th}$ OFDM symbol of the slot can have a different average energy level from those fixed average energy levels.

B. Methods of Compressing the Frequency-Domain IQ Symbols

The symbols transmitted between the CU and the RUs can be compressed in various ways. In the discussion below, the first three methods, Methods I, II, and III, are based on quantization, and the fourth method, Method IV, is based on modulation-level compression.

I. Fixed Quantization

In this method, the frequency-domain IQ symbols are quantized using a fixed uniform scalar quantizer having a fixed rate R and a fixed step size $\Delta$. The step size is selected by the CU based on the expected probability distribution of the frequency-domain IQ symbols. In implementations, the CU quantizes the real and imaginary components of the frequency-domain IQ symbols serially and transmits the binary data representing the quantized IQ symbols for each TX antenna to the RUs. The values of R and $\Delta$ are sent to the RUs when the RUs initially connect to the CU. The RUs use the information about the rate R and the step size $\Delta$ to reconstruct the frequency-domain IQ symbols based on the data received from the Ethernet network. In some implementations, when there is a major change in configuration of the radio network that changes R and/or $\Delta$, the CU sends the modified R and/or $\Delta$ to the RUs. In the example with the 10 MHz FDD LTE having 2 TX antennas per RU and a fixed 12-bit quantizer, the quantized frequency-domain IQ stream has a data rate of 403 Mb/s between the CU and the RUs.

II. Adaptive Step-Size Quantization

Instead of applying a fixed quantizer step size $\Delta$, in this method, the step size is dynamically varied based on the average energy levels of the downlink channels, which can be different for different channels. Dynamically adjusting the quantizer step size can reduce the average mean-squared quantization errors for a given bit rate R of the quantizer. In some implementations, the dynamically adjusted step size can also be used to reduce the quantizer rate R without increasing the quantization error.

Information about the dynamically adjusted quantizer step sizes is contained in side information that a CU sends to the RUs. The RUs can reconstruct the quantized frequency-domain IQ symbols based on the step size information. In some implementations, the CU sends some side information to the RUs once per subframe, and the other side information once per-REG or once per-PRB. At the beginning of each subframe, the CU sends side information that contains information about the position of the CS-RS and the CSI-RS, the step size associated with the CS-RS and the CSI-RS, and the length of the control region. In some implementations, the information about the actual step size of the quantizer is sent before each REG (in the control region) or before sending any PDSCH data in each PRB (in the PDSCH region). The PDSCH energy levels can be different in the $4^{th}$ OFDM symbol of a time slot. Accordingly, two step sizes can be sent per PRB. The transmission of side information can be distributed across the subframe evenly to reduce the peak data rate. When each step size is represented by a 12-bit index, the side information takes less than 5 Mb/s of link capacity.

In some implementations, the same step size is used for both TX antennas of a RU to limit the amount of side information. In other implementations, the step sizes for the two TX antennas can be different.

The rate R of the quantizer is chosen so that the quantization noise does not impact the UE's receiver performance, including when the most demanding (i.e., most noise-sensitive) MCS (modulation and coding scheme) is used in PDSCH. In some implementations, a 9-bit or 10-bit quantizer delivers an SQNR (signal-to-quantization noise ratio) in the range of 50-60 dB, which is more than 20 dB higher than the target SINR (signal-to-interference-plus-noise ratio) required for uncoded 64-QAM. A quantizer rate of 9-10 bits can produce a maximum data rate of 302-336 Mb/s, which represents a 17-25% compression relative to the maximum data rate in Method I.

III. Adaptive Rate and Step Size Quantization

In a third compression method, both the rate R and the step size Δ of the quantizer are dynamically adjusted based on the quantization noise tolerance of each downlink channel. Dynamically varying the quantizer rate R can reduce the average data rate but does not reduce the peak data rate, and the reduced average data rate can reduce the average packet length and the latencies at the Ethernet switches.

The relationship between the quantizer rate R and the performance of the downlink channel is explained below using an example scenario where each UE has one RX antenna and each RU has one TX antenna. The discussions and the calculations can be readily extended to UEs and RUs that have more than one antenna. In the example, the frequency-domain IQ symbol r received by the UE can be written as:

$$r = (s+q) \times h + i + w,$$

where s represents a complex-valued frequency-domain IQ symbol having an average energy $E_s$, h is the corresponding complex-valued frequency-domain channel gain, q is the quantization noise, and i and w represent the received interference and thermal noise, respectively. The signal-to-quantization noise ratio of the quantizer, SQNR, is defined to be $E_s/E_q$, where $E_q$ is the average energy of the quantization noise.

The signal to interference plus noise ratio received at the UE is denoted as SINR' and can be written as:

$$\begin{aligned}\text{SIN}R' &= E_s \times |h|^2/(E_i + E_w + E_q|h|^2) \\ &= \text{SIN}R/(1 + \text{SIN}R/SQNR)\end{aligned},$$

where $\text{SINR} = E_s \times |h|^2/(E_i + E_w)$ is the SINR received at the UE in the absence of any quantization noise, $E_i$ is the energy of the interference noise, and $E_w$ is the energy of the thermal noise. Based on the equation for SINR', when SQNR>>SINR, SINR'≈SINR. In other words, the quantization noise does not have a substantial or noticeable impact on the performance of the signal received at the UE when SQNR>>SINR.

The SQNR increases with the quantizer rate R, e.g., by about 6 dB for every increment of R by 1 when R is large. If $\text{SINR}_{target}$ represents the desired SINR required at the UE for a given MCS (modulation and coding scheme) for reliable reception, implementing the quantization does not cause SINR' to drop noticeably below the $\text{SINR}_{target}$ when the quantizer rate R is chosen such that SQNR>>$\text{SINR}_{target}$. Accordingly, when the target SINR for a modulation format is low, the rate R (i.e., the accuracy) of the quantizer can be reduced.

In some implementations, the quantizer rate R for PDSCH transmission will be the highest for PDSCH MCS of 28 and will be the lowest for PDSCH MCS of 0, which respectively correspond to the most and least demanding (in terms of noise sensitivity) modulation and coding schemes currently supported in the LTE standard. In the control channels, the underlying modulation format is QPSK/BPSK and a relatively low quantizer rate R can be used. In some implementations, when a relatively low quantizer rate is used, the SINR received at UEs having good channel conditions can be reduced by the quantization noise. However, the reduced SINR does not substantially affect the performance of the UE when the reduced SINR is above the target SINR.

Similar to Method II, the CU sends side information that contains information about the step size of the quantizer to the RUs to help the RUs reconstruct the frequency-domain IQ symbols from the received data bits. In addition, the CU also dynamically sends the quantizer rate R to the RUs for each REG and PRB and for the reference signals CS-RS and CSI-RS. Dynamically varying the quantizer rate and step size can reduce the quantization noise caused by a fixed average quantizer rate. Alternatively, when a certain average amount of quantization noise is permissible for the signal transmissions, the average quantizer rate can be reduced when the quantizer rate is dynamically adjusted instead of being fixed.

In addition to compressing the symbols being sent to the RUs, the CU can further reduce the average data rate between the CU and the RUs by not sending any data for unused REGs or PRBs. For example, when only 50% of the REGs and PRBs in a time slot are in use, e.g., carrying data, the average data rate is further reduced by 50%.

When multiple TX antennas are used, the same quantizer rate and step size can be used for all antennas of each RU so that the amount of side information does not grow with the number of TX antennas. In some implementations, the quantizer rate and the step size can be different for each antenna and the average quantizer rate is then further reduced.

In the description of the quantizers in Methods I-III, we have assumed a scalar uniform quantizer, because of its ease of implementation. However, these methods are equally applicable to other types of quantizers, such as non-uniform scalar quantizers, vector quantizers, etc. We varied the step size and the rate of the quantizer to adapt the quantizer to the characteristics of the quantized symbols. It is also possible to vary other parameters of the quantization process, such as the gain of the quantizer input.

IV. Modulation-Level Compression

In this fourth compression method, the CU sends the frequency-domain IQ symbols in the form of binary data based on the structure of the frequency-domain IQ symbols known to the CU and without implementing any quantization. As discussed previously, the frequency-domain IQ symbols belong to a discrete-amplitude signal constellation, or they can be derived by transforming modulation symbols chosen from a discrete-amplitude signal constellation. By sending binary data representing the discrete-amplitude signals along with side information required to apply any required transformations, the controller can avoid quantization noise.

In use, the CU sends the binary data representing the modulation symbols to the RUs one OFDM symbol at a time in the same order as the symbols are to be transmitted by the RUs over the air. In particular, the binary data that represents the control channels is sent in groups of REGs, and the binary data that represents the shared data channels is sent in groups of 12-symbol blocks that belong to the same PRB. Furthermore, at the beginning of each time slot, the CU sends some portions of side information to the RUs. Other portions of the side information are sent at the beginning of each REG in the control region and before sending the data in the first PDSCH OFDM symbol of that time slot. The RUs parse the received data and reconstruct the frequency-domain IQ symbols based on the side information.

In this method, some of the baseband modem transmitter functions are implemented in the CU and some other baseband modem transmitter functions are implemented in the RUs. For example, the forward-error correction function is implemented in the CU, whereas the precoding and the IFFT functions are implemented in the RUs. The downlink processing can be partitioned between the CU and the RU in many other ways. It is even possible to move the entire downlink modem processing to the RU. In this case the controller sends all necessary data, including the transport block data, to the RU along with all necessary side information. This will reduce, e.g., minimize, the data rate between the controller and the RUs, but may increase the amount of processing in the RUs. In some cases, the interface between the controller and the RUs is implemented using a so-called FAPI (Femto Application Platform Interface) developed by the Small Cell Forum, except that the FAPI will be implemented over an Ethernet network.

Below, we discuss the representation of frequency-domain IQ symbols by binary data for each type of downlink channel.

(i) CS-RS Reference Symbols

Figure 7:
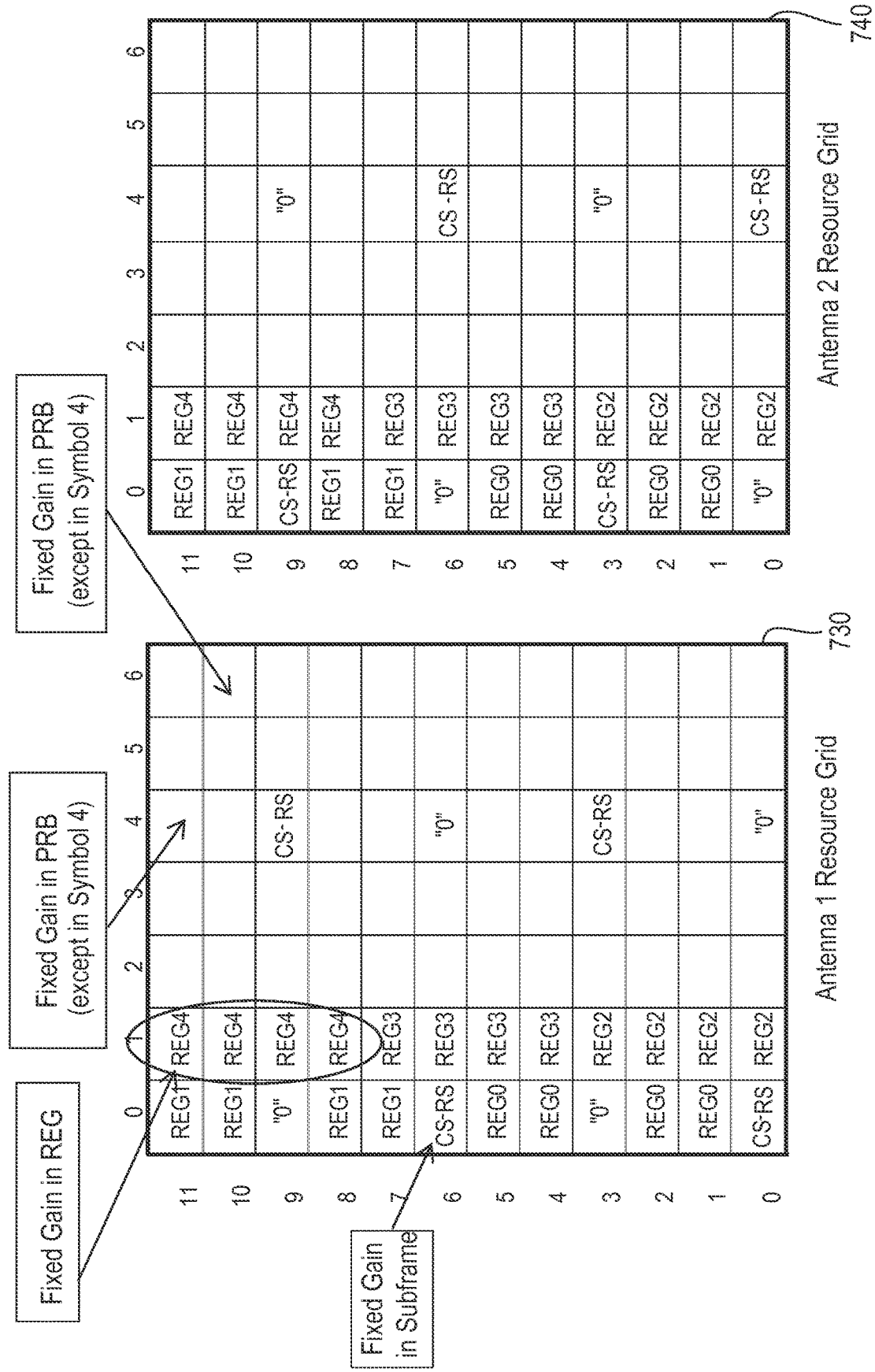
FIG. 7 is a block diagram showing examples of two resources grids for two respective antennas of a remote unit (RU).

The CS-RS reference symbols are complex-valued binary symbols chosen from a QPSK constellation, whose gain may remain constant during the subframe. When each RU has multiple TX antennas, the CS-RS reference symbols also include "zero" symbols to avoid interference between the antennas. The CS-RS reference symbols on different antennas differ only in their relative positions on the resource grid (see, e.g., grids 730, 740 of FIG. 7). The CU includes in the side information a 3-bit index to represent the CS-RS frequency shift and a 12-bit number to represent the gain. The side information is sent to the RUs at the beginning of each subframe, through which the RUs learn about the positions of all CS-RS reference symbols in the resource grid for all TX antennas, except for a fixed frequency index offset between 0 and 5. The frequency index offset depends on the Cell-ID. Based on the frequency index offset, the RUs can determine the position of the zero REs, for which no data bits need to be sent. For the nonzero CS-RS REs, two bits are sufficient to represent each CS-RS symbol. The RUs receiving the binary data, two bits for each RE, can reconstruct the IQ symbol by inserting the correct complex-valued CS-RS symbols and the "zero" REs into the resource grid for each TX antenna based on the side information.

(ii) CSI-RS Reference Symbols

The CU can handle the CSI-RS symbols used in Transmission Mode 9 of Release 10 similarly to the CS-RS reference symbols discussed in section (i). At the beginning of each subframe, the CU sends to the RUs side information to indicate the position of the CSI-RS symbols in the resource grid. The side information can be based on parameters such as CSI configuration, ZeroPower CSI-RS Index, scale factor, etc. Using the side information and the data received from the CU, which is two bits for each RE, the RUs can insert the correct complex-valued CSI-RS symbols and the "zero" REs into the resource grid for each TX antenna.

(iii) Control Symbols

The frequency-domain IQ symbols in the control region (i.e., the designated first 1-3 OFDM symbols) that are not used by CS-RS belong to PCIFCH, PHICH or PDCCH. In some implementations, the control symbols are represented by binary data on a per REG basis. Each REG has 4 REs that are contiguous, except for the CS-RS reference symbols inserted in between. Each control channel is carried in multiple REGs that are spread in frequency (i.e., the REGs are located in different parts of the transmission frequency band). For each REG, the CU sends side information to the RU for the RU to parse the received binary data. The side information is sent per REG and may include 2-bit data to represent the channel type (e.g., PDCCH, PCFICH, PHICH, or unused) and 12-bit data to represent channel gain. At the beginning of each subframe, the CU sends to the RU 2-bit side information to indicate a length of the control region. In some implementations, to process the received signals, the RUs do not need to know in advance the location of the different control channels in the control region.

When each RU has multiple TX antennas (e.g., N TX antennas, where N is an integer larger than 1), the radio network transmits the control symbols using Alamouti TX diversity. In implementations, the CU sends the 16-bit binary data that represents the 4 QPSK (quadrature phase shift keying) symbols in each REG to the RU. The RU implements sign change and conjugation operations for TX diversity to generate the 4×N QPSK symbols that represent the frequency-domain IQ symbols in the REG for all N TX antennas.

The PHICH can be represented by binary data based on the fact that the transmitted frequency-domain symbols for PHICH are also chosen from a discrete signal constellation. Each PHICH represents 1-bit of ACK/NAK (acknowledgement/negative acknowledgement) information for uplink HARQ (hybrid automatic repeat request). The PHICH bit is encoded into a complex-valued 12-symbol sequence chosen from a binary BPSK signal constellation with a 45 degree rotation. The CU can transmit binary data representing up to 8 PHICH bits together in a PHICH group. For the transmission, the complex-valued symbols representing all PHICH bits in the PHICH group are summed together to obtain 12 complex-valued PHICH group symbols. As can be seen these symbols are chosen from a discrete-amplitude constellation. The real and imaginary components of the 12 complex-valued PHICH group symbols can each be represented by an integer in the interval [−6, 6], together with a gain that may remain constant during the subframe. The 12 complex-valued PHICH group symbols are mapped to 3 REGs, e.g., in the first OFDM symbol of the control region after applying the TX diversity on a per REG basis. The CU sends to the RUs a gain value represented by a 12-bit index, followed by 8-bit data that represents the real and imaginary components of each complex-valued PHICH group symbol before applying the TX diversity. The RUs can use the received information to apply the TX diversity and reconstruct the frequency-domain IQ symbols for all TX antennas.

In some implementations, the PHICH symbols can also be transmitted using a 16-bit representation of the real and imaginary components of the frequency-domain IQ symbols for each antenna. Compared to the 8-bit representation, the data rate between the CU and the RUs for the 16-bit representation is higher; however, the RUs can reconstruct the frequency-domain IQ symbols in a simpler way.

PCFICH and PDCCH can also be readily represented by binary data and transmitted from the CU to the RUs. In particular, each REG for PCFICH or PDCCH carries 4 QPSK symbols, which are sent on multiple TX antennas using Alamouti TX diversity. The CU sends 2 bits of data per RE, or 8 bits of data per REG to the RUs, which represent the modulated symbols before TX diversity.

(iv) PDSCH Symbols

Most of the REs in the OFDM symbols that are outside the control region are used by PDSCH, except that the PBCH uses the middle 72 subcarriers in the first 4 OFDM symbols in the first time slot of every 10 ms radio frame, and that the PSS/SSS uses the middle 72 subcarriers in the last 2 OFDM symbols in time slots 0 and 10 of every 10 ms radio frame. The PDSCH symbols for single-antenna transmission are complex-valued and are chosen from a QPSK, 16-QAM or 64-QAM constellation, which can be represented by 2, 4 or 6 bits of data, respectively. The gain of a given PDSCH symbol may remain constant during the subframe (except possibly in the 4$^{th}$ OFDM symbol of each time slot), and the gain for different PDSCH channels can be different. Resources assigned to each PDSCH are in one or more consecutive VRBs (virtual resource blocks) and can be mapped to PRBs in a localized (consecutive) or distributed (non-consecutive) manner. In some implementations, the CU assumes that the PDSCH changes at every PRB boundary, and sends side information to the RUs on a per PRB basis. The update of side information on a per PRB basis can simplify the operation of the RUs in reconstructing the PDSCH symbols. In other implementations, localized resource allocation is used and the CU sends side information on a per channel basis, which is less frequent than sending the side information on a per PRB basis.

For the purpose of discussion, we assume that the CU sends the per-PRB side information before sending the first OFDM symbol of the time slot outside the control region. The side information includes a 1-bit index that indicates whether or not PDSCH symbols are present for transmission and another 1-bit index that indicates the presence of PSS/SSS in even-numbered time slots or the presence of PBCH in odd-numbered time slots. The side information also includes a 2-bit index that represents the modulation order (BPSK for DM-RS, QPSK, 16-QAM or 64-QAM), a 4-bit index that represents the PDSCH transmission mode (e.g., FIG. 8, TM #1-9), and an index representing the precoding coefficients or a 16-bit representation of each complex-valued precoding coefficient (TM #9). The side information is followed by binary data representing the PDSCH modulation symbols.

The RUs use the side information to complete the baseband modem operations and generate the frequency-domain IQ symbols. In the implementations where the PDSCH uses Transmission Mode 9, the demodulation reference symbols (DM-RS) can also be viewed as QPSK symbols using the same gain as the PDSCH symbols. Accordingly, no special treatment may be required for the REs of DM-RS.

In the previously discussed example in which a radio network implements the 10 MHz FDD LTE, there are 50 PRBs in each 0.5 ms time slot. Each OFDM symbol that carries no CS-RS has 12 PDSCH REs in each PRB, whereas the OFDM symbols that carry CS-RS have 8 PDSCH REs per PRB (assuming that there are 2 TX antennas). A PRB that carries PBCH has 32 REs for the PDSCH.

When multiple antennas are in use for a PDSCH, the CU can reduce the amount of data that needs to be sent to the RUs based on the knowledge of the underlying structure of the multiple-antenna transmitter. The frequency-domain IQ symbols in TX diversity are chosen from a QAM constellation, and at least some of these IQ symbols are dependent on each other. For example, a group of N$^2$ frequency-domain IQ symbols transmitted on N TX antennas can be derived from N input modulation symbols, which are chosen from a discrete-amplitude complex-valued constellation, using operations such as sign changes or complex conjugations. Accordingly, instead of sending information for N×N=N$^2$ frequency-domain IQ symbols, the CU can send information for the N input modulation symbols and indicate that TX diversity is used. The RUs can implement the TX diversity operations to produce the N$^2$ symbols for transmission in N subcarriers on N TX antennas. As a result, the data rate between the CU and the RUs does not increase when the number of TX antennas is increased.

In general, the frequency-domain IQ symbols for an N-antenna MIMO transmitter can be written as:

$$Y=PX,$$

where X is a K-dimensional PDSCH input vector whose components are chosen from the underlying QAM signal constellation, P is an N×K precoding matrix, and K is the number of layers being transmitted. Instead of quantizing Y as if it were some continuous random vector, the CU sends data bits that represent the K modulation symbols in the vector X along with the precoding matrix. The precoding matrix does not vary within a subframe, and, in some implementations, the CU only sends the precoding matrix once per PRB instead of once every OFDM symbol.

For Release 8 closed-loop MIMO, the precoding matrix is chosen from a fixed set and the precoding matrix can be represented by a short precoding index of a few bits. In the transmission Mode 9 of Release 10, less than 64 bits are needed to represent the precoder coefficients (16 bits per complex coefficient) (assuming that there are 2 TX antennas).

The data rate for the frequency-domain IQ symbols can be significantly reduced when the number of layers K is less than the number of the TX antennas N. The data rate increases with the number of layers. However, even when K=N (i.e., full-rank spatial multiplexing), sending binary data representing the QAM modulation symbols instead of sending the precoded frequency-domain IQ symbols can reduce the data rate and avoid quantization noise. To transmit K layers, the data rate for the PDSCH input data is K times the data rate for a single-layer.

(v) Other Symbols

The CU can readily handle the binary representation of symbols on the other downlink common channels. For example, PBCH REs can be treated similarly to PDSCH using QPSK modulation and TX diversity. The CU can use 1 bit of side information to indicate the presence or the absence of the PBCH in odd time slots. In some implementations, the REs that carry the synchronization symbols PSS/SSS are sent without any compression as 16-bit integers to represent the real and imaginary components of the frequency-domain IQ symbols. Similarly, 1 bit of side information can be used to indicate the presence or the absence of PSS/SSS in even time slots.

(vi) Summary

In the method we described above, the downlink baseband modem functions are split between the CU and RUs in such a way that reduces the data rate on the Ethernet network, while keeping the processing complexity very low at the RUs. For example, using the specific partitioning described above, the bit rate on the Ethernet network can be reduced to around 100 Mb/s for two transmit antennas and two layer PDSCH transmission. Actual data rate will be even lower when the airlink resources are not 100% utilized. In addition to a lower bit rate, the method also eliminates quantization noise altogether. Other ways of partitioning the data between the CU and the RUs are possible. For example, it is possible for the RUs to perform all the physical layer functions, while the scheduling and higher-layer processing is performed in the CU.

2. Uplink Compression within a Cell

A. General Description of the Uplink Compression

The LTE uplink in the radio network of this disclosure is different from the downlink in many ways. For example, the uplink signals received by different RUs in the same cell are not identical. The different uplink signals can have different channel gains, noise and interference levels which can be exploited by the controller for power and diversity gains. However, when a cell contains multiple RUs and all RUs send their received signals to the CU, the CU receives a larger amount data on the uplink than it broadcasts to the RUs on the downlink.

Similar to the techniques used in downlink compression, the techniques for uplink compression also take into account one or more of the following additional differences between uplink and downlink. First, on the uplink, without full-blown demodulation and decoding, the RUs cannot know precisely the discrete-amplitude modulation symbols transmitted by the UEs.

Second, the modulation format on the LTE uplink, SC-FDMA (single carrier frequency division multiple access), is different from the OFDMA scheme used on the downlink. Instead of using the modulated symbols or their precoded versions as frequency-domain IQ symbols, the modulation symbols in SC-FDMA are time-domain signals. These time-domain signals are transformed by the UE into frequency-domain IQ symbols using a DFT (Discrete Fourier Transform). Compared to the symbols on the downlink, the frequency-domain IQ symbols obtained from the DFT transformation can exhibit a less uniform and more like a truncated Gaussian statistics, especially when the UE is assigned many RBs.

On the uplink, resources in a PRB are allocated on a contiguous manner, and frequency hopping may be utilized between two time slots of a subframe. As an example, the PUSCH PRBs (with DM-RS in the middle) assigned to a UE are consecutive and can hop between slots 0 and 1 with a known gap between them. The $4^{th}$ OFDM symbol of each assigned PUSCH PRB is DM-RS. The SRS, if present, is transmitted in the last symbol of the subframe, e.g., at every other subcarrier. The PUCCH transmissions include QPSK symbols modulating a complex-phase sequence and an orthogonal cover transmitted over two PRBs at the opposite edges of a band. In some implementations, multiple UEs can transmit PUCCH signals on the same PRBs in the same subframe. The first L (which is an integer) PRB pairs carry CQI/PMPRI transmissions, possibly together with HARQ ACK/NAKs, using Format 2. Additional PRB pairs are available for HARQ ACK/NAKs and scheduling requests.

Figure 8:
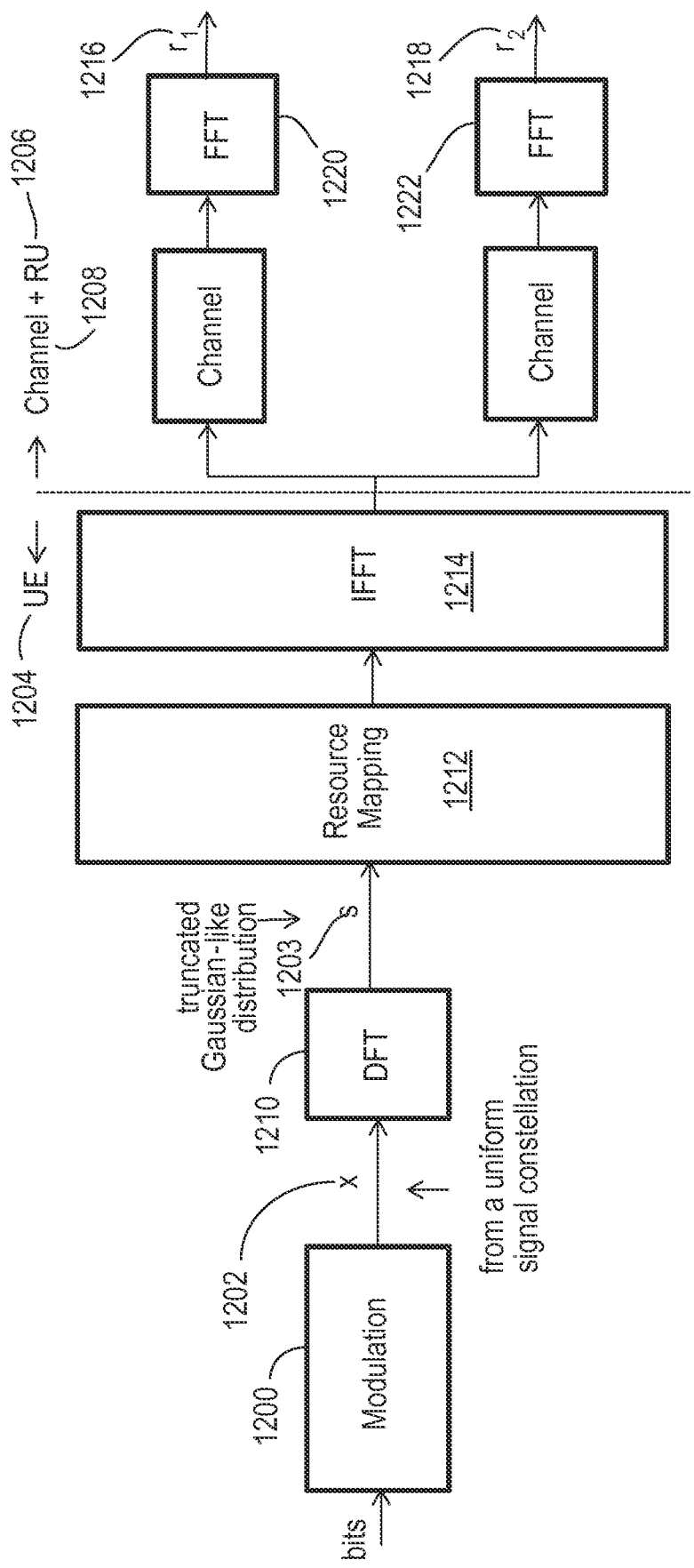
FIG. 8 is a block diagram showing an example of signal transmissions between a user equipment (UE) and a remote unit (RU).

Referring to FIG. 8, for PUSCH transmission, a UE 1204 modulates 1200 and transforms 1210 time-domain symbols×1202 into frequency-domain symbols s 1203, performs a resource mapping 1212, and then performs a full IFFT 1214 to generate the time-domain signals for transmission over the air to the RUs. One or more RUs 1206 in a cell receive the transmitted signals through one or more channels 1208 via its antennas, apply RF processing to generate the received time-domain IQ signals, and apply an FFT 1220, 1222 to produce the received frequency-domain IQ signals $r_1$ 1216, $r_2$ 1218.

Assuming that a cell includes K RUs, where K is a positive integer, and that the kth RU has two antennas for receiving signals (RX antennas) from a UE that has one TX antenna for transmitting the signals, the frequency-domain IQ symbol, $r_{kl}$, received at the l'th RX antenna (l=1 or 2) of kth RU in some fixed frequency position in an OFDM symbol can be expressed in the following forms:

$$r_{k1}=s \times h_{k1}+i_{k1}+w_{k1},$$

$$r_{k2}=s \times h_{k2}+i_{k2}+w_{k2},$$

where s is the frequency-domain IQ symbol transmitted by the UE (see, e.g., FIG. 8), $h_{k1}$ and $h_{k2}$ are the channel coefficients, $i_{k1}$ and $i_{k2}$ represent interference from UEs in other cells, $w_{k1}$ and $w_{k2}$ are thermal noise, respectively for the two RX antennas.

The total energy levels of the received symbols $r_{k1}$ and $r_{k2}$ at the kth RU are:

$$E_{t,kl}=E_s \times |h_{kl}|^2+E_{i,kl}+E_{w,kl},$$

where l=1, 2, $E_s \times |h_{kl}|^2$, $E_{i,kl}$ and $E_{w,kl}$ represent the average energy of the received symbols and the average energy of the interference and noise received via the lth receive antenna of the kth RU, respectively. Generally, the average energies of the received symbols, $E_s|h_{kl}|^2$, are different on different uplink channels because the required SINR at these channels changes based on the PUCCH Format (Format 1, 1a, 1b, 2, 2a, 2b) and the PUSCH MCS (e.g., QPSK or 64-QAM). The interference energy, which is caused by other UE transmissions in nearby cells, can also vary among different PRBs, which can cause additional variations in the energy levels of the received symbols at the RUs.

The RUs implement the uplink compression using a quantizer to reduce the data rate of transmissions from the RUs to the CUs. For the purpose of discussion, we assume that the quantizer is a uniform scalar quantizer having a rate $R_{k1}$ and a step size $\Delta_{k1}$ and quantizes the real and imaginary components of the received frequency-domain IQ symbols independently at the lth antenna of the kth RU. Other quantization techniques, such as non-uniform scalar quantization or vector quantization, can also be used with the techniques discussed below.

Figure 9:
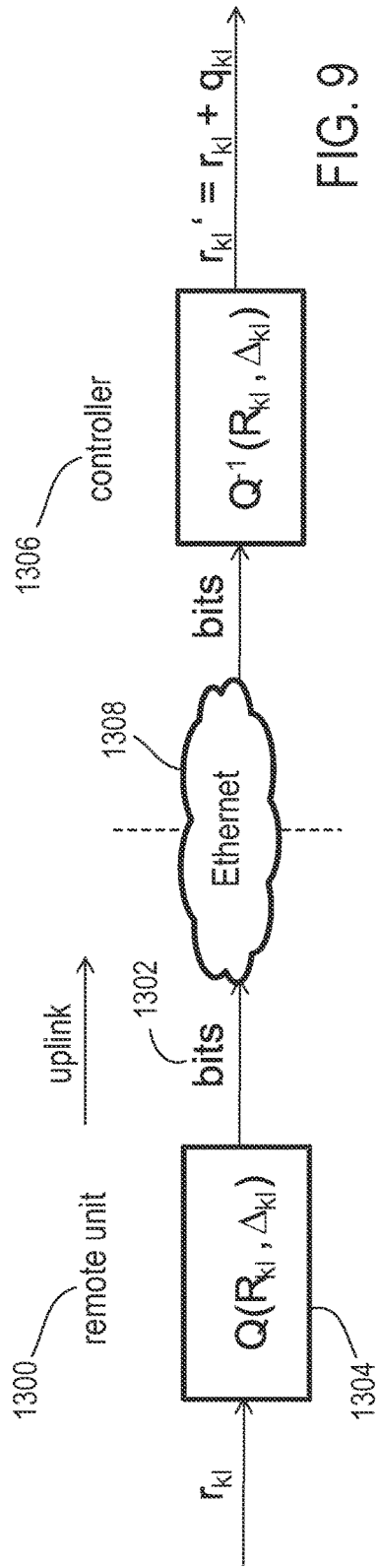
FIG. 9 is a block diagram schematically showing an example of uplink compression.

Referring to FIG. 9, the RU 1300 sends the bits 1302 that represent an output of the quantizer 1304 to the CU 1306 in Ethernet frames through an Ethernet network 1308. The CU 1306 reconstructs a quantized version $r_{k1}'$ of each received symbol $r_{k1}$:

$$r_{k1'}=s \times h_{k1}+i_{k1}+w_{k1}+q_{k1},$$

where $q_{k1}$ is the complex-valued quantization noise having an average energy $E_{q,k1}$. The performance of the quantizer 1304 can be measured by its signal-to-quantization noise ratio (SQNR), which is defined as:

$$SQNR_{k1}=E_{t,k1}/E_{q,k1},$$

where $E_{q,k1}=2 \times MSE$ and MSE is the mean-squared error of the uniform scalar quantizer.

The quantized symbols are sent to the CU through the Ethernet network. In some implementations, the rate $R_{k1}$ of the quantizer is chosen so that the quantization noise does not substantially affect the performance of the receivers at the CU. In the absence of quantization noise and assuming that the noise and interference received on all the antennas are uncorrelated, the performance of a receiver at the CU for MRC (a maximum-ratio combiner) can be represented by the effective SINR: $SINR=\Sigma_k (SINR_{k1}+SINR_{k2})$, where $SINR_{kl}=E_s \times |h_{kl}|^2/(E_{i,kl}+E_{w,kl})$ is the SINR on the lth RX antenna of the kth RU.

When the interference $i_{kl}$ on different RX antennas is correlated, the CU receiving the compressed symbols from the RUs can apply IRC (interference rejection combining)

The performance of the IRC is determined based on the sum of the SINRs on all RX antennas as shown by the above equation, except that each SINR for a given RX antenna includes the effect of the spatial whitening filter.

Next, the effect of non-zero quantization noise on the performance of the receivers at the CU is considered. The signal-to-interference-plus-noise-plus-quantization noise-ratio at the output of the MRC receiver in the CU, SINR', is:

$$SINR' = \sum_k (SINR'_{k1} + SINR'_{k2}),$$

$$\text{where } SINR'_{k1} = E_s \times |h_{k1}|^2/(E_{i,k1} + E_{w,k1} + E_{q,k1})$$
$$= SINR_{k1}/(1 + (1 + SINR_{k1})/SQNR_{k1})$$

In other words, the SINR' is the sum of the signal-to-interference-plus-noise-plus-quantization noise ratios at each branch of the MRC that receives quantized symbols from respective antennas in the cell. If the quantizer rates $R_{k1}$ are chosen for all antennas (for all k and l) such that:

$$SQNR_{k1} >> 1 + SINR_{k1},$$

then $SINR'_{k1} \approx SINR_{k1}$, and SINR' approximately equals the ideal SINR with no quantization noise, i.e., $SINR' = SINR = \sum_k (SINR_{k1} + SINR_{k2})$.

The amount of degradation caused by the non-zero quantization noise in the effective $SINR_{k1}$ for each antenna of the RU can also be determined using the above formula. The amount can be calculated as $SINR_{k1}/SINR_{k1}'$, which can be written as a function of $SQNR_{k1}/(1+SINR_{k1})$.

Table 1 shows the amount of degradation in $SINR_{k1}$ per RX antenna due to the quantization noise as a function of the ratio $SQNR_{k1}/(1+SINR_{k1})$. The data illustrates that when the $SQNR_{k1}$ is at least 20 dB above $1+SINR_{k1}$, the reduction in $SINR_{k1}$ due to the quantization noise is less than 0.05 dB.

TABLE 1

Reduction in $SINR_{kl}$ due to Quantization Noise

| SQNR/(1 + SINR) (dB) | SINR/SINR' (dB) |
|---|---|
| 0 | 3.01 |
| 5 | 1.19 |
| 10 | 0.41 |
| 15 | 0.14 |
| 20 | 0.04 |
| 25 | 0.01 |

B. Quantization Methods

Below, four different quantization methods for uplink compression are described, with an increasing compression ratio from Method I to Method IV.

I. Fixed Quantization

In this method, a fixed uniform scalar quantizer having a fixed rate $R_{k1}=R_0$ and a fixed step size $\Delta_{k1}=\Delta_0$ is used. As an example, $R_0=12$ and the quantized IQ stream is sent from a RU to the CU at a total bit rate of about 403 Mb/s for two RX antennas of the RU. Accordingly, the fixed quantizer having a step size of 12 bits can be implemented without a high level of complication and without substantially affecting the performance of the signal transmission. The data rate of 403 Mb/s between the CU and the RUs is relatively high. When K RUs are sending quantized frequency-domain IQ symbols at a data rate of 403 Mbps towards the CU for the same OFDM symbol, the aggregate bit rate between the nearest Ethernet switch and the CU is K×403 Mb/s, which can be relatively high for large K.

II. Adaptive Step-Size Quantization

In this method, the quantization is implemented using a uniform scalar quantizer that has a fixed rate $R_{k1}=R_0$, and a step size $\Delta_{k1}$ that is adjusted dynamically. In one implementation, the step size may be updated on a per-PRB basis and independently for each antenna. For each OFDM symbol, the step sizes $\Delta_{k1}$ are individually varied for each uplink channel that uses resources on that OFDM symbol. For example, $\Delta_{k1}$ can be selected based on the average energy of the frequency-domain IQ symbols received in each uplink channel. In some implementations, the average energy of the IQ symbols on a given channel is estimated using the symbols to be quantized at the RUs. The step size of the quantizer can then be adjusted based on an assumed distribution of those symbols to be quantized. In some implementations, the distribution is determined based on the size of the DFT used by the UE. Optimizing the step size dynamically and independently for each channel can allow signals to be transmitted from the RUs to the CU at a higher SQNR at the same data rate. In addition, optimizing the step size dynamically and independently for each channel can be used to lower the data rate without reducing the SQNR.

In some implementations, it may not be necessary to vary the quantizer step size $\Delta_{k1}$ in every OFDM symbol, e.g., when the average energy of a symbol received by the RU from a UE does not vary significantly within a subframe. In such implementations, the step size for the first OFDM symbol is determined using the received IQ symbols in the first OFDM symbol, e.g., to avoid delay. When the number of symbols available is insufficient to accurately estimate the average energy in the first OFDM symbol, the average energy estimate and the step size can be refined in subsequent OFDM symbols.

The quantizer rate R.sub.0 is chosen to be high enough so that the performance of the receiver at the CU does not degrade for the highest MCS. For example, when $R_0=10$, the SQNR of the quantizer is about 52 dB (assuming a Gaussian input), which is more than 20 dB higher than the minimum SINR required for reliable communications at the highest uplink MCS.

As shown in Method I, an SQNR that is 20 dB above the minimum required SINR allows the receiver at the CU to operate with a performance degradation due to quantization of no more than 0.05 dB. A quantizer rate $R_0$ of 10 can produce an IQ data rate of about 336 Mb/s for two RX antennas of a RU. This represents a compression ratio of 10/12, or is 17% higher compared to the compression rate of Method I. Because the quantizer rate $R_0$ is fixed, all frequency-domain IQ symbols received by the RUs, including IQ symbols that carry no information, are quantized and sent to the CU. When an optimized step size is used, the value of the quantizer rate required to achieve a desired SQNR is lower than when the step size is not optimized.

Figure 10:
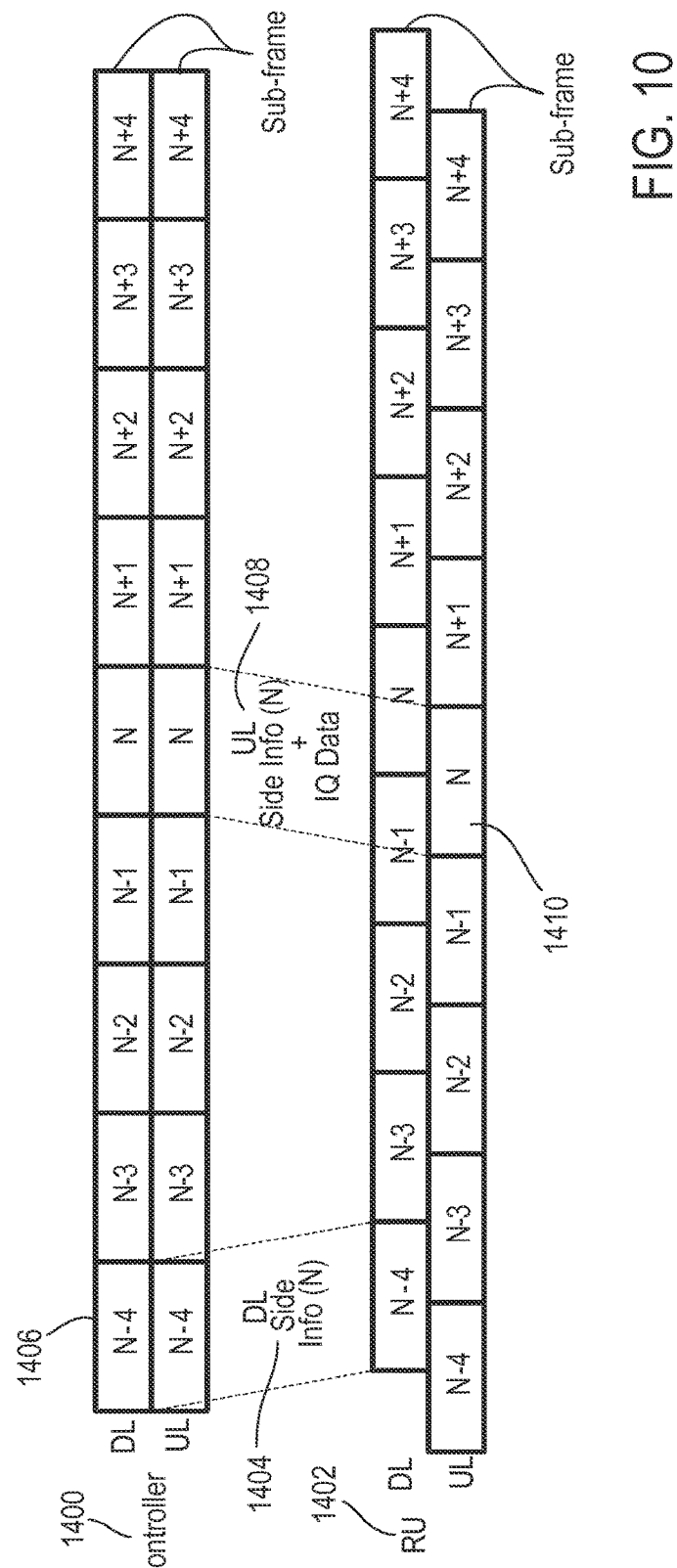
FIG. 10 is a block diagram schematically showing an example of side information on the uplink and the downlink between a controller (CU) and a remote unit (RU).

The RUs use different step sizes for different PUSCH/PUCCH/SRS/PRACH channels based on information about the uplink channel boundaries received from the CU. In some implementations, the uplink channel boundaries for each PRB are indicated by downlink side information sent by the CU to the RUs. Referring to FIG. 10, the side information 1404 for use in an uplink (UL) subframe N is sent by the CU 1400 in the downlink (DL) subframe N-4 (1406) to the RUs 1402.

Examples of the downlink side information 1404, e.g., the contents and sizes, are as follows. The PUSCH or PUCCH PRBs assigned to the same channel are consecutive, and the channel boundaries for PUSCH and PUCCH can be indicated by a 6-bit position index and a 6-bit length field. The CU can also send indications of the channel type (e.g., PUSCH, PUCCH, SRS, PRACH, etc.) to the RUs using a 2-bit index to facilitate the RUs to model the statistical distribution of the received symbols. Furthermore, one bit of the side information can be used to indicate the presence of the SRS (sounding reference signal), which can occupy the last OFDM symbol of the subframe. Also, the position of the PRACH, when present, can be indicated by a 6-bit index.

Based on the knowledge of the PUSCH/PUCCH channel boundaries, the RUs determine for each OFDM symbol the average energy of the received frequency-domain IQ symbols that belong to the same channel (or from the same UE). The RUs then choose the step size $\Delta_{k1}$ of the quantizer based on the determined average energy. In some implementations, a RU determines the optimum step size without distinguishing the different channel types (i.e., PUSCH or PUCCH). In some implementations, a RU uses the downlink side information about the channel type to facilitate choosing the optimum step size without any measurement related to the received frequency-domain IQ symbols (e.g., average energy). For the SRS, the RUs can estimate the average energy across the entire OFDM symbol and determine the optimum step size. Alternatively, the RUs can split the subcarriers in an OFDM symbol that carries SRS into subbands and optimize the step size for each subband. In some implementations, a fixed pre-determined step size may be used to quantize the SRS signal. For the PRACH, the step size can be determined based on the peak power value of the received signal, or it may be fixed.

The RU may implement the uniform scalar quantization with variable step sizes by applying a gain $\gamma_{k1}$ to normalize the energy of the IQ symbols to be quantized. The RUs then quantize the real and imaginary components of the IQ symbols using a uniform scalar quantizer having a fixed step size $\Delta_{k1}=\Delta_1$. In some implementations, the real and imaginary components are symmetric, and the same gain and scalar quantizer can be used for both the real and the imaginary components.

The RUs send uplink side information about the selected step sizes to the CU, along with the data bits representing the quantized frequency-domain IQ symbols, based on which the CU reconstructs the received IQ symbols.

In some implementations, each step size of the quantizer is represented by a 12-bit index in the side information. In some implementations, the RUs update the step size in every OFDM symbol, which can increase the amount of side information transmitted in one time slot by up to a factor of 7. For the SRS, the RUs send to the CU the uplink side information about the step size for each subband before sending the data. For the PRACH, the information about the step size can be sent before the quantized PRACH data is sent.

III. Adaptive Rate and Step Size Quantization

In this method, in addition to dynamically adjusting the step size $\Delta_{k1}$ of the quantizer, the rate $R_{k1}$ of the quantizer is also dynamically adjusted for compressing (or quantizing) the IQ stream. For the purpose of discussion for this method, PUSCH symbols that carry user data and PUSCH symbols that carry UCI (uplink control information) are not distinguished. Also, the same quantizer rate is applied to all symbols sent by the same UE.

The quantizer rate can be dynamically adjusted, for example on a per PRB basis. As discussed previously, for PRBs that carry PUSCH IQ symbols from a relatively low MCS, a lower quantizer rate can be used than the rate for the PRBs carrying PUSCH IQ symbols from a relatively high MCS. Similarly, some PRBs carrying PUCCH symbols can be quantized at a relatively low rate. The SINR required for these PRBs (for PUSCH or PUCCH) to provide a reliable reception at the CU can be relatively low. Accordingly, these PRBs can tolerate a relatively high level of quantization noise. Furthermore, those PRBs not carrying any data do not need to be quantized. The high tolerance of quantization noise and the reduced number of PRBs to be quantized on the uplink can save transmission bandwidth between the RUs and the CU. Adjusting the quantizer rate based on these considerations can reduce the average data rate on the uplink.

As discussed previously, the quantizer rate for each antenna of the RU is chosen to be relatively high such that $SQNR_{k1} \gg 1+SINR_{k1}$, where $SQNR_{k1}$ is the quantizer SQNR and $SINR_{k1}$ is the receiver SINR for the lth antenna of the kth RU of a cell. When such a relationship between the $SQNR_{k1}$ and the $SINR_{k1}$ is satisfied, the quantization noise is much lower than the interference plus noise seen on the antenna (lth antenna of the kth RU), and the effect of the quantization on $SINR_{k1}$ is small.

In some implementations, a RU does not determine the $SINR_{k1}$ on its own. Instead, the RU learns from the CU the target SINR, $SINR_{target}$, across all antennas of the cell. The $SINR_{target}$ is a function of the MCS used in each PRB. The CU uses the power control loop to drive the transmit powers of a UE to a baseline level, and the UE adjusts the baseline transmit power according to the MCS used in a given PRB so that the SINR in the eNodeB is approximately equal to the $SINR_{target}$.

In some implementations, the RUs choose the quantizer rate such that the quantization noise does not substantially reduce the SINR at the receiver of the CU to below the target SINR. When the CU controls the transmission power of the UE by accurately tracking channel changes, the SINR at the receiver of the CU approximately equals $SINR_{target}$. Furthermore, when $SQNR_{k1} \gg SINR_{target} > SINR_{k1}$, $SINR'=\Sigma_k (SINR_{k1}'+SINR_{k2}') \approx SINR_{target}$. In other words, the quantization noise does not substantially reduce the SINR at the receiver of the CU when the quantizer rate is chosen such that $SQNR \gg SINR_{target}$.

In summary, by selecting the quantizer rate such that $SQNR_{k1} \gg SINR_{target}$, a RU can quantize the IQ symbols without producing quantization noise that substantially affects the performance of the CU receiver or prevents reliable communication between the CU and the RU.

In the techniques describe above, for a given PRB, the RUs in the same cell use the same quantizer rate for all antennas. In some implementations, the SINRs of different antennas ($SINR_{k1}$) can be significantly different. In such implementations, different quantizer rates can be chosen for antennas having different $SINR_{k1}$ in the same cell. For example, the quantizer rates can be chosen so that SQNR is proportional to $1+SINR_{k1}$. In particular, the quantizer rate for the antenna with a lower $SINR_{k1}$ is chosen to be lower than the quantizer rate for an antenna with a higher $SINR_M$. In some implementations, when the $SINR_{k1}$ of some antennas is too low relative to the total SINR, it is wasteful for the RUs to which those antennas belong to transmit the received IQ symbols to the CU. Significant IQ stream compression can be achieved when those RUs can determine that the signals received on their antennas do not contribute significantly to the overall SINR in the CU and purge or prune the signals (which is equivalent to using a quantizer rate of "0" for these signals).

A RU can adjust the quantizer rate based on the $SINR_{k1}$ seen on each antenna and additionally, the difference between the $SINR_{k1}$ on its different antennas and the $SINR_{k1}$ on other antennas in the same cell. In some implementations, the CU selects RUs from which to receive symbols. The CU can also determine the quantizer rate for each RU based on past UE transmissions. For example, the CU sets the quantizer rate to be zero for an antenna when it determines that the $SINR_{k1}$ of that antenna contributes to less than 5% of the total SINR.

In some implementations, the CU determines the quantizer rate for each antenna on a per UE basis at the time when the UE transmits a PRACH preamble. All RUs can be required to forward all PRACH preamble signals to the CU so that the CU can make an initial determination of the $SINR_{k1}$ for each antenna. The CU can then select the quantizer rate for each antenna and include this information in the downlink side information it sends to the RUs. The CU is capable of determining the quantizer rate for those RUs from which the CU receives PUSCH or PUCCH signals transmitted by a UE in a recent subframe. For RUs whose transmissions for a UE are purged, the CU can determine a quantizer rate based on the SRS sent by the UE at regular intervals. All RUs can be required to relay the SRS.

Based on the SRS and the PRACH preamble signals, the CU can determine the quantizer rate for all RUs in a cell. In addition, the CU can periodically request the RUs that previously have purged transmissions from the UE to send IQ symbols and use the IQ symbols to update the quantizer rate for those RUs. By adjusting the quantizer rate for different antennas, the average rate of the data sent from the RUs to the CU can be significantly reduced, especially when there are many RUs in a cell.

In some implementations, purging signals on the PUCCH may be difficult when multiple UEs share the same PUCCH resources. In such implementations, symbols on the PUCCH are transmitted without purging. The uplink transmission rate is not substantially affected because the PUCCH occupies a variable but relatively small percentage of the uplink resources. In some implementations, a fixed quantizer rate can be used for all antennas on the PRBs assigned to the PUCCH, even when PUCCH transmissions implement transmit diversity in which the same control information can be sent using different resources. In some implementations, other, e.g., more sophisticated, quantization and purging schemes can be used for the PUCCH when the radio network has a very large number (e.g., 16 or larger) of RUs in the cell.

The CU incorporates the quantizer rate for each PRB determined for each antenna in the downlink side information, which is used by the RUs. For those unallocated PRBs that carry no data or for antennas that do not significantly contribute to total SINR, the CU sets the quantizer rate to be zero. The side information sent by the CU to the RUs can also include other information, such as PUSCH MCS and PUCCH Format, and an index that represents the expected probability distribution of the frequency-domain IQ symbols in the PRB.

Similar to Method II, the CU sends the side information associated with uplink subframe N in downlink subframe N−4 (see, e.g., FIG. 10). The RUs use the side information received in downlink subframe N−4 to select the quantizer step size for each PRB in uplink subframe N. The step sizes are optimized similar to Method II, i.e., based on the measured average energy and the estimated probability distribution of the received IQ symbols. The RUs send the selected step size for each quantizer to the CU at the beginning of each OFDM symbol before transmitting the quantized IQ symbols. Generally, little uplink capacity is used to send the side information for the step sizes.

Quantization based on Method III may not reduce the peak rate of the uplink IQ data compared to Method II. However, the method can significantly lower the average bit rate. As an example, the average bit rate can be reduced by more than 50%, when only 50% of the uplink resources are in use. Adapting the quantizer rate using the techniques of this method can help reduce the average uplink data rate and the load on the Ethernet switches.

IV. Predictive Quantization

In the previously described Methods I, II, and III, the signals received on different antennas of the same RU are treated as uncorrelated. In this fourth method, when the number of receive antennas is greater than the number of layers sent by a UE in spatial multiplexing, the correlation between signals received on different antennas of the same RU is used to further reduce the quantizer rate for PUSCH transmissions. In the Release 10 version of the LTE standard, the UE may transmit on multiple antenna ports. For the purpose of discussion, we assume that the UE transmits on the PUSCH using a single transmit antenna port.

As shown previously, signals received by the two antennas of the kth RU in a cell can be represented as:

$$r_{k1}=s \times h_{k1}+i_{k1}+w_{k1},$$

$$r_{k2}=s \times h_{k2}+i_{k2}+w_{k2}.$$

Furthermore, $r_{k2}$ can be expressed according to the following predictor equation:

$$r_{k2}=a_{k2} \times r_{k1}+z_{k2},$$

where the prediction coefficient $a_{k2}$ is given by:

$$a_{k2}=E\{r_{k2}r_{k1}^*\}/E\{|r_{k1}|^2\},$$

and $z_{k2}$ is the prediction error and can be written as:

$$z_{k2}=r_{k2}-a_{k2}r_{k1}.$$

A RU can estimate the prediction coefficient $a_{k2}$ by calculating the average correlation between the signals received at the two antennas, and then dividing the result by the average energy of the signals received on the second antenna. The RU performs the estimation on a per UE basis based on information received from the CU.

Figure 11:
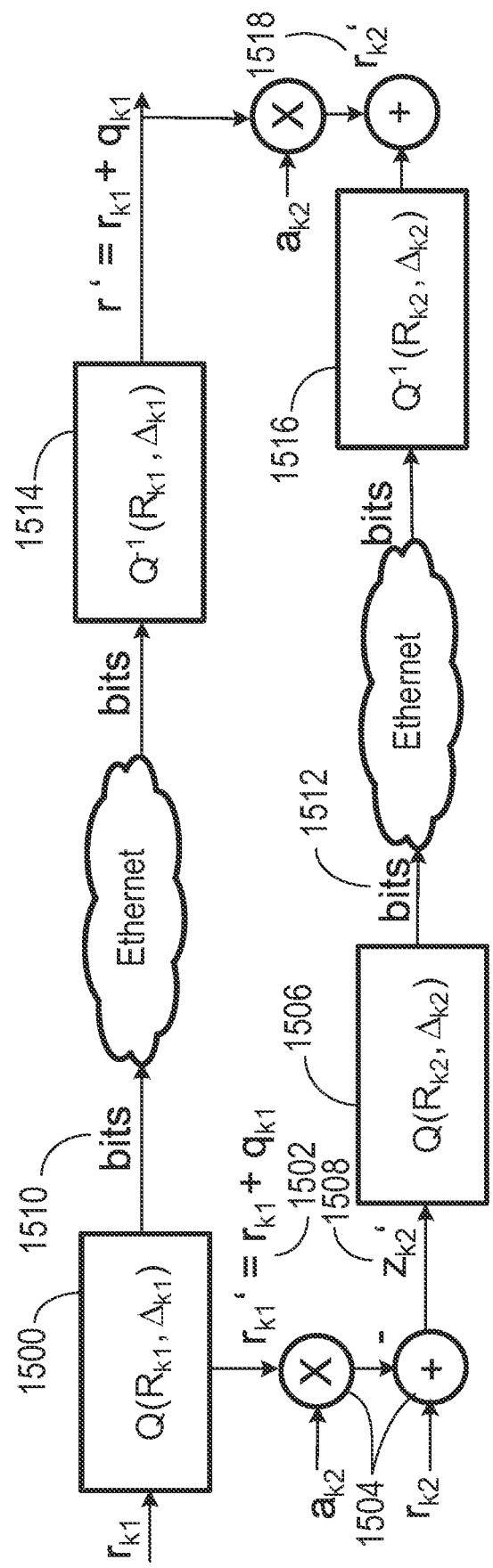
FIG. 11 is a block diagram schematically showing an example of predictive quantization for PUSCH.

Referring to FIG. 11, the RU first quantizes $r_{k1}$ with a uniform scalar quantizer having a rate $R_{k1}$ and a step size $\Delta_{k1}$ to obtain the first quantized signal $r_{k1}'$ 1502, where $$r_{k1}'=r_{k1}+q_{k1}.$$

Here $q_{k1}$ is the quantization noise for the symbol received at the first antenna. The RU then uses $r_{k1}'$ to produce 1504 the prediction error $z_{k2}'=r_{k2}-a_{k2}r_{k1}'$, which is then quantized with another uniform scalar quantizer 1506 having a rate $R_{k2}$ and a step size $\Delta_{k2}$ to generate the second quantized signal.

$$z_{k2}''=r_{k2}-a_{k2}r_{k1}'+q_{k2}.$$

Here $q_{k2}$ is the quantization noise for the symbol received at the second antenna. Bits 1510, 1512 representing the quantized symbols $r_{k1}'$ and $z_{k1}''$ are sent to the CU, along with the prediction coefficient $a_{k2}$ and the quantizer information $R_{k1}, R_{k2}, \Delta_{k1}$ and $\Delta_{k2}$. The CU first reconstructs 1514, 1516 the quantized symbols $r_{k1}'$ and $z_{k2}'$ and then generates the quantized symbol $r_{k2}'$ 1518 according to $$r_{k2}'=z_{k2}''+a_{k2} \times r_{k1}'=r_{k2}+q_{k2}.$$

The average energy of the symbol $z_{k2}'$ is lower than that of $r_{k2}$, and the quantizer rate $R_{k2}$ is generally lower than the quantizer rate used when the RU quantizes $r_{k2}$ directly without prediction. The lower quantizer rate can reduce the IQ rate.

Again, the SINR in the CU can be written as:

$$SINR'=\Sigma_k(SINR_{k1}'+SINR_{k2}'),$$

where $$SINR_{k1}'=E_s \times |h_{k1}|^2/(E_{i,k1}+E_{w,k1}+E_{q,k1}).$$

For the first antenna, $SINR_{k1}'$ can be written as:

$$SINR_{k1}'=SINR_{k1}/(1+(1+SINR_{k1})/SQNR_{k1}).$$

Accordingly, when the quantizer rate for the first antenna is chosen such that $SQNR_{k1} \gg 1+SINR_{k1}$, the quantization noise does not substantially affect $SINR_{k1}'$.

Similarly, for the second antenna, $SINR_{k2}'$ can be written as:

$$SINR_{k2}'=SINR_{k2}/(1+[(1+SINR_{k1})/(1+SINR_{k1})/SQNR_{k2}])).$$

Here $SINR_k=SINR_{k1}'+SINR_{k2}'$ and is the total SINR in the CU for the kth RU. Accordingly, when $SQNR_{k2} \gg (1+SINR_k)/(1+SINR_{k1})$, the quantization noise introduced by the second quantizer does not substantially affect $SINR_{k2}'$.

In some implementations, the two antennas of a RU have the same SINR, i.e., $SINR_{k1}=SINR_{k2}$, and the condition for the quantization noise to not substantially affect the SINR at the CU can be simplified to:

$$SQNR_{k2} \gg (1+SINR_k)/(1+0.5 \times SINR_k).$$

When $SINR_k \gg 1$, $SQNR_{k2} \gg 2$. A uniform scalar quantizer having a rate of about 5-6 can readily satisfy this condition. The resulting IQ rate for the $2^{nd}$ antenna is reduced to about 84-101 Mb/s, representing a compression of more than 50%.

To implement the predictive quantization, in some implementations, the CU estimates the prediction coefficients, in addition to determining the quantization rate based on the predictive quantization. The estimated coefficients can be sent to the RUs in the downlink side information. Alternatively, the CU can determine the quantizer rate as discussed in Method III and without relying on predictive quantization. The RUs apply the prediction and send the prediction coefficient as part of the uplink side information to the CU. In some implementations, the CU determines the quantizer rate based on the predictive quantization, and the RUs determine the prediction coefficients and send the coefficients to the CU as part of the uplink side information.

V. Uplink Compression of the PRACH Preamble

When an idling UE has data to send or to receive, the UE establishes a connection with the eNodeB by sending a PRACH preamble to the eNodeB in some designated PRBs that are shared by all the UEs in a cell. In some implementations, each cell has 64 shared PRACH preamble sequences, some of which are designated for use in contention-free access and the others are divided into two subsets. In contention-free access, the eNodeB assigns a preamble to the UE. In other situations, the UE selects one of the two subsets based on the amount of data to be transmitted. The UE then randomly picks one of the preamble sequences in the selected subset.

A PRACH preamble uses 6 RBs at 1.08 MHz, and the positions of the 6 RBs are determined and signaled to the UEs by the CU. The PRACH preamble can last 1, 2 or 3 subframes, depending on the length of the cyclic prefix and the guard time. The PRACH opportunities can occur as frequently as once every 1 ms subframe or as infrequently as once every 20 ms.

In general, the UEs are not scheduled to transmit PUSCH on the PRBs assigned to PRACH. The CU can use non-adaptive HARQ on the uplink to prevent collisions between PRACH and HARQ retransmissions. The non-adaptive HARQ changes the RBs used in the transmission for collision avoidance. The PRACH opportunities can also be chosen to not overlap with the SRS or the PUCCH transmissions. The UE selects the transmit power for the PRACH preamble based on open-loop power control where the UE estimates the uplink signal loss based on a measurement of the downlink signal loss and gradually increases the transmit power after unsuccessful attempts.

The detection of the PRACH preamble can be implemented partially in the RU and partially in the CU. In some implementations, the RUs know the exact position of the PRACH opportunities and convert the received time-domain IQ symbols (at 15.36 MHz for the 10 MHz FDD LTE standards) into a lower-rate time-domain sequence (e.g., a rate of 1.28 MHz) using a time-domain frequency shift followed by decimation. The resulting sequence is then converted to frequency domain using an FFT (e.g., a 1024-point FFT for the 10 MHz FDD LTE standards). A frequency-domain correlation is performed between the FFT output and the frequency-domain representation of the root Zadoff-Chu sequence. The 64 PRACH preamble sequences are derived using a cyclic shift. The complex-valued output of the frequency-domain correlator is then converted back to a complex-valued time domain sequence using an IFFT (e.g., a 1024-point IFFT).

The RUs and the CU perform the next steps of detecting the PRACH collaboratively. For example, the RUs can compute a real-valued time-domain sequence of 1024 samples by summing the squares of the real and the imaginary components. The RUs can send this information to the CU for further processing. The CU, upon receiving the time-domain power sequence, performs a peak detection to determine the preamble cyclic shift. Such uplink PRACH transmissions are compressed in the time-domain such that data compressed in the time-domain is transmitted between the RUs and the CU.

Alternatively, the RUs can send the complex-valued output symbols of the IFFT to the CU and let the CU perform the remainder of the PRACH preamble detection. In some implementations, the RUs implement the peak detection, determine the preamble cyclic shift, and send the CU the cyclic shift information. The amount of data transmitted from the RUs to the CU for PRACH preamble detection is small. In the example of the 10 MHz FDD LTE, the amount of data ranges from a few bits to 12-20 Mb/s, depending on whether the real-valued power or the complex-valued IFFT outputs are sent.

In some implementations, when there is no substantial overlap between the PRACH transmissions and other uplink transmissions, no other transmissions are performed for the RBs that are transmitted on the PRACH.

For the RUs to correctly implement the PRACH preamble detection, the CU can provide the RUs with configuration information, such as the PRACH configuration index, PRACH frequency offset, PRACH Zadoff-Chu root sequence, etc. The CU can send this information to the RUs when the RUs are initially assigned to the CU or when the PRACH is modified.

The PRACH data may be quantized with a fixed rate quantizer, whose rate is pre-determined by the CU and sent to the RUs when the RUs initially connect to the CU. The quantizer step size may also be fixed, or it may be dynamically selected by the RUs based on the average energy of the received PRACH signal.

Synchronization

In the present disclosure there are some synchronization requirements that are generally not applicable to classic base stations.

As explained above, in the present disclosure, some parts of the baseband processing (e.g., modem functionality) and FFT/RF processing (e.g., radio functionality) are split between a central CU and multiple RUs (RUs) that are connected via a switched Ethernet network (as shown in the figures). In classic base stations, a GPS receiver is typically used to acquire time and frequency synchronization and since the modem and RF functions are co-located, they can be synchronized to the GPS receiver. In the present disclosure, in some implementations, a GPS receiver is only available in the CU, and is not available in the RUs to keep the system cost low and to avoid the installation complexity. The CU can also acquire timing and frequency synchronization through other means, for example from a network server or by listening to signals transmitted by a macro cell base station nearby. In some implementations, a timing transport protocol is used to carry a stable absolute timing phase and frequency reference that is traceable to coordinated universal time (UTC/GPS) from the CU to the RUs. The timing transport protocol can be based on the IEEE1588 protocol. In some implementations, clock frequency and the absolute timing phase derived by the RUs should be accurate enough to meet all 3GPP synchronization requirements and to ensure that UEs performance is not noticeably impacted by any frequency or timing phase error between the RUs and the CU and between the RUs themselves.

To deal with the variable packet delays in an Ethernet network, downlink air interface framing in the CU and uplink air interface framing in the RUs are advanced by $T_{DL}$ and $T_{UL}$ seconds relative to each other. In implementations, these framing advances $T_{DL}$ and $T_{UL}$ have to be greater than a sum of the respective Ethernet network delay between the CU and the RU and the timing phase error between the clocks in the CU and the RU. Since the worst-case clock error is small compared to the worst-case Ethernet delay, it has a lesser effect on the selection of the framing advances $T_{DL}$ and $T_{UL}$. When the actual network delay that a packet experiences exceeds the framing advance, buffer underflow will occur and physical layer transport packets will be lost. Such a loss can be recovered using retransmissions in HARQ, RLP or TCP layers, but at the expense of reduced transmission efficiency. Therefore, it is important that such underflow occurs rarely, and does not impact the user experience.

One of the features of the present disclosure is its ability to serve UEs via multiple RUs that share the same cell. For example, as described above, multiple RUs may be controlled by a CU to define a cell, in which multiple UEs may be served. Assigning multiple RUs to the same cell may reduce the number of baseband modems used in the CU, avoid inter-cell interference and improve signal strength through macro diversity. Sharing the same cell across multiple RUs may reduce the LTE system capacity available to individual users. In some implementations, as long as cell loading remains below 50% of cell capacity, no appreciable performance degradation will occur.

In order to implement cell sharing in the present disclosure, in some implementations, the relative carrier frequencies of RUs in the same cell should be frequency synchronized in a way that is tighter than the frequency accuracy required from individual RUs. In some implementations, without such tight differential synchronization, the effective downlink channel seen by the UE may become time-varying in a manner similar to what happens when there is mobility and as a result the performance may degrade. Channel variations caused by mobility or by differential carrier frequency offset between RUs result in a mismatch between the channel measured using the reference signals and the channel actually experienced when demodulating the LTE Orthogonal Frequency-Division Multiplexing (OFDM) symbol.

The tight differential carrier frequency synchronization of RUs as described above will also be required between RUs that belong to different cells but use Rel. 11 downlink Coordinated Multipoint (Rel. 11 CoMP or simply "CoMP"). In CoMP, at a cell-edge, typically, downlink signals from two or more RUs that may belong to different cells could be received at a UE while the UE's uplink transmissions could also be received by these various RUs. If the downlink transmissions to a given UE can be coordinated, downlink performance can be enhanced. Likewise, if uplink transmissions can be scheduled in a coordinated manner, uplink performance can be enhanced. CoMP addresses issues such as interference mitigation and coordinated bit transmissions over the air interface.

When such tight synchronization cannot be maintained, downlink physical layer CoMP performance may degrade, potential CoMP gains may be reduced or lost or could even turn negative. Downlink CoMP is a part of the present disclosure, but tight differential synchronization requirements for some implementations of CoMP are not unique to the present disclosure and also apply to other LTE systems that use downlink CoMP.

When multiple RUs share the same cell, the timing phase of their transmissions also needs to be synchronized. This synchronization can also facilitate the radio network of this disclosure to combine uplink signals received by different RUs in the CU. In some implementations, such combinations require that all significant multipath signals received by different antennas fall within a time interval called cyclic prefix. The cyclic prefix corresponds to the first $N_{CP}$ samples in an OFDM symbol that are a replica of the last $N_{CP}$ samples in the same symbol. The cyclic prefix ensures that the transmitted subcarrier will remain orthogonal in the receiver, as long as the delay spread of the channel is less than the $N_{CP}$. When multiple RUs share the same cell and there is a timing phase offset between the RUs, the sum of this offset and the delay spread of the wireless channel can be controlled so as to not exceed the cyclic prefix length. In the LTE standard, the cyclic prefix is around 5 microseconds. Therefore, it is desirable to keep the timing phase error between RUs much smaller than 5 microseconds.

Following a brief overview of the synchronization requirements in the present disclosure, we will describe how these requirements are addressed.

In this regard, synchronization, and the features described herein relating thereto, are example implementations. Different implementations of the present disclosure may employ different synchronization methods and variations on any and all of the methods described herein. Any requirements specified in this disclosure relate to the specific example implementations described herein only, and are not requirements of any more general methods, apparatus, systems, and computer program products that may be claimed.

In an example implementation of the present disclosure, baseband operations up to the FFT input are performed in the CU and the remaining baseband operations (FFT, cyclic prefix, etc.) and the radios are implemented in the RUs. In another example implementation of the present disclosure, on the downlink, baseband operations up to the modulation or layer mapping are implemented in the controller and the remaining baseband operations are implemented in the RUs. As previously explained, the CU and the RUs are separated by a switched Ethernet network that carries data between the CU and the RUs in packets or frames.

1. Synchronization Between the CU and the RUs

In some implementations, there is a VCTCXO crystal oscillator in CU and VCTCXO crystal oscillators in all of the RUs. The VCTCXO in the CU is used to generate clocks required for the baseband processing in the CU and the VCTCXOs in the RUs are used to generate clocks for analog-digital-analog converters (A/D/As), RF synthesizers, and baseband processing performed in the RUs. In some implementations, only the CU has a GPS receiver or another timing synchronization mechanism that can generate a stable frequency-stable and phase-accurate clock reference and, therefore, there is a need to provide a frequency-stable and phase-accurate clock reference to the VCTCXOs in the RUs using IEEE1588 based timing synchronization. As described by the National Institute of Standards and Technology (NIST), the IEEE 1588 "standard defines a protocol enabling precise synchronization of clocks in measurement and control systems implemented with technologies such as network communication, local computing and distributed objects. The protocol . . . [is] . . . applicable to systems communicating by local area networks supporting multicast messaging including but not limited to Ethernet". The contents of the IEEE 1588-2002 as published in 2002 and as revised in 2008 are hereby incorporated by reference into this disclosure.

IEEE1588 is a time-stamping protocol, implemented over the UDP/IP protocol, between a master clock in the CU and slave clocks in the RU. The protocol involves repeated round-trip exchanges between the master and slave clocks, where each exchange produces a timing update signal that can be used to construct a timing reference signal in the RU. The master clock starts the exchange by sending a time stamp to the slave in the RU. This time stamp carries the time T1 as measured by the master clock at the time the time stamp leaves the Ethernet interface on the CU. The slave receives this time stamp when its local clock is at time T1'. The difference T1'−T1=$D_{DL}$+Δ is the sum of the unknown one-way travel delay $D_{DL}$ of the time stamp from the CU to the RU and the unknown clock phase error A between the reference clock in the RU and the reference clock in the CU. In order to estimate (and cancel) the one-way downlink delay, the slave sends to the CU a second time stamp. This time stamp carries the time T2 as measured by the slave clock at the time the time stamp leaves the Ethernet interface on the RU. The master marks the time T2' on its local clock when it receives the time stamp on the Ethernet interface on the CU, and sends value T2' in a response message back to the slave. The difference T2'−T2=$D_{UL}$−Δ is the sum of the unknown one-way travel delay of the time stamp from the RU to the CU and the unknown clock phase error (−Δ) between the reference clock in the CU and the reference clock in the RU. If the one-way delay in the two directions were the same (i.e., $D_{DL}$=$D_{UL}$) and the phase of the reference clock in the CU does not drift relative to the reference clock in the RU during the exchange, the slave can estimate the clock error A by removing the effect of the one-way delays by computing:

$$\Delta'=[(T1'-T1)-(T2'-T2)]/2.$$

This clock phase error estimate Δ' can be used in the RU to produce a reference signal that closely tracks the timing reference signal (e.g., a GPS-derived, 1 Pulse Per Second (1PPS) signal) in the CU.

In some implementations, the one-way delays in the two directions are generally not equal, primarily due to asymmetric load-dependent delays in the switches (propagation and transmission delays are typically symmetric). To reduce the effect of such errors, IEEE 1588v2 introduced the ability for intermediate nodes, such as Ethernet switches, to measure the delays that the packets incur inside the node and insert this part of the delay into the time stamp packets as they traverse the node. Such 1588v2 support by Ethernet switches will allow the slave to estimate the round-trip delay without the asymmetric load-dependent network delays and produce a much more accurate estimate of the clock offset to drive the Phase Locked Loop (PLL). However, switches that support IEEE1588 tend to be more expensive and therefore there is a need to develop methods that can reduce or eliminate the effects of asymmetric network delays.

To the extent the IEEE1588v2 processes can be used to drive the timing phase error to zero, the reference clock in the RU can be perfectly aligned in phase and frequency with the reference clock in the CU, for example a GPS 1PPS signal.

In example systems of the present disclosure, the VCTCXO in the CU is used as the master clock to generate the timestamps for the IEEE1588 protocol. The RU's VCTCXO is disciplined using the time stamps received by the IEEE1588 slave. Intelligent time stamp transmission and processing is used in the CU and the RUs to reduce or eliminate jitter introduced by random asymmetric Ethernet network delays between the CU and the RU. The timing of timestamp generation in the CU and in the RUs is orchestrated to reduce asymmetric delays. Timestamp generation and processing may be implemented on a System-on-Chip (SoC) in both the CU and the RU. Hardware-assist is used in this process to reduce the possibility that random asymmetric delays are introduced into the IEEE1588 processing.

If the time stamps are sent by the CUs and RUs in an uncoordinated manner, they may experience different delays on the uplink and downlink because of different levels of contention they encounter in the two directions. For example, if multiple RUs respond to a time stamp sent by the CU at about the same time, the uplink time stamps may experience significantly longer delays than the time stamps sent on the downlink. Contention between time stamps and IQ data may also contribute to increased latency and such latency may be different in the two directions.

Two metrics that can be used to assess the accuracy of the IEEE1588 timing synchronization method are the mean value and the variance of the clock error estimate Δ':

$$E\{\Delta'\} = E\{(T1' - T1)\} - E\{(T2' - T2)\}]/ = [E\{D_{DL} + \Delta\} - E\{D_{UL} - \Delta\}]/2$$
$$= \Delta + E\{D_{UL} - D_{UL}\}/2$$

Where E{ } refers to statistical expectation or mean value of its argument. In other words, the mean of the timing estimate Δ' has a fixed bias which corresponds to the average delay difference between the uplink and the downlink, divided by 2. When the average delays on the DL and UL differ significantly, there could be a significant phase error in the average timing estimate. The variance of the timing estimate is proportional to the variance of ½ the difference between DL and UL delays.

$$E\{(\Delta'-E\{\Delta'\})^2\}=\text{variance}\{(D_{DL}-D_{UL})/2\}.$$

The mean-squared estimation error $E\{(\Delta'-\Delta)^2\}$ between the estimated clock phase error and the actual clock phase error will be higher than the variance of $\Delta'$ by the square of the bias:

$$E\{(\Delta'-\Delta)^2\})=\text{variance}\{D_{DL}-D_{UL}/2\}+ [E\{D_{DL}-D_{UL}\}/2]^2.$$

In some implementations, it is possible for the RU to accurately determine the ratio between the UL and DL delays; e.g., $D_{UL}/D_{DL}=a$. The RU can then modify the formula for the clock error estimate according to:

$$\Delta'=[a(T1'-T1)-(T2'-T2)]/(1+a).$$

To the extent the parameter "a" can be determined exactly, a perfect estimate of the clock error can be obtained with no bias; i.e., $E\{\Delta'\}=\Delta$ and variance $\{\Delta'\}=0$. In some implementations, it is difficult to know the uplink and downlink delays exactly in a consistent manner. Sometimes it may be possible to determine a functional relationship between the uplink and downlink delays on average. For example, if there is a known functional relationship between the average delays $D_1=E\{D_{DL}\}$ and $D_2=E\{D_{UL}\}$, then it is possible to reduce or even remove the bias term $E\{D_{DL}-D_{UL}\}/2$. For example, if $D_2=a D_1+b$, in other words the average delay in the UL is a known linear function of the average delay on the DL, then we can reduce or remove the bias by using a modified timing estimate given by the following:

$$\Delta'=[a(T1'-T1)+b-(T2'-T2)]/(1+a).$$

In this case, it can be shown that $E\{\Delta'\}=\Delta$, which is the correct estimate with no bias. It can be observed that in the special case where a=1 and b=0, this reduces to the case where the average delays on the UL and DL are the same and the timing estimate reduces to the standard 1588 timing estimation formula.

The variance of the timing phase estimate is now reduced to:

$$E\{(\Delta'-E\{\Delta'\})^2\}=E\{(\Delta'-\Delta)^2\}=\text{variance} \{aD_{DL}+b-D_{UL}/(1+a)\}.$$

Another method for reducing the mean-squared timing phase error is to minimize both the mean and the variance of the average delay differential between the uplink and the downlink by controlling the transmission of the time stamps relative to each other and relative to the IQ data transmissions between the CU and the RU so as to avoid contention in the switches. Next we describe an example method that can significantly reduce the downlink and uplink delays.

Figure 18:
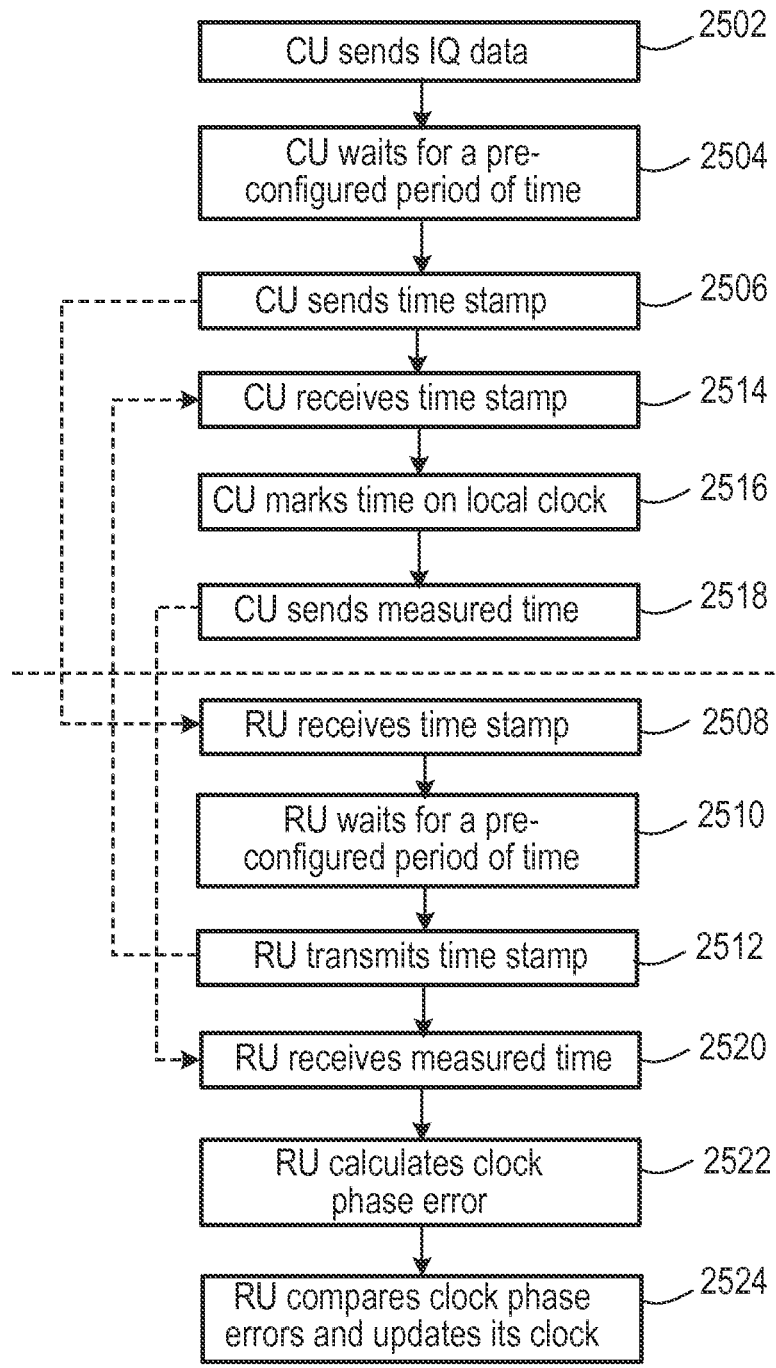
FIG. 18 is a flow diagram showing an example of synchronization between a controller and a remote unit.

In this method, we let the CU and each RU execute multiple time stamp exchanges during a given time interval A, e.g., 1 second. For example, the CU and the RU may execute 10 time stamp exchanges during a 1 second interval, where each time stamp exchange uses 3 IEEE1588 message transmissions as described earlier. In some implementations, referring to FIG. 18, the CU sends 2502 its time stamp in the beginning of the OFDM symbol interval. It then waits 2504 for some pre-configured period of time before transmitting 2506 its IQ data to allow time for the time stamp to travel through the switches. The time stamp transmissions are associated with the highest priority. If a time stamp encounters contention from IQ data in the switches, it will at most wait for the transmission of the IQ data whose transmission has already started. Upon receiving 2508 the time stamp, the RU initiates the transmission of its own time stamp at randomly chosen intervals later. In some implementations, upon receiving the time stamp from the CU, the RU may wait 2510 a pre-configured time interval before transmitting 2512 the time stamp. The pre-configured time interval may also depend on the time when the RUs own uplink IQ data transmission is completed. The CU, upon receiving 2514 the RU's time stamp, marks 2516 the time on its local clock and sends this measured time to the RU in another IEEE1588 message. The RU upon receiving 2520 this message calculates 2522 an estimate of the clock phase error (or equivalently, a clock offset), but does not make any adjustment to its clock. In some implementations, the CU and the RU repeat the above exchange multiple times during the time interval A. At the end of the time interval, the RU compares 2524 the clock offsets and updates 2524 its clock based on the measurement that corresponds to the lowest clock offset.

In some implementations, the RU may compare the clock offset to a threshold value. If the clock offset exceeds the threshold value in magnitude, the RU does not update its clock during an interval A. In addition to computing the estimates for the clock offset, the RU can compute the round trip delay as $$D_{DL}+D_{UL}=[(T1'-T1)+(T2'-T2)].$$

A round trip delay may indicate that the IEEE1588 exchange has contention, and that that the associated clock offset is inaccurate, and therefore, should not be used.

The CU also implements similar IEEE1588 exchanges with other RUs. In some implementations the CU may implement the IEEE1588 exchanges with different RUs in a non-overlapping fashion, so as to minimize contention in uplink time stamp transmissions. In some implementations, only one IEEE1588 exchange may be used for each RU during the time interval A.

If there are multiple controllers at the site sending traffic to the same output port of a switch, these transmissions may also create contention and increase latency. One way such contention may be avoided is to use a single controller to act as the master for all DL transmissions. In other words, all traffic may be routed through the master controller. Alternatively, a single controller may assume the master role only for the IEEE1588 operation. In this case, only the master controller will send time stamps to the RUs.

If the RUs and the controller support other traffic, such as Wi-Fi traffic, the transmission of the other traffic may also be timed to avoid contention in the switches. For example, additional Ethernet links may be used to avoid direct contention between such other traffic and the latency-sensitive IQ data and IEEE1588 time stamp traffic.

In some implementations, traffic associated with different controllers and other traffic, such as WiFi, can be segregated, e.g., strictly segregated, by assigning them to different VLANs and using dedicated Ethernet links and ports for the radio network to avoid contention.

Ethernet QoS capabilities can be implemented to improve the performance of the above methods. Using priority levels defined in the 802.1p standard, time stamp transmissions can be given higher priority to minimize delays in switches that may be caused by IQ data transmissions.

Next a description is provided of how uplink and downlink subframes transmitted across the switched Ethernet network should be aligned.

2. Frame Advance

Aligning the downlink and uplink transmissions at the antennas in a standalone eNodeB can create a slight misalignment in the eNodeB baseband processor. But, since the delay between the antennas and the baseband processor is relatively small, this has little, if any, impact on the system performance. However, the delay in the present disclosure between baseband processing in the CU and the antennas near the RUs can be significantly higher than in a standalone eNodeB because of the delays introduced by the Ethernet network between the CU and the RUs. In some cases, the fixed delay between the CU and the RU can be in the order of 200-300 μs, or 3-4 OFDM symbol intervals. To compensate for this delay, one may advance the downlink subframe timing in the CU by a pre-determined amount of $T_{DL}$ seconds, where $T_{DL}$ is on the order of 200-300 μs in some implementations. If the uplink (UL) and downlink (DL) frames are aligned at the RU antenna then, as described below, an offset will occur between the UL and DL subframes in the baseband modem of the CU. One timing synchronization requirement in LTE is related to the relative timing phase of uplink transmissions from different UEs. This requirement, called the Uplink Timing Advance, is also implemented in the present disclosure. In Uplink Timing Advance, the UEs advance the timing phase of their uplink transmissions relative to received downlink transmissions based on commands received from the eNodeB. A standard eNodeB determines the timing advance commands to align the start of the received n'th uplink subframe with the start of its own downlink transmission of the n'th subframe at the antennas. If the UE's timing advance is set equal to the round-trip delay between the UE and the eNodeB antennas, the uplink signals from different UEs will be phase-aligned at the eNodeB antennas.

Accordingly, in the present disclosure, uplink signals from different UEs are timing-phase aligned at the receive antennas of the RU such that these transmissions are all received within the cyclic prefix as explained earlier. One can then choose the timing advance (TA) according to TA=$t_{RT}$, where tar is the mean round-trip delay between the UE and the nearby RU antennas. This would automatically align the DL subframe boundaries, which are phase-aligned with GPS 1PPS, with UL subframe boundaries at the RU antenna as shown in FIG. 12. However, the DL and UL subframe boundaries at the CU are now offset with respect to each other by $T_{RT}=T_{DL}+T_{UL}$, where $T_{DL}$ and $T_{UL}$ are the assumed fixed downlink and uplink frame timing advance between the CU and the RU, respectively. In summary, in the RU TX (transmit) antenna, the transmission of the n'th DL subframe starts at the same time as the reception of the n'th UL subframe, but in the CU the reception of the n'th UL frame occurs $T_{RT}$ seconds later than the start of the transmission of the n'th DL subframe. A drawback of this approach is that the HARQ processing time in the CU may be reduced by $T_{RT}$ seconds, which can be as high as 500 μs. In implementations where there is no delay between the RU and the CU, the controller has 3 ms available to process the signals received on the uplink and start the corresponding transmission on the downlink. Therefore, this could represent a reduction of 17% in processing time available in the CU.

Consider the downlink HARQ operation of FIG. 13, where the CU sends PDSCH data in DL subframe N, which is received by the UE after $T_{DL}+t_{DL}$ seconds. The UE sends an ACK/NAK message in uplink subframe N+4. If the timing advance TA=$t_{RT}$, as would be the case in a classic eNodeB, then from the end of DL subframe N to the beginning of UL subframe N+4, the UE has 3−TA=3−$t_{RT}$ ms to demodulate the DL subframe N, determine the ACK/NAK and construct the ACK/NAK message. From the time it receives the UL subframe N+4 carrying the ACK/NAK, the CU can have until the beginning of DL subframe N+8 to schedule a retransmission. When TA=$t_{RT}$, then from the end of the N+4'th UL subframe to the beginning of the N+8'th DL subframe, the CU will have only 3−$T_{RT}$ ms available to start a retransmission. In other words, the available processing time in the CU is reduced by the round-trip delay between the CU and the antenna. In some implementations, the CU may delay the retransmission by taking advantage of so-called adaptive feature of the DL HARQ, though in some circumstances this may reduce the overall throughput. A similar reduction in available processing time also occurs in uplink HARQ, where the CU has 3−($T_{DL}+T_{UL}$) processing time between receiving an uplink transmission and sending an ACK/NAK on the downlink.

A method that can address the above issue is to increase the uplink timing advance TA by $T_{RT}$ for all the UEs. This does not affect the uplink timing phase alignment among UEs at the RU, since the timing advance is increased by the same amount for all the UEs. As explained above, increasing the timing advance reduces the HARQ processing time in the UE, but since all the UEs are designed to handle a maximum timing advance of 667 ρs in some implementations, there should not be any problems as long as the timing advance is kept below this limit. The subframe alignment in this case is illustrated in FIG. 14.

As required, the DL subframes are phase aligned with GPS 1PPS at the TX antennas, but the UL subframes at the RX antennas are now offset by $T_{RT}$ seconds relative to GPS 1PPS. In other words, the RU will start processing UL subframe N $T_{RT}$ seconds before it starts processing DL subframe N.

Figure 16:
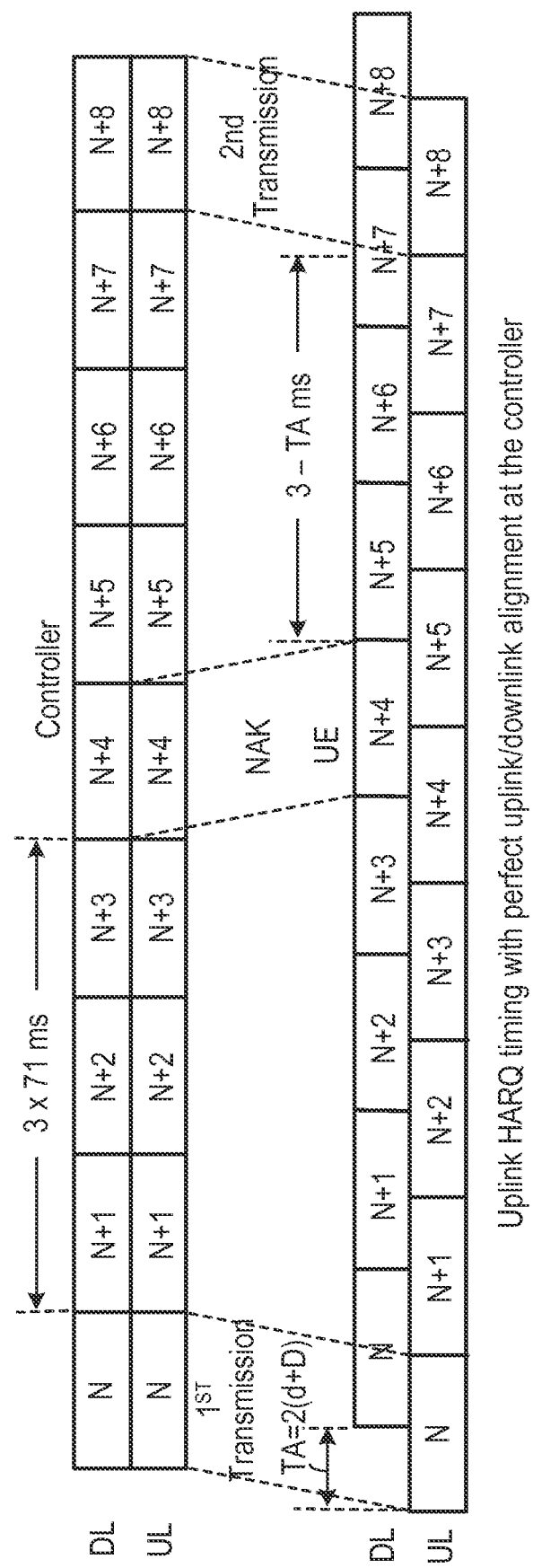

The revised HARQ timing for both downlink and the uplink are illustrated in FIGS. 15 and 16. In the examples shown in both figures, the processing time in the CU remains constant at 3 ms, whereas the processing time in the UE is reduced to 3−$t_{RT}$−$T_{RT}$ ms, but is still within the bounds of UE's capabilities. It is possible to choose the timing advance to be anywhere between $t_{RT}$ and $t_{RT}+T_{RT}$.

When the UE applies a large timing advance TA, the preamble configuration for the Physical Random Access Channel (PRACH) needs to be selected accordingly to prevent the PRACH preamble transmission in subframe N from interfering with Physical Uplink Shared Channel (PUSCH)/Physical Uplink Control CHannel (PUCCH) transmissions in the next subframe N+1. The guard interval GI of the preamble should be greater than the timing advance TA or alternatively, the eNodeB should not schedule any PUSCH transmissions in subframe N+1 in the resource blocks assigned to PRACH in subframe N. PRACH preamble formats 1 and 3 support a TA of up to 0.52 and 0.72 ms, but use 2 and 3 subframes, respectively. PRACH preamble formats 0 and 2 only support a TA of up to 0.1 and 0.2 ms, using 1 and 2 subframes, respectively. PRACH preamble format 1 is suitable for the present disclosure if TA can be kept below 0.5 ms. Alternatively it is possible to use a format 0 and not to schedule any PUSCH transmission in the PRACH RBs in the uplink subframe immediately following the PRACH transmission.

In the CU the PRACH packets sent by the RU are stored in a PRACH buffer, separate from the UL buffer, and are processed as quickly as possible. The CU examines the 839-point energy sequence, determines whether a preamble is present and, if so, estimates the cyclic shift that was transmitted by the UE, and prepares the PRACH response message. While there is no strict timing requirement for the CU to send a PRACH response, this should be done as quickly as possible in order to improve the PRACH response time. Based on FIG. 16, the CU can send the PRACH response in subframe N+3.

In some implementations, the TA in the UE may be kept low, for example as low as the round-trip airlink delay, and one may accept the resulting reduced processing time in the controller. This may allow the radio network to use the Format 0 PRACH preamble, which uses less airlink resources for PRACH, or not have any restrictions in scheduling due to potential collisions with PRACH, as described earlier.

3. Frame Alignment for TD-LTE

Figure 19:
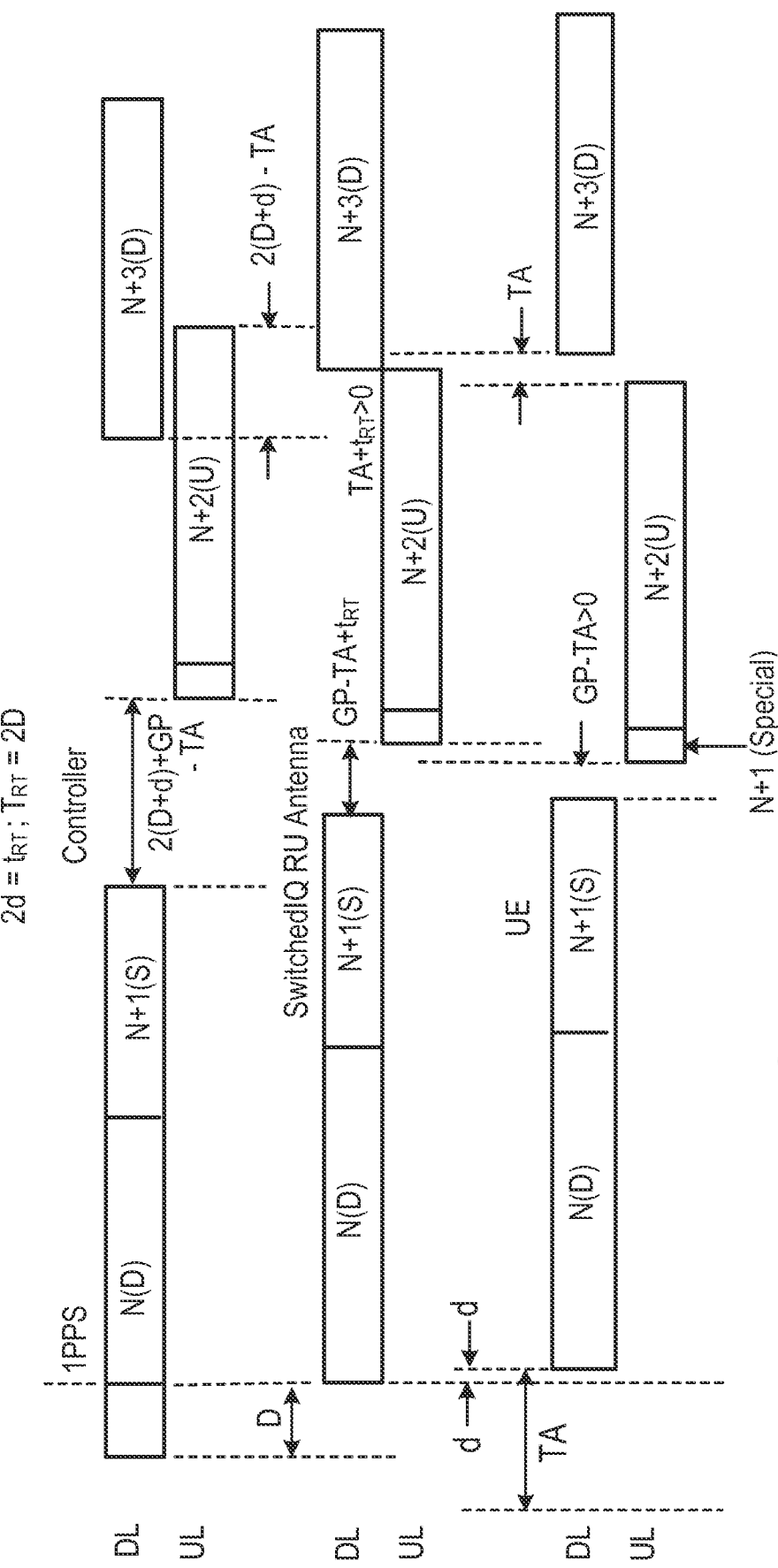
FIG. 19 is a schematic diagram showing an example of a special subframe used in transitioning from DL transmission to UL transmission.

In frame advance in FDD-LTE. In TD-LTE, the frame structure is designed such that uplink and downlink transmissions do not overlap at the RU and UE receive antennas. A special subframe can be used to transition from DL to UL transmission, as shown in FIG. 19. The special subframe starts with a few OFDM symbols of DL transmission, followed a silence gap interval GP that lasts a few OFDM symbols and ends with 1 or 2 OFDM symbols of UL transmission. The UL transmission in the special subframe can only carry SRS or PRACH (which needs two OFDM symbols). LTE standard supports 9 different configurations for the special subframe as shown in the Table 2.

TABLE 2

Subframe Configurations Supported by LTE.

| Special Subframe Configuration | DL | P | L | Total |
|---|---|---|---|---|
| 0 | 3 | | 0 | 14 |
| 1 | 9 | | | 14 |
| 2 | 11 | | | 14 |
| 3 | 11 | | | 14 |
| 4 | 12 | | | 14 |
| 5 | 3 | | | 14 |
| 6 | 9 | | | 14 |

TABLE 2-continued

Subframe Configurations Supported by LTE.

| Special Subframe Configuration | DL | P | L | Total |
|---|---|---|---|---|
| 7 | 10 | | | 14 |
| 8 | 11 | | | 14 |

As in FDD, the UE advances the UL frame timing relative to the received DL timing by TA seconds. This aligns transmissions by different UEs at the RU antennas. In TD-LTE, the maximum expected value of TA determines the gap interval GP. In order to avoid simultaneous DL and UL transmissions at the UE or RU receive antennas, GP is selected such that $GP \geq TA \geq t_{RT}$, where $t_{RT}$ represents the round-trip airlink propagation delay between the UE and RU antennas.

As shown in FIG. 19, if GP<TA, the UE's UL transmission at the end of the special subframe will interfere with the reception of the DL transmission in the beginning of the same special subframe. If GP<TA-$t_{RT}$, then the RUs DL transmission in the beginning of the special subframe will cause interference into the RUs reception of the UL transmission at the end of the special subframe. If TA<$t_{RT}$, then the RUs DL transmission immediately following an UL-to-DL transition will interfere with the RUs reception of the UE's last UL subframe transmission before the UL-to-DL transition.

In some implementations, it is possible for the controller to choose TA to align DL and UL transmissions at the controller as in FDD in order to preserve the 3 ms processing time. The special subframe configurations 0 or 5 can be used, which support a GP value (9 or 10 OFDM symbols) that is large enough to avoid the UL-DL interference described above. Sometimes, the large value of GP can cause inefficiency on DL transmissions.

In some implementations, a shorter TA value may be used for TD-LTE. In TD-LTE, the HARQ timing is different from that in FDD and depends on the specific TDD frame configuration. Table 3 shows the minimum HARQ timing requirements for the 9 different frame configurations that are supported in the standard. The frame configuration is sent by the controller in a SIB message.

TABLE 3

Minimum HARQ Timing Requirements for 9 Different Frame Configurations

| Subframe # | 0 | 1 | 2 | 3 | 4 | 5 | 6 | 7 | 8 | 9 |
|---|---|---|---|---|---|---|---|---|---|---|
| 0 | D | S | U | U | U | D | S | U | U | U |
| ACK/NAK | 4 | 6 | 4 | 7 | 6 | 4 | 6 | 4 | 7 | 6 |
| Re-Transmission | 6 | 4 | 6 | 4 | 4 | 6 | 4 | 6 | 4 | 4 |
| Total Time | 10 | 10 | 10 | 11 | 10 | 10 | 10 | 10 | 11 | 10 |
| 1 | D | S | U | U | D | D | S | U | U | D |
| ACK/NAK | 7 | 6 | 4 | 6 | 4 | 7 | 6 | 4 | 6 | 4 |
| Re-Transmission | 4 | 4 | 6 | 4 | 6 | 4 | 4 | 6 | 4 | 6 |
| Total Time | 11 | 10 | 10 | 10 | 10 | 11 | 10 | 10 | 10 | 10 |
| 2 | D | S | U | D | D | D | S | U | D | D |
| ACK/NAK | 7 | 6 | 6 | 4 | 8 | 7 | 6 | 6 | 4 | 8 |
| Re-Transmission | 4 | 4 | 4 | 4 | 4 | 4 | 4 | 4 | 4 | 4 |
| Total Time | 11 | 10 | 10 | 8 | 12 | 11 | 10 | 10 | 8 | 12 |
| 3 | D | S | U | U | U | D | D | D | D | D |
| ACK/NAK | 4 | 11 | 6 | 6 | 6 | 7 | 6 | 6 | 5 | 5 |
| Re-Transmission | 4 | 4 | 4 | 4 | 4 | 4 | 4 | 4 | 4 | 4 |
| Total Time | 8 | 15 | 10 | 10 | 10 | 11 | 10 | 10 | 9 | 9 |
| 4 | D | S | U | U | D | D | D | D | D | D |

TABLE 3-continued

Minimum HARQ Timing Requirements for 9 Different Frame Configurations

| Subframe # | 0 | 1 | 2 | 3 | 4 | 5 | 6 | 7 | 8 | 9 |
|---|---|---|---|---|---|---|---|---|---|---|
| ACK/NAK | 12 | 11 | 6 | 6 | 8 | 7 | 7 | 6 | 5 | 4 |
| Re-Transmission | 4 | 4 | 4 | 4 | 4 | 4 | 4 | 4 | 4 | 4 |
| Total Time | 16 | 15 | 10 | 10 | 12 | 11 | 11 | 10 | 9 | 8 |
| 5 | D | S | U | D | D | D | D | D | D | D |
| ACK/NAK | 12 | 11 | 6 | 9 | 8 | 7 | 6 | 5 | 4 | 13 |
| Re-Transmission | 4 | 4 | 4 | 4 | 4 | 4 | 4 | 4 | 4 | 4 |
| Total Time | 16 | 15 | 10 | 13 | 12 | 11 | 10 | 9 | 8 | 17 |
| 6 | D | S | U | U | U | D | S | U | U | D |
| ACK/NAK | 7 | 7 | 4 | 6 | 6 | 7 | 7 | 4 | 7 | 5 |
| Re-Transmission | 8 | 7 | 6 | 4 | 4 | 7 | 6 | 6 | 7 | 5 |
| Total Time | 15 | 14 | 10 | 10 | 10 | 14 | 13 | 10 | 14 | 10 |

For each frame configuration, Table 3 shows the DL (D), UL (U) and Special (S) subframes in a radio frame. Configurations 3-5 support a single DL-UL transition and the other configurations support two DL-UL transitions within a 10 ms radio frame. For each frame configuration, Table 3 also shows the number of subframes between the transmission of the shared channel data and the transmission of ACK/NAK by the receiving node. In DL HARQ, the ACK/NAK time varies between 4 and 13 subframes. Sometimes the UE will have 3-TA ms processing time available, same as in FDD. In UL HARQ the ACK/NAK time varies between 4 and 7 subframes. When DL capacity requirements are higher than that on the UL, configurations 2-5 can be used for in-building systems. In these configurations, the ACK/NAK time is fixed at 6 subframes, 2 subframes longer than in FDD. This gives the controller $5-T_R L + t_{RT}$ seconds of processing time. If TA is minimized by setting it equal to the round-trip airlink delay, i.e., $TA = t_{RT}$, then the available processing time is $5-T_{RT}$. If TA is chosen to also compensate for the controller-RU round-trip delay $T_{RT}$, i.e., $TA = T_{RT} + t_{RT}$, then the available time is 5 subframes, which is 2 subframes longer than in FDD.

Table 3 also shows the retransmission time. It can be seen that the DL retransmission time varies between 4 and 8 subframes, but for configurations 3-5 it is always equal to 4, the same as in FDD. The available processing time in the controller increases from $3-T_R$ to 3 ms as TA is increased from $t_{RT}$ to $t_{RT}+T_{RT}$. This is the same trade-off as in FDD. In the UL the retransmission time varies between 4 and 7 subframes. In the worst-case of 4 subframes, the available processing time in the UE is the same as in FDD.

In TD-LTE PRACH opportunities are allowed in UL subframes. PRACH opportunities may also be created in special subframes when at least 2 OFDM symbols are assigned to PRACH (special subframe configurations 5-8). But in this case, the available silence interval is 288 samples (at 20 MHz), or 9.375 ns, which limits the round-trip airlink propagation delay to 9.375 ns, or about 1.4 km. This shows that in in-building networks, special subframes can be used for PRACH when UL/DL frames are aligned at the RUs and reduced processing time that may be available in the controller in certain configurations is accepted. The use of PRACH in normal UL subframes is the same as in FDD, except in TD-LTE multiple PRACH opportunities can be supported in a single subframe.

Other Embodiments

Although various assumptions are made for the purpose of discussion, the implementations of the systems and methods described in this disclosure are not limited by these assumptions. Instead, the discussions based on these assumptions can be readily generalized to other situations. The numbers of RUs in each cell, the numbers of antennas for each RU, and the numbers of cells in a network can vary, e.g., based on the network demands.

What is claimed is:

1. A communication system comprising:
   remote units to wirelessly exchange radio frequency (RF) signals with mobile devices, each RF signal comprising information that is destined for, or originating from, at least one of the mobile devices; and
   a controller communicatively coupled to the remote units;
   wherein the remote units (RUs) and the controller communicate baseband data corresponding to the information across an intermediate network;
   wherein the remote units each implement at least some physical layer processing for an air interface used to wirelessly communicate with the mobile devices;
   wherein the controller implements any physical layer processing for the air interface not implemented in the remote units; and
   wherein two or more of the remote units transmit a downlink reference signal to a mobile device of the mobile devices.

2. The communication system of claim 1, wherein each of the two or more of the remote units belongs to a same cell.

3. The communication system of claim 2, wherein each of the remote units in the cell comprise one or more antennas, the one or more antennas being associated with a common cell identifier.

4. The communication system of claim 1, wherein a single broadcast channel physical broadcast channel (PBCH) is used in the cell.

5. The communication system of claim 1, wherein the downlink reference signal is a Channel State Information Reference Signal (CSI-RS).

6. The communication system of claim 5, wherein a number of RU clusters are defined, each RU cluster comprising at least one RU and assigned to a different CSI-RS resource with a distinct Channel State Information (CSI) scrambling ID.

7. The communication system of claim 6, wherein the controller configures the mobile device to monitor multiple CSI-RS resources.

8. The communication system of claim 1, wherein each of the remote units comprises one or more physical antennas, wherein each physical antenna corresponds to a virtual antenna port, wherein at least some of the physical antennas across different remote units in an RU cluster are assigned to a same virtual antenna port.

9. The communication system of claim 8, wherein all physical antennas assigned to the same virtual antenna port are configured to transmit a common signal.

10. The communication system of claim 1, wherein the intermediate network is an Ethernet network.

11. A method comprising:
  wirelessly exchanging, by remote units, radio frequency (RF) signals with mobile devices, each RF signal comprising information that is destined for, or received from, at least one of the mobile devices;
  communicating baseband data corresponding to the information between a controller and the remote units (RUs) across an intermediate network;
  performing, at the remote units, at least some physical layer processing for an air interface used to wirelessly communicate with the mobile devices;
  performing, at the controller, any physical layer processing for the air interface not performed at the remote units; and
  wherein two or more of the remote units transmit a downlink reference signal to a mobile device of the mobile devices.

12. The method of claim 11, wherein each of the two or more of the remote units belongs to a same cell.

13. The method of claim 12, wherein each of the remote units in the cell comprise one or more antennas, the one or more antennas being associated with a common cell identifier.

14. The method of claim 11, wherein a single broadcast channel physical broadcast channel (PBCH) is used in the cell.

15. The method of claim 11, wherein the downlink reference signal is a Channel State Information Reference Signal (CSI-RS).

16. The method of claim 15, wherein a number of RU clusters are defined, each RU cluster comprising at least one RU and assigned to a different CSI-RS resource with a distinct Channel State Information (CSI) scrambling ID.

17. The method of claim 16, wherein the controller configures the mobile device to monitor multiple CSI-RS resources.

18. The method of claim 11, wherein each of the remote units comprises one or more physical antennas, wherein each physical antenna corresponds to a virtual antenna port, wherein at least some of the physical antennas across different remote units in an RU cluster are assigned to a same virtual antenna port.

19. The method of claim 18, wherein all physical antennas assigned to the same virtual antenna port are configured to transmit a common signal.

20. The method of claim 11, wherein the intermediate network is an Ethernet network.

* * * * *